United States Patent
Sugai et al.

(10) Patent No.: US 6,182,001 B1
(45) Date of Patent: Jan. 30, 2001

(54) BRAKING ESTIMATION DEVICE, ANTI-LOCK BRAKE CONTROLLER, AND BRAKING PRESSURE CONTROLLER

(75) Inventors: Masaru Sugai; Katsuhiro Asano; Takaji Umeno; Eiichi Ono; Hiroyuki Yamaguchi, all of Aichi-ken (JP)

(73) Assignee: Kabushiki Kaisha Toyota Chuo Kenkyusho, Aichi-gun (JP)

( * ) Notice: Under 35 U.S.C. 154(b), the term of this patent shall be extended for 0 days.

(21) Appl. No.: 08/996,316

(22) Filed: Dec. 22, 1997

(30) Foreign Application Priority Data

Dec. 25, 1996 (JP) .................................................. 8-346380
Jan. 23, 1997 (JP) .................................................. 9-010680

(51) Int. Cl.$^7$ ................................. G06F 7/00; G05D 1/00
(52) U.S. Cl. .................................. 701/78; 701/70; 701/78; 701/71; 701/80; 303/122; 303/136; 303/146; 303/191; 702/140; 702/183
(58) Field of Search .................................. 701/70, 71, 73, 701/78, 79, 80, 82, 90, 91, 76, 83; 303/163, 184, 150, 166, 3, 15, 155, 141, 162, 140, 183, 146, 191, 149, 148, 156, 157, 194, 122, 136; 180/197; 702/140, 183

(56) References Cited

U.S. PATENT DOCUMENTS

| | | | |
|---|---|---|---|
| 3,762,775 | * 10/1973 | Ochai .................................. | 303/166 |
| 4,925,254 | * 5/1990 | Holst et al. ......................... | 303/111 |
| 5,051,907 | * 9/1991 | Kuwana et al. ..................... | 701/79 |
| 5,109,339 | * 4/1992 | Watanabe et al. .................. | 701/70 |
| 5,187,666 | * 2/1993 | Watanabe ............................ | 701/78 |
| 5,219,212 | * 6/1993 | Shimada et al. .................... | 303/92 |
| 5,255,193 | * 10/1993 | Katayose et al. ................... | 701/78 |
| 5,271,666 | * 12/1993 | Okubo .................................. | 303/96 |
| 5,281,009 | * 1/1994 | Kidston et al. ..................... | 701/79 |
| 5,302,009 | * 4/1994 | Menard ................................ | 303/100 |
| 5,412,584 | 5/1995 | Umeno et al. ....................... | 701/70 |
| 5,493,495 | * 2/1996 | Naito et al. ......................... | 701/78 |
| 5,588,721 | 12/1996 | Asano et al. ........................ | 303/163 |
| 5,660,449 | * 8/1997 | Higashimata et al. .............. | 303/156 |
| 5,865,514 | * 2/1999 | Striegel et al. ..................... | 303/149 |
| 5,878,365 | * 3/1999 | Onogi et al. ........................ | 701/70 |
| 5,938,713 | * 8/1999 | Miyazaki ............................. | 701/71 |

FOREIGN PATENT DOCUMENTS

| | | |
|---|---|---|
| 0 699 568 | 3/1996 | (EP) . |
| 0 719 663 | 7/1996 | (EP) . |
| 3-118263 | 5/1991 | (JP) . |
| 6-286590 | 10/1994 | (JP) . |
| 7-186918 | 7/1995 | (JP) . |
| 7-220920 | 8/1995 | (JP) . |
| 8-34329 | 2/1996 | (JP) . |

* cited by examiner

Primary Examiner—Jacques H. Louis-Jacques
(74) Attorney, Agent, or Firm—Oblon, Spivak, McClelland, Maier & Neustadt, P.C.

(57) ABSTRACT

An apparatus for diagnosing a fault in a dynamic system includes a controller which controls the dynamic system through use of a control input signal and vibrates the dynamic system through use of an vibration signal irrelevant to the internal state quantity of the dynamic system; an observer for estimating, on the basis of a response output from the vibration dynamic system, total disturbance which is a sum of an internal disturbance vector stemming from a fault in the dynamic system and a vibration disturbance vector occurring in the dynamic system through vibration; a correlation calculation unit which calculates cross-correlation between the thus-estimated total disturbance and the internal state quantity of the dynamic system and separates a component related to the internal disturbance from the total disturbance; and a diagnostic unit for diagnosing a fault in the dynamic system on the basis of the thus-separated component related to the internal disturbance. Since the dynamic system is vibrated, the response output can be increased even when there exists small external disturbance. As a result, a fault or a variation in air pressure in a tire can be highly accurately diagnosed.

7 Claims, 37 Drawing Sheets

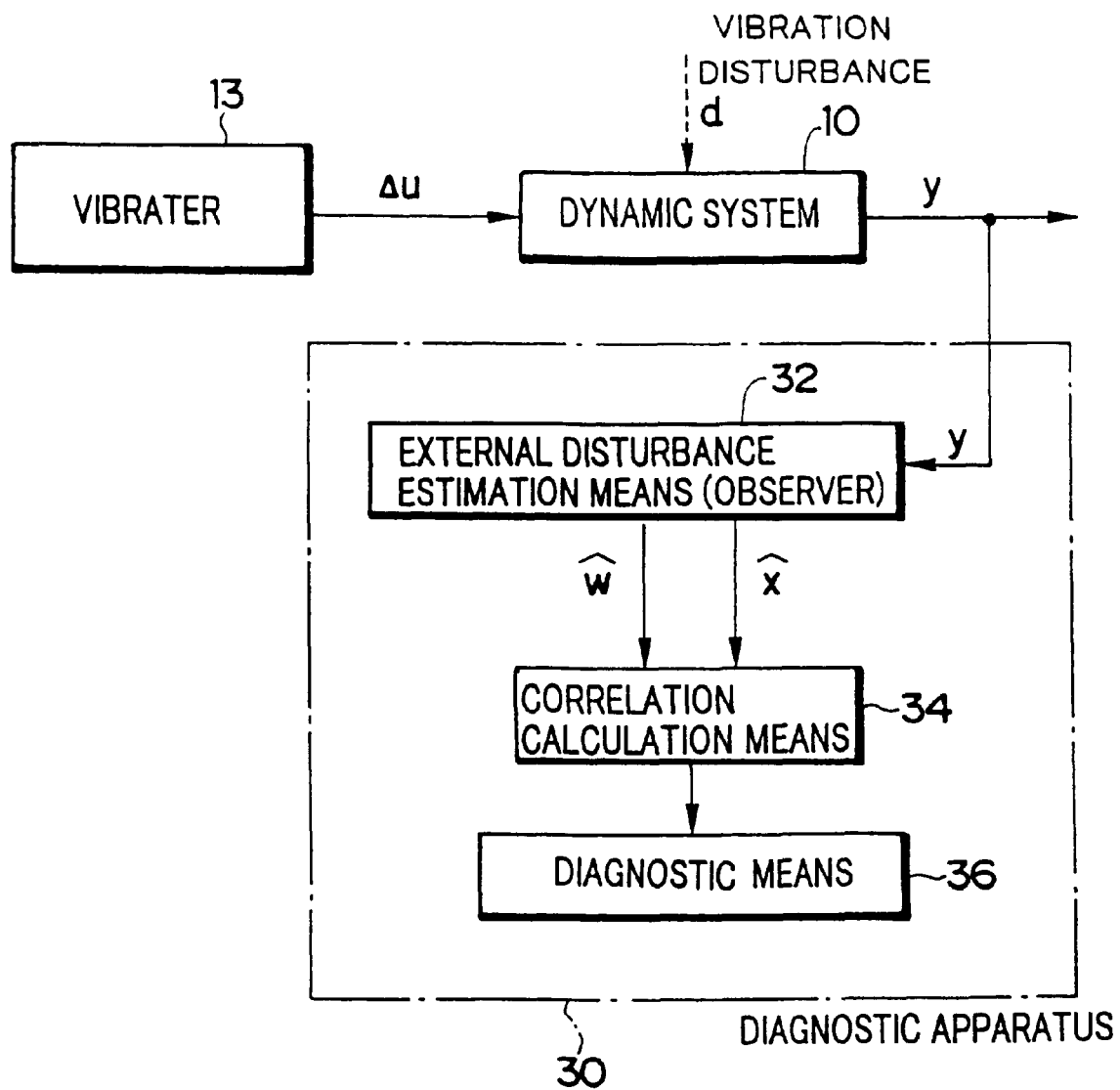

F I G. 3
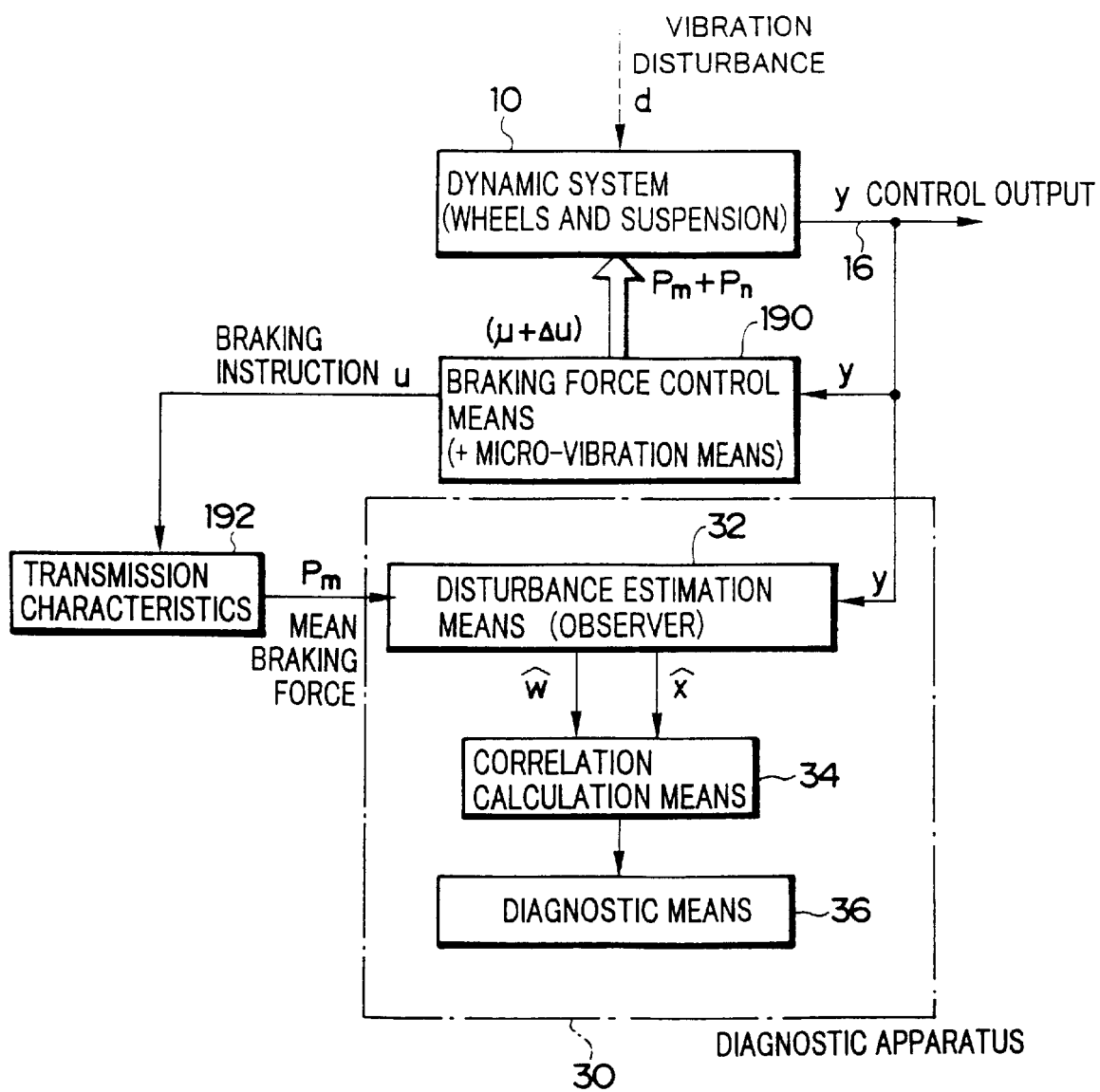

F I G. 5
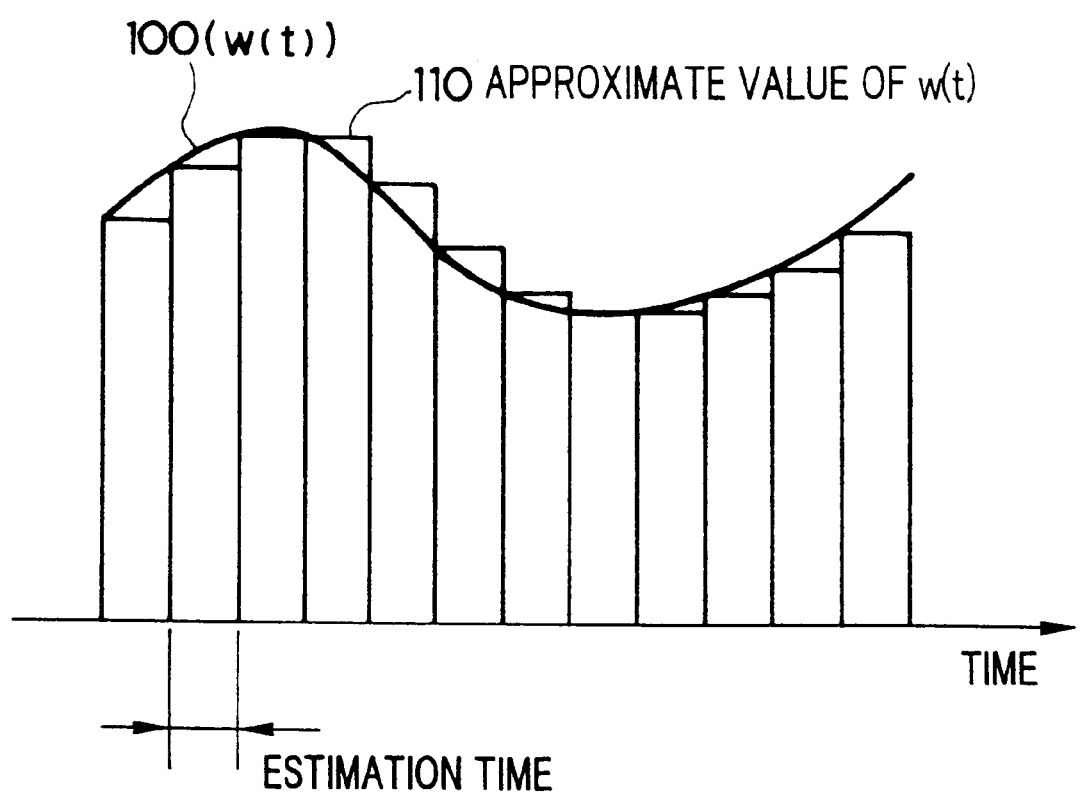

F I G. 7
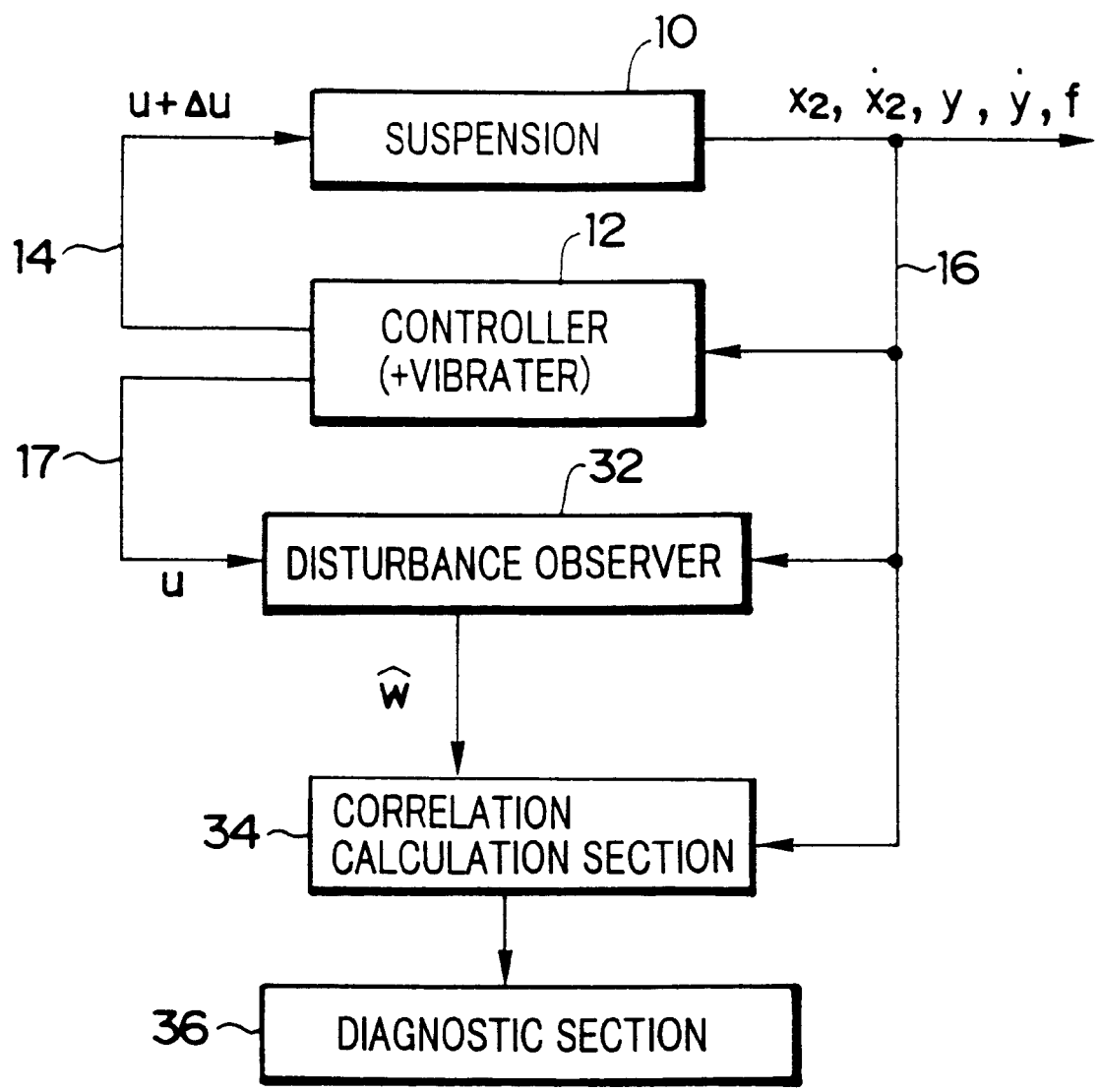

F I G. 8
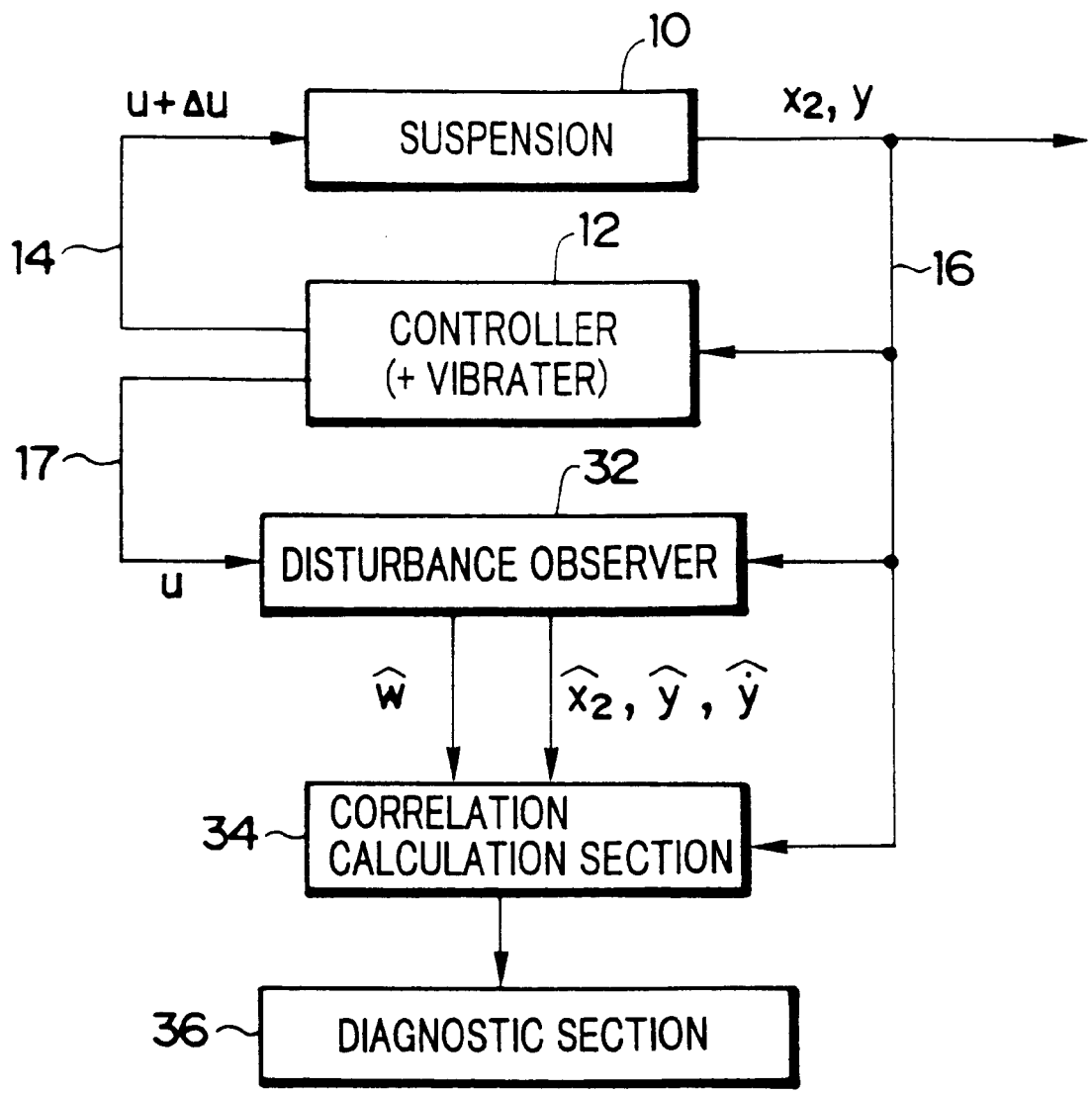

F I G. 1 3
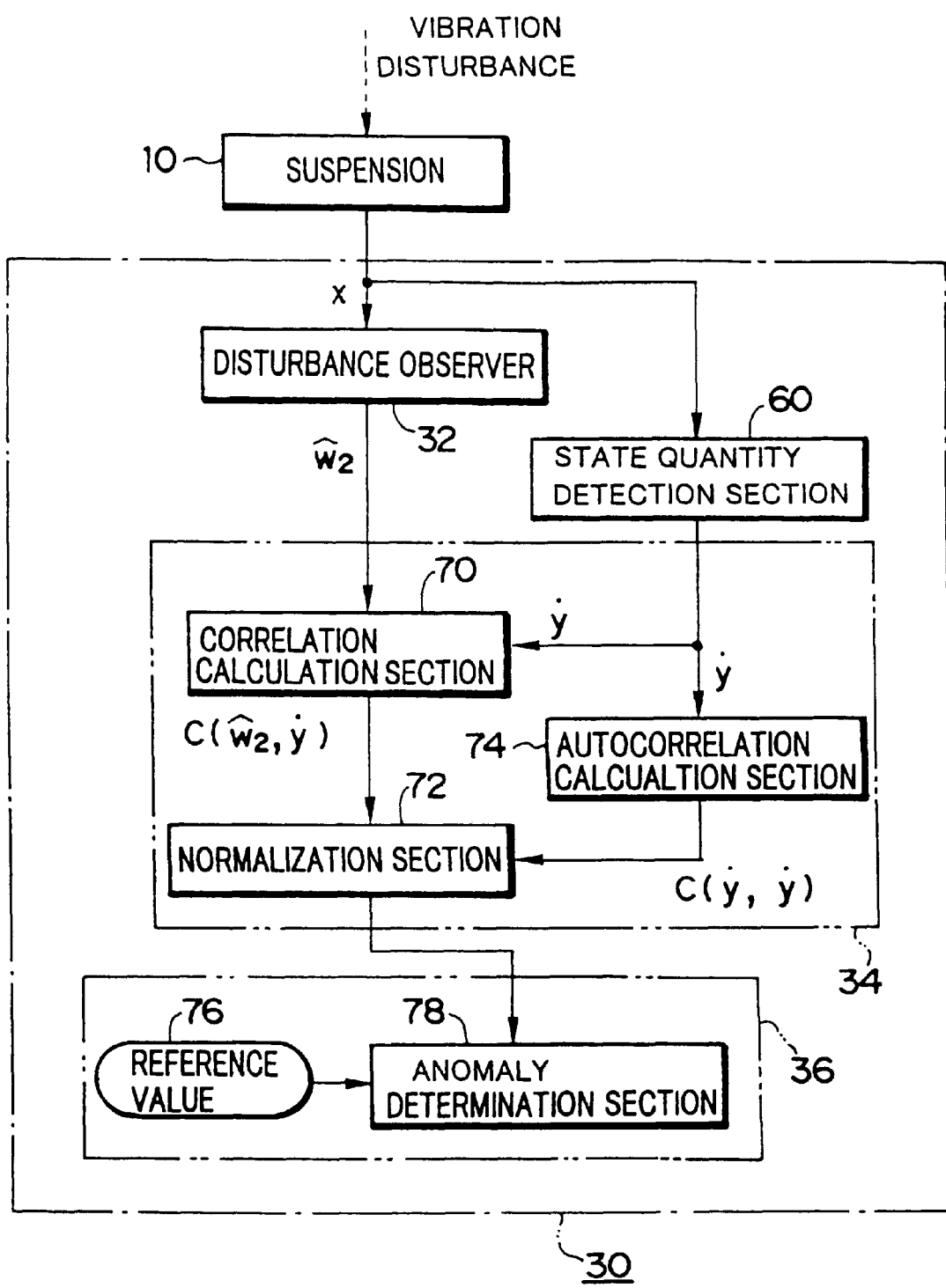

F I G. 1 5
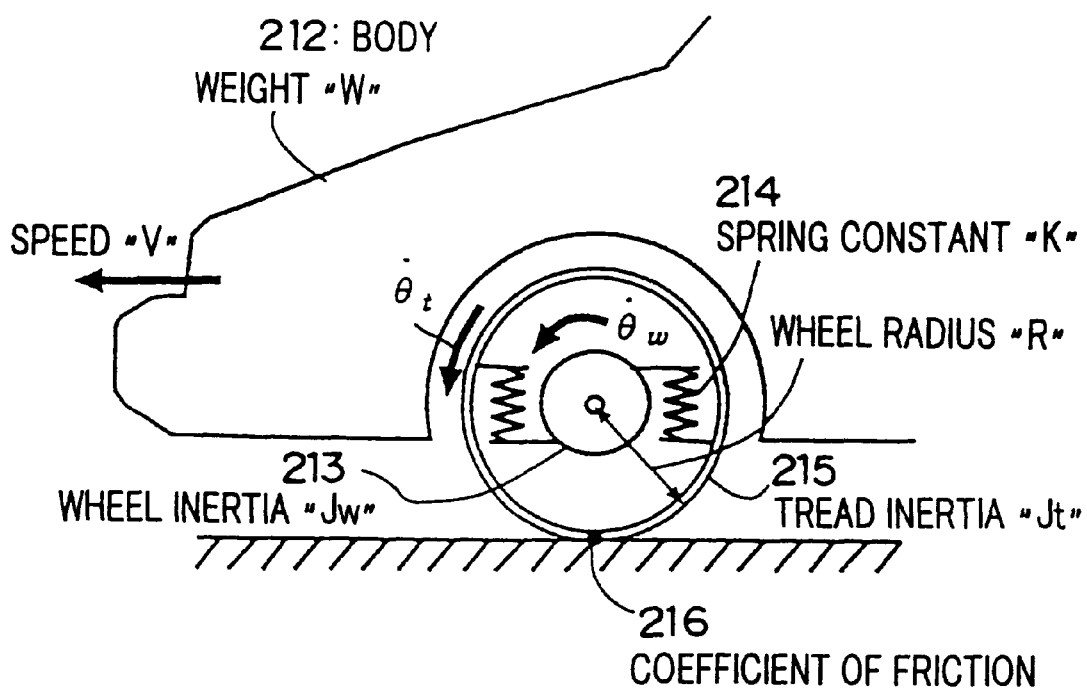

F I G. 1 7
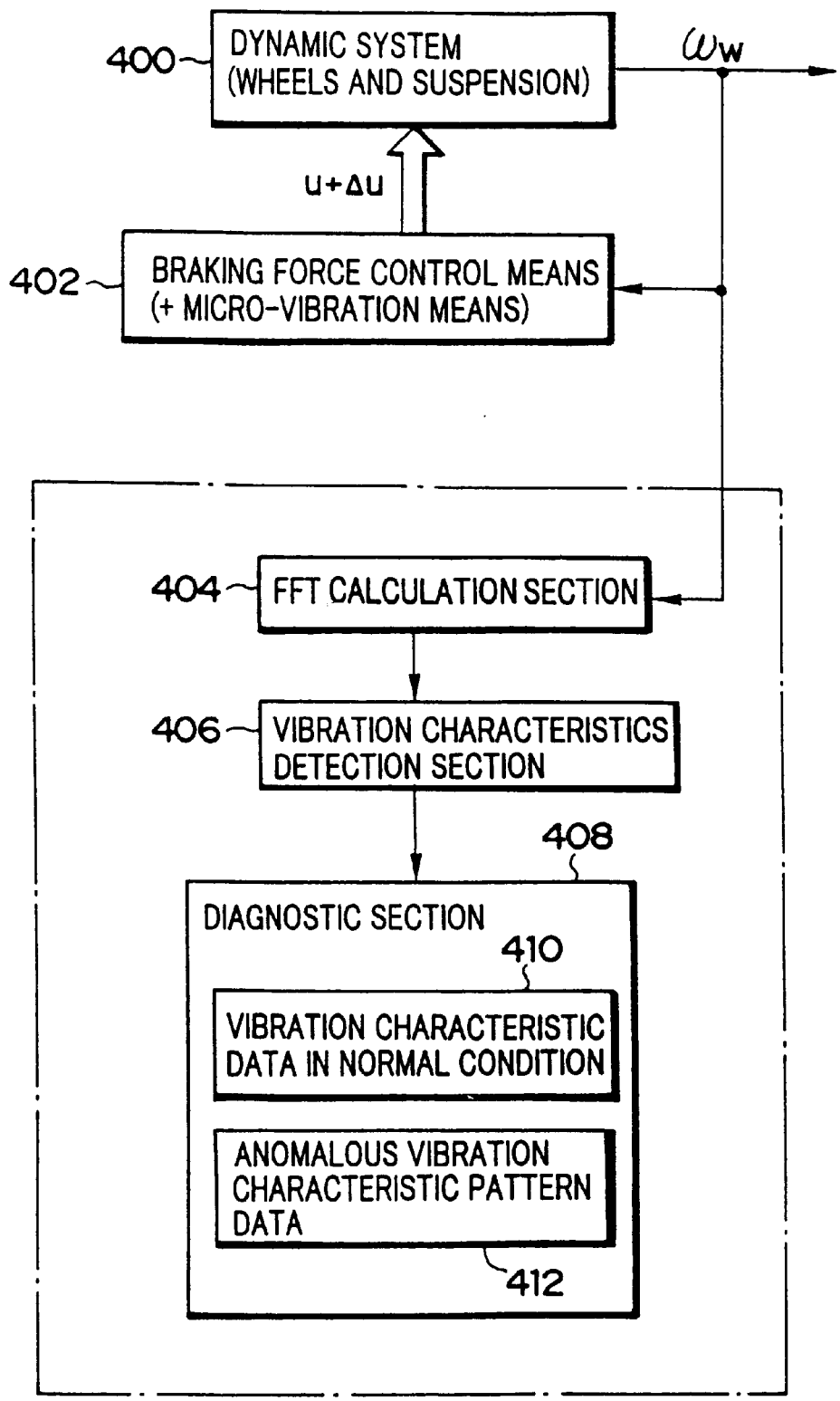

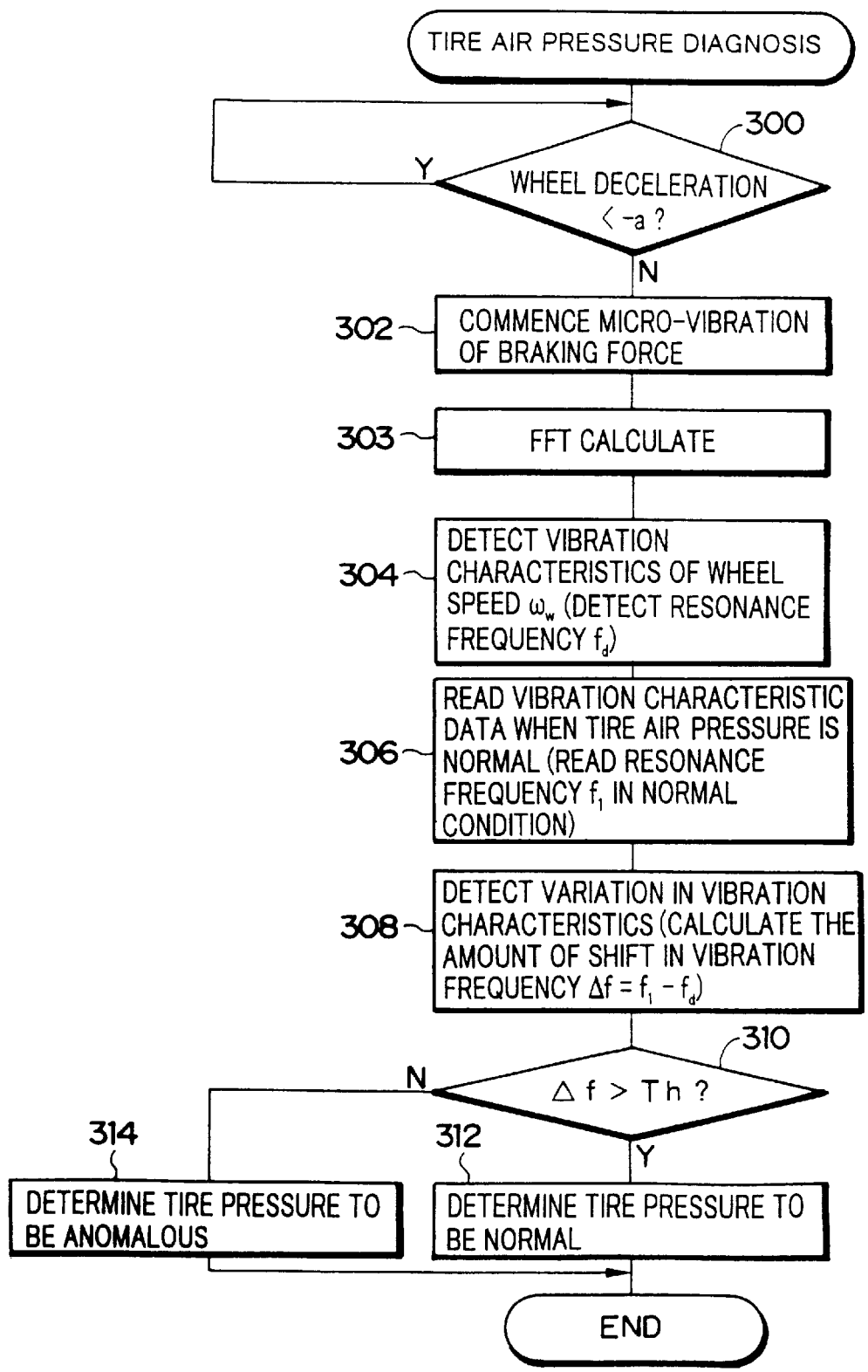

F I G. 2 0
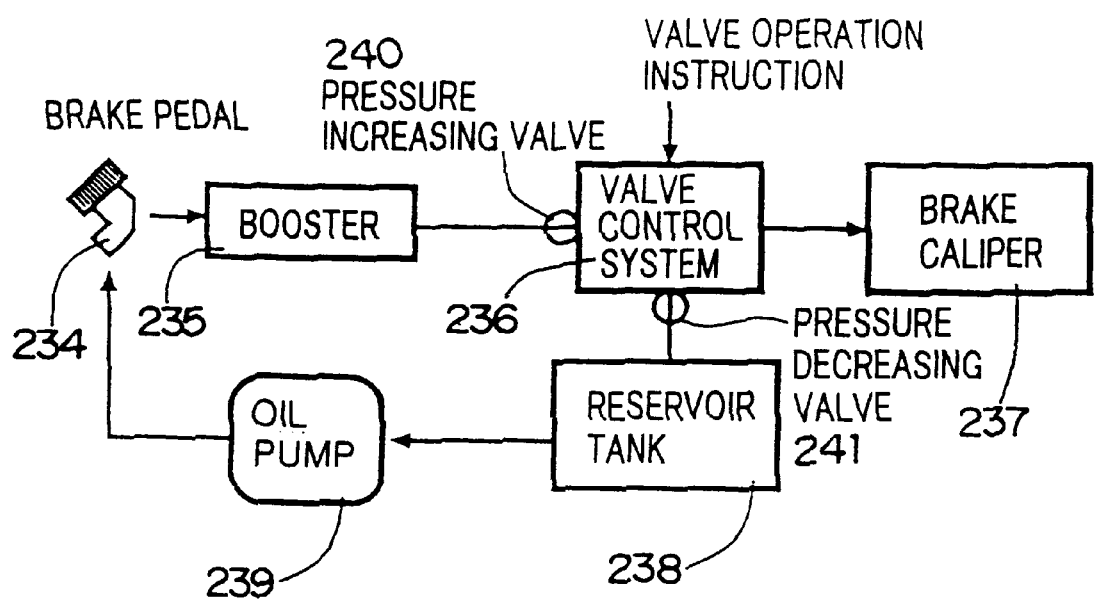

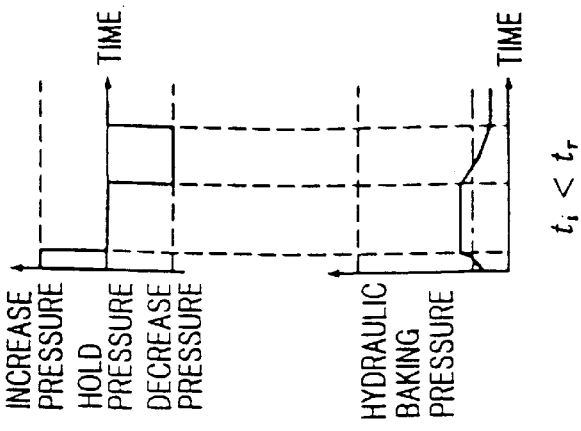
FIG. 25C    FIG. 25B
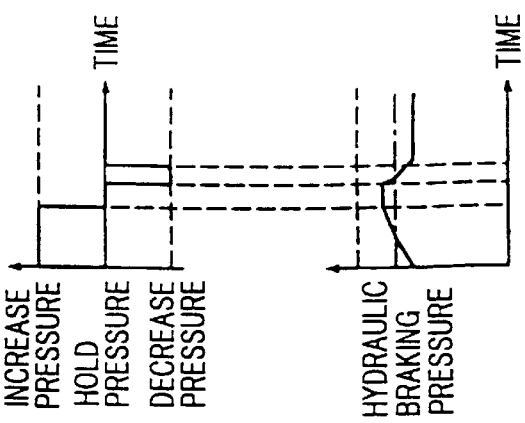
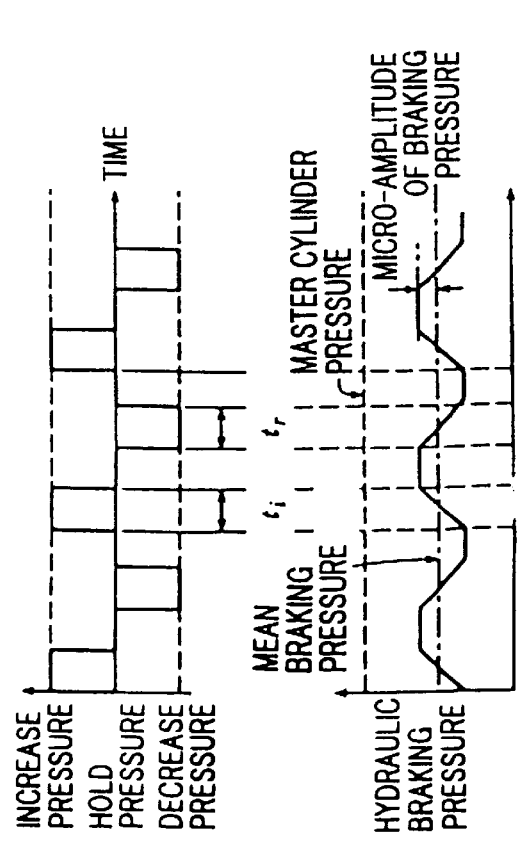
FIG. 25A
INSTRUCTION FOR INCREASING, DECREASING, OR HOLDING VALVE PRESSURE, AND HYDRAULIC BRAKING PRESSURE INCLINATION OF A CURVE REPRESENTING THE RELATIONSHIP BETWEEN FRICTION COEFFICINET μ AND SLIP SPEED Δω

BRAKE TORQUE AND INCLINATION

CONFIGURATION OF MEAN BRAKING PRESSURE ESTIMATION SECTION

CONFIGURATION OF MASTER CYLINDER PRESSURE ESTIMATION SECTION

CONFIGURATION OF BRAKING PRESSURE MICRO-AMPLITUDE ESTIMATION SECTION

CONFIGURATION OF RESONANCE GAIN CALCULATION SECITON

CONFIGURATION OF PI CONTROLLER

BRAKING ESTIMATION DEVICE, ANTI-LOCK BRAKE CONTROLLER, AND BRAKING PRESSURE CONTROLLER

BACKGROUND OF THE INVENTION

1. Field of the Invention

The present invention relates to a diagnostic apparatus for a dynamic system, and more particularly, to an apparatus for very accurately diagnosing faults in a dynamic system, the air pressure of a tire, and conditions around the tire by vibrating the dynamic system through use of vibration means provided in the diagnostic apparatus and on the basis of internal disturbance caused by a fault in the thus-vibrated dynamic system even in a case where the amount of external disturbance is small.

Further, the present invention relates to a braking pressure estimation device which estimates master cylinder pressure, mean braking pressure, and a micro-vibration component in the braking pressure on the basis of wheel speed information and without use of a braking pressure sensor, by taking note of the gain characteristics of a wheel speed and the braking pressure in a case where the braking pressure is minutely vibrated at a resonance frequency of a vibration system comprised of a vehicle body, a wheel, and a road surface. Still further, the present invention relates to an anti-lock brake controller which employs the braking pressure estimation device, as well as to a braking pressure controller capable of continually controlling braking pressure in a smooth manner.

2. Related Art (Conventional Apparatus for Diagnosing a Dynamic System)

Japanese Patent Application Laid-open (JP-A) No. 7-98268 describes the following technique as an apparatus for diagnosing a dynamic system.

In the technique disclosed in the foregoing unexamined patent application, a total disturbance vector—which is the sum of an external disturbance vector exerted on a dynamic system from outside and an internal disturbance vector caused by a fault in the dynamic system—is estimated on the basis of a response output vector from the dynamic system. Further, an internal state quantity vector of the dynamic system is estimated. A component relevant to internal disturbance is separated from the total disturbance vector by calculation of the correlation between the thus-estimated total disturbance vector and the internal state quantity vector. Then, a part of the dynamic system corresponding to the thus-separated component relevant to the internal disturbance is specified as a fault.

The foregoing technique enables location of an area of the dynamic system to be examined through use of one observer, as well as estimation of the absence or presence of a fault in the area and the degree of the fault. As contrasted with a conventional generalized likelihood comparison test method, there is no need for this technique to examine a plurality of areas through use of a plurality of observers disposed so as to correspond to the areas, and hence the technique has an advantage of being capable of accurately sensing a fault with few calculations.

(Conventional Braking Pressure Estimation Device, Anti-lock Brake Controller Utilizing the Braking Pressure Estimation Device)

With regard to a device which controls the braking force of wheels such as an anti-lock brake controller (hereinafter referred to as an ABS controller), the sensing of braking pressure is an important problem, and a higher degree of control of the braking pressure can be expected if the value of the braking pressure is known. As a method for sensing the braking pressure, there is a method of attaching pressure sensors comprising a semiconductor device or the like to each wheel cylinder. However, the pressure sensors are comparatively expensive, and attachment of the pressure sensors to each wheel cylinders is difficult in terms of cost.

To overcome such a difficulty, there has already been proposed a technique of estimating the wheel cylinder pressure of each wheel on the basis of the result of measurement of the pressure sensor attached to the master cylinder pressure. Japanese Patent Application Laid-open (JP-A) No. 7-186918 describes a braking pressure controller which employs a method of calculating the wheel cylinder pressure of each wheel from a measured supply pressure (e.g., master cylinder pressure) and the time period over which a valve is actuated. This method enables the estimation of the wheel cylinder pressure of each wheel solely by sensing the pressure of the master cylinder through use of one pressure sensor, thereby rendering the braking pressure controller advantageous in terms of cost.

However, in many widely-available ABS controllers, a pressure sensor is not attached even to the master cylinder. Therefore, even the foregoing wheel cylinder estimation technique that requires the attachment of a pressure sensor to only the master cylinder still adds to the cost. Further, there is needed a remedy for sensor failures in order to ensure the reliability of the pressure sensor, which also adds to the cost.

Japanese Patent Application Laid-open (JP-A) No. 6-286590 describes a method of estimating master cylinder pressure without use of a pressure sensor.

The technique described in the foregoing patent application discloses the following three methods for estimating master cylinder pressure.

(1) Assuming that there is a uniform increase in the master cylinder pressure as a result of a first reduction in hydraulic braking pressure, a variation $\Delta Pm$ (constant) in the master cylinder pressure is calculated. The master cylinder pressure is corrected through use of the thus—calculated variation $\Delta Pm$.

(2) By utilization of a tendency for the variation in the master cylinder pressure to increase in accordance with a variation $\Delta S$ in slip rate so long as the value of the master cylinder pressure is large, the variation $\Delta Pm$ in the master cylinder pressure is calculated from the variation in the slip rate. Accordingly, as contrasted with the method described in (1) which is based on the assumption that the variation in the master cylinder pressure is constant, degree of accuracy of estimation is improved.

(3) The variation $\Delta Pm$ in the master cylinder is calculated from a variation $\Delta V'_{w0}$ in vehicle acceleration and the variation $\Delta S$ in the slip rate. The use of the variation $\Delta V'_{w0}$ in vehicle acceleration enables correction of the master cylinder pressure, even when slippage of wheels due to speed reduction has not yet occurred and therefore the master cylinder pressure $Pm$ is low. Accordingly, as contrasted with the method described in (2), this method further improves the accuracy of estimation of master cylinder pressure.

(Conventional Hydraulic Braking Pressure Controller)

For an apparatus such as an ABS controller in which the braking force applied to the vehicle is controlled by the hydraulic pressure of the wheel cylinder, not only a reduction in the hydraulic braking pressure at the time of wheel lock, but also smooth continuous control of the hydraulic braking pressure is important.

The hydraulic braking pressure is controlled by pressure increase and decrease valves (such as those disposed in an ABS actuator shown in FIGS. 23A and 23B) that are controllable from outside by means of an electrical signal, or the like, and are interposed between the master cylinder—whose pressure is related to the depression of a brake pedal given by the driver—and the wheel cylinders which produce pressure for pressing brake pads; i.e., the actual braking force of the vehicle.

Under normal conditions, the pressure in the master cylinder is directly transmitted to the hydraulic pressure in the wheel cylinders by opening the pressure increase valves of the ABS actuator shown in FIGS. 23A and 23B, as well as by closing the pressure decrease valves of the same. If the hydraulic pressure in the wheel cylinders is excessively high, there is established a state (a pressure decrease mode) in which the pressure increase valve is closed and the pressure decrease valve is opened so that the pressure from the master cylinder is prevented from being transmitted to the wheel cylinders while the hydraulic pressure in the wheel cylinders is released to a reservoir tank. In order to allow the hydraulic pressure in the wheel cylinders to recover from the pressure-reduced state, there is established a state (a pressure hold mode) in which both the pressure increasing and reducing valves are closed to prevent the hydraulic pressure in the wheel cylinders from changing; a state (a pressure increase mode) in which only the pressure increase valve is opened to allow the master cylinder pressure to be directly transmitted to the wheel cylinders is inserted over a short period of time; and the time period of the pressure increase mode is gradually increased.

In an actual ABS control operation, if wheel lock is detected, the hydraulic pressure in the wheel cylinders is abruptly reduced through the pressure decrease mode which is continued for a comparatively long period of time. Subsequently, the hydraulic pressure is rather gradually increased by repeating the pressure hold mode and pressure increase mode. If wheel lock arises again during the course of an increase in the hydraulic pressure, the valve is controlled in the pressure decrease mode to thereby abruptly decrease the hydraulic pressure in the wheel cylinders. Subsequently, the operation mode is shifted to the pressure hold mode and the pressure increase mode.

For example, in the technique disclosed in Japanese Patent Application Laid-open (JP-A) No. 3-118263, for each pressure increase and reduction area, the pulse train pattern is switched through use of a plurality of maps as well as the relationship between wheel speed, acceleration/deceleration, and separately-determined target speed, as shown in FIGS. 24A and 24B.

Further, Japanese Patent Application Laid-open (JP-A) No. 8-34329 describes a technique of controlling mean hydraulic braking pressure on the basis of the operation frequency of a valve and a duty ratio between a pressure increase mode and a pressure decrease mode through use of a valve having only a pressure increase mode and a pressure decrease mode. This technique principally implements the pressure hold mode of a hydraulic braking pressure by actuating a valve at a comparatively high frequency through use of only the valve having a pressure increase mode and a pressure decrease mode. Further, the amplitude of micro-vibrations in the hydraulic braking pressure is controlled by changing the operation frequency of the valve.

In the foregoing technique described in Japanese Patent Application Laid-open (JP-A) No. 7-98268, a total disturbance vector of a dynamic system is estimated on the basis of a response output from the dynamic system stemming from the disturbance outside the dynamic system. For example, in a dynamic system comprising a suspension system and a wheel, the external disturbance exerted on wheels traveling on an a rough road surface is utilized as an input. Accordingly, in a case where the input stemming from the external disturbance is small such as that obtained when the wheels travel on a smooth road surface, the response output becomes small. Therefore, even if the output value is normalized, the accuracy of sensing of a fault or the accuracy of estimation of air pressure in the tire is reduced by a quantization error or the like.

In a case where the mean value of external disturbance obtained during a given period of time is zero or nearly zero, the foregoing conventional technique enables highly accurate separation of the component which is relevant to an internal disturbance vector and stems from a fault from a total disturbance vector. However, the statistical property of the external disturbance differs according to the state of a road surface, and sometimes the internal disturbance vector cannot be very accurately isolated.

Further, even in the case of the method (3) having the highest degree of accuracy among the techniques described in Japanese Patent Application (JP-A) No. 6-286590, since the method employs the variation $\Delta S$ in the slip rate, the relationship between the variation $\Delta S$ in the slip rate and the variation $\Delta Pm$ in the master cylinder pressure changes as a result of a variation in the coefficient of friction $\mu$ between the tire and the road surface. The calculation of the variation $\Delta Pm$ in the master cylinder pressure through use of a constant coefficient results in a reduction in the accuracy of estimation according to the state of the road surface.

In the conventional technique described in Japanese Patent Application Laid-open (JP-A) No. 3-118263, the hydraulic braking pressure is controlled by switching the pulse train pattern between the patterns shown in FIGS. 24A and 24B. For this reason, as shown in FIG. 24C, a vibration arises in the hydraulic pressure in the wheel cylinders at a comparatively low frequency (several hertz). This vibration imparts to the driver's pedal an unpleasant low frequency vibration called kickback and results in a great variation in vehicle behavior at a comparatively low frequency. As a result, the hydraulic braking pressure cannot be controlled smoothly.

The technique described in Japanese Patent Application Laid-open (JP-A) No. 8-34329 cannot be applied to the anti-lock brake control operation described in Japanese Patent Application Laid-open (JP-A) No. 7-220920 which utilizes the fact that the resonance characteristics of the resonance system comprised of a vehicle body, a wheel, and a road surface change according to the state of grip of the wheel on the road surface, because it is impossible to change the frequency of vibration at the resonance frequency of the system.

SUMMARY OF THE INVENTION

The present invention has been contrived in view of the aforementioned drawbacks, and an object of the present invention is to provide a diagnostic apparatus for a dynamic system which is capable of constantly sensing a fault highly accurately even in a case where there is a small amount of disturbance and of highly accurately diagnosing the air pressure in the tire or the conditions of elements around the tire irrespective of the state of a road surface.

Another object of the present invention is to provide a braking pressure estimation device capable of stably estimating braking pressure highly accurately irrespective of the state of a road surface and without use of a pressure sensor, as well as an anti-lock brake controller which uses this braking pressure estimation device.

Still another object of the present invention is to provide a braking pressure controller which reduces unpleasant vibration felt by the driver or a variation in vehicle behavior by continuously controlling a hydraulic braking pressure in a smooth manner.

To accomplish the aforementioned objects, in accordance with a first aspect of the present invention, there is provided a diagnostic apparatus for a dynamic system to detect a fault in the dynamic system, comprising: vibration means for vibrating the dynamic system through use of a vibration signal unrelated to an internal state quantity vector of the dynamic system; disturbance estimating means for estimating a total disturbance vector which is the sum of an internal disturbance vector stemming from a fault in the dynamic system and a vibration disturbance vector occurring in the dynamic system as a result of vibration; correlation calculation means which calculates the correlation between the total disturbance vector and the internal state quantity vector and isolates a component relevant to internal disturbance from the total disturbance vector; and diagnostic means for diagnosing a fault in the dynamic system on the basis of the component relevant to the internal disturbance which is separated by the correlation calculation means.

The vibration means is capable of vibrating the dynamic system by use of a white signal (e.g., a so-called M-series signal) or a signal whose frequency is shifted (e.g., a signal which is shifted from a low frequency to a high frequency) as the vibration signal irrelevant to the internal state quantity vector of the dynamic system.

FIG. 1 shows the configuration of one example of the dynamic system diagnostic apparatus according to the present invention. A controller 12 also serving as an vibrator for vibrating the dynamic system inputs, as a control input 14, a signal (u+Δu)—which is a sum of a control signal "u" for controlling the dynamic system 10 to a certain internal state and an vibration signal Δu for vibrating the dynamic system 10—to the dynamic system 10 to be diagnosed by a diagnostic apparatus 30.

The internal state of the dynamic system 10 changes in accordance with the control signal "u" contained in the control input 14, so that a control output 16 changes. Further, the dynamic system 10 is vibrated in the vicinity of the established internal state. In the example shown in FIG. 1, the controller 12 controls the dynamic system 10 through use of the control output 16 as a feedback signal.

The controller 12 may be designed such that when the control output 16 is small, the controller 12 commences vibration control by means of the vibration signal Δu or increases the vibration signal Δu in order to increase the amplitude of vibration of the dynamic system, and that when the control output 16 is large because of great external disturbance, the controller 12 terminates vibration control by means of the vibration signal Δu.

In FIG. 1, the dynamic system 10 has "n" internal state quantities (i.e., the degree of the dynamic system is "n"), and the foregoing control signal "u" represents a control input vector 14 which comprises "m" elements and is sent to the dynamic system 10. Reference symbol "y" represents a control output vector 16 which is output from the dynamic system 10 and comprises "p" elements. Further, reference symbol "d" represents an vibration disturbance vector 15 of the dynamic system 10 which is caused by vibration by the vibration signal Δu in the vicinity of the controlled internal state.

Since the control input vector 14 has "m" elements, the dynamic system 10 is usually constructed in such a way that the vibration signal Δu also comprises "m" elements. With such a configuration, the number of elements contained in the vibration disturbance vector 15 also becomes equal to "m." In order to highly accurately detect all faults in the dynamic system, the vibrator is desirably constructed in such a way that the vibration disturbance vector 15 comprises "n" elements which are equal in degree to the internal state quantity vector of the dynamic system 10.

As a result of such a configuration of the vibrator, the vibration disturbance vector 15 affects the dynamic system in the same way as does the vibration disturbance vector when the external disturbance having degree "n" is applied to the dynamic system 10. Even in a case where there is a small degree of external disturbance or no external disturbance at all, faults can be highly accurately detected by increasing a control output from the dynamic system.

The diagnostic apparatus 30 according to the present invention comprises disturbance estimating means 32, correlation calculation means 34, and diagnostic means 36 and is constructed so as to detect a fault in the dynamic system 10 as internal disturbance.

The disturbance estimating means 32 is constructed so as to estimate a total disturbance vector "w," which is a sum of an vibration disturbance vector "d" and an internal disturbance vector of the dynamic system 10, on the basis of at least the internal state quantity vector of the dynamic system 10 (i.e., a vector comprising various elements representing the internal state quantity of the dynamic system 10), as well as to output the thus-estimated total disturbance vector "w" to the correlation calculation means 34.

In FIG. 1, a control output vector "y" from the dynamic system 10 is input to the disturbance estimating means 32. The disturbance estimating means 32 estimates and calculates an internal state quantity vector "x" of the dynamic system 10 from the control output vector "y" and outputs the thus-calculated internal state quantity vector "x" to the correlation calculation means 34. The estimation and calculation of the internal state quantity vector "x" can be carried out in a case where the control output vector "y" comprises information which enables calculation of elements of the internal state quantity vector "x." The estimation and calculation of the internal state quantity vector "x" are carried out at the same time the total disturbance vector "w" is estimated. More specifically, a new internal state quantity comprising the total disturbance vector "w" and the state quantity vector "x" shown in Equation (4b), which will be described later, is calculated according to a conventional linear control theory (e.g., "Basic System Theory" by Furuta and Sano, Corona Co., Ltd., 1978, pp. 127 to 137).

If the amount of information contained in the control output vector "y" is insufficient for estimating the internal state quantity vector "x," it is desired that a sensor for sensing the internal state quantity be provided in the dynamic system 10, as required, and an output from the sensor be input to the disturbance estimating means 32.

In a case where the information regarding the internal state quantity vector "x" can be directly determined from the control output vector "y" from the dynamic system 10 or the internal state quantity sensor provided, as required, in the dynamic system 10, it is desired that internal state quantity "x" be directly output to the correlation calculation means 34.

The correlation calculation means 34 calculates the correlation between the elements of the estimated total disturbance vector "w" and the elements of the internal state quantity vector "x" and separates the component relevant to internal disturbance from the elements of the total disturbance vector "w." The thus-separated component relevant to the internal disturbance is output to the diagnostic means 36.

The diagnostic means 36 is formed so as to localize the areas of the dynamic system 10 to be examined on the basis of the thus-separated component relevant to internal disturbance and to determine the state of these areas.

Preferably, the correlation estimating means 34 is formed so as to calculate the correlation corresponding to a plurality of elements of the total disturbance vector "w" and to separate the component relevant to internal disturbance from the plurality of elements of the total disturbance vector "w."

The elements of the thus-separated component relevant to internal disturbance correspond to the faults occurred in the dynamic system 10. For this reason, on the basis of the elements of the thus-separated component relevant to the internal disturbance, the diagnostic means 36 is capable of detecting and locating a fault in the dynamic system 10.

In such a case, preferably, the diagnostic means 36 is formed so as to comprise a memory section 40—in which are previously stored reference values for diagnosis purposes corresponding to the respective elements of the component relevant to internal disturbance—and a fault locating section 38 which locates a fault in the dynamic system 10 by comparing the elements of the separated component relevant to internal disturbance with the corresponding reference value.

In a case where the controller 12 controls neither vibration in accordance with the control output 16 nor the dynamic system, the diagnostic apparatus can be formed with a configuration such as that shown in FIG. 2. More specifically, an vibrater 13 which serves solely as vibration means is provided in place of the controller 12, and the disturbance estimating means 32 estimates a total disturbance vector on the basis of the control output 16.

The dynamic system diagnostic apparatus according to the present invention has the foregoing configuration, and its operation will now be described.

First, the disturbance estimating means 32 will be described.

If a fault arises in the dynamic system 10 to be examined, the internal state quantity of the dynamic system 10 shows a response differing from that which is output when the dynamic system 10 is in a normal condition. In a sense, such a response can be considered to be a sum of a response output in answer to vibration disturbance in a normal condition and a certain type of disturbance corresponding to the fault. The disturbance is not exerted to the dynamic system 10 from outside but occurs in the dynamic system 10. The disturbance estimating means 32 estimates the response as total disturbance vector "w," which is a sum of the internal disturbance stemming from the fault and the vibration disturbance.

The principle of estimation of disturbance by the disturbance estimating means 32 will now be described. The following description is based on the assumption that external disturbance is considerably smaller than vibration disturbance or does not exist at all.

First, presume that the dynamic system 10 is represented by the following equation of state.

$$x(t)=Ax(t)+Bu(t)+d(t)$$

$$y(t)=Cx(t) \quad (1)$$

Here, x(t) represents an internal state quantity vector of the dynamic system 10 to be examined; u(t) represents a control input vector; y(t) represents a control output vector; and d(t) represents a pure vibration disturbance vector because it ignores external disturbance. Further, matrices A, B, and C represent matrices of constants determined by the structure of the dynamic system 10 to be examined (i.e., parameters of a system constituting the dynamic system to be examined).

The vibration disturbance vector d(t) is related to an vibration input vector $\Delta u(t)$ by the following equation.

$$d(t)=B \cdot \Delta u(t)$$

Equation (1) is expressed as $$\frac{d}{dT}\begin{bmatrix} x_1 \\ x_2 \\ \vdots \\ \vdots \\ x_n \end{bmatrix} = \begin{bmatrix} a_{11} & a_{12} & \cdots & a_{1n} \\ a_{21} & a_{22} & \cdots & a_{2n} \\ \vdots & & & \vdots \\ \vdots & & & \vdots \\ a_{n1} & a_{n2} & \cdots & a_{nn} \end{bmatrix}\begin{bmatrix} x_1 \\ x_2 \\ \vdots \\ \vdots \\ x_n \end{bmatrix} + \begin{bmatrix} b_{11} & b_{12} & \cdots & b_{1m} \\ b_{21} & b_{22} & \cdots & b_{2m} \\ \vdots & & & \vdots \\ \vdots & & & \vdots \\ b_{n1} & b_{n2} & \cdots & b_{nm} \end{bmatrix}\begin{bmatrix} u_1 \\ u_2 \\ \vdots \\ \vdots \\ u_m \end{bmatrix} + \begin{bmatrix} d_1 \\ d_2 \\ \vdots \\ \vdots \\ d_n \end{bmatrix}\begin{bmatrix} y_1 \\ y_2 \\ \vdots \\ \vdots \\ y_p \end{bmatrix} = \begin{bmatrix} c_{11} & c_{12} & \cdots & c_{1n} \\ c_{21} & c_{22} & \cdots & c_{2n} \\ \vdots & & & \vdots \\ \vdots & & & \vdots \\ c_{p1} & c_{p2} & \cdots & c_{cpn} \end{bmatrix}\begin{bmatrix} x_1 \\ x_2 \\ \vdots \\ \vdots \\ x_n \end{bmatrix}$$

The dynamic system 10 to be examined when it is in an anomalous condition can be equivalently expressed through use of variations in matrices A and B (or variations in the parameters). More specifically, given that the matrix A is changed by $\Delta A(t)$ and the matrix B is changed by $\Delta B(t)$ due to a fault, the object to be examined, or the dynamic system 10, with a fault can be expressed as follows:

$$x(t)=Ax(t)+Bu(t)+\{\Delta A(t) \times (t)+\Delta B(t)u(t)+d(t)\}$$

$$=Ax(t)+Bu(t)+Dw(t) \quad (2)$$

where Dw(t) is represented by the following expression.

$$Dw(t)=\Delta A(t) \times (t)+\Delta B(t)u(t)+d(t) \quad (3)$$

where the matrix D represents in which of channels of the dynamic system 10 disturbance arises as a result of a fault. The matrix D is set so as to correspond to the channel in which vibration disturbance enters and to an estimated fault.

If there are changes in the matrices A and B as a result of a fault, the vibration disturbance d(t) is given by the following expression.

$$d(t)=B \cdot \Delta u(t)+\Delta B \cdot \Delta u(t)$$

More specifically, the vibration disturbance d(t) comprises a component $\Delta B \cdot \Delta u(t)$ newly developed as a result of the fault. In terms of diagnosis accuracy, the vibration disturbance d(t) is desirably irrelevant to the influence of the fault. Therefore, the vibration input $\Delta u(t)$ is made as micro as possible—in which case the term of $\Delta B \cdot \Delta u(t)$ can be ignored—within the range in which the control output "y" is not reduced smaller than a predetermined value.

If Δu can be observed, u+Δu can be handled as an input for the dynamic system 10. Consequently, vibration input is not required to become micro to such an extent that it can be ignored. In this case, d(t) is external disturbance alone.

Equations (2) and (3) are represented as the following equation by a general matrix.

$$\frac{d}{dt}\begin{bmatrix} x_1 \\ x_2 \\ \vdots \\ \vdots \\ x_n \end{bmatrix} = \begin{bmatrix} a_{11} & a_{12} & \cdots & a_{1n} \\ a_{21} & a_{22} & \cdots & a_{2n} \\ \vdots & & & \vdots \\ \vdots & & & \vdots \\ a_{n1} & a_{n2} & \cdots & a_{nn} \end{bmatrix} \begin{bmatrix} x_1 \\ x_2 \\ \vdots \\ \vdots \\ x_n \end{bmatrix} + \begin{bmatrix} b_{11} & b_{12} & \cdots & b_{1m} \\ b_{21} & b_{22} & \cdots & b_{2m} \\ \vdots & & & \vdots \\ \vdots & & & \vdots \\ b_{n1} & b_{n2} & \cdots & b_{nm} \end{bmatrix} \begin{bmatrix} u_1 \\ u_2 \\ \vdots \\ \vdots \\ u_m \end{bmatrix}$$

$$+ \begin{bmatrix} \Delta a_{11} & \Delta a_{12} & \cdots & \Delta a_{1n} \\ \Delta a_{21} & \Delta a_{22} & \cdots & \Delta a_{2n} \\ \vdots & & & \vdots \\ \Delta a_{n1} & \Delta a_{n2} & \cdots & \Delta a_{nn} \end{bmatrix} \begin{bmatrix} x_1 \\ x_2 \\ \vdots \\ x_n \end{bmatrix}$$

$$+ \begin{bmatrix} \Delta b_{11} & \Delta b_{12} & \cdots & Hb_{1m} \\ \Delta b_{21} & \Delta b_{22} & \cdots & \Delta b_{2m} \\ \vdots & & & \vdots \\ \Delta b_{n1} & \Delta b_{n2} & \cdots & \Delta b_{nm} \end{bmatrix} \begin{bmatrix} u_1 \\ u_2 \\ \vdots \\ u_m \end{bmatrix}$$

$$+ \begin{bmatrix} d_1 \\ d_2 \\ \vdots \\ \vdots \\ d_n \end{bmatrix} = \begin{bmatrix} a_{11} & a_{12} & \cdots & a_{1n} \\ a_{21} & a_{22} & \cdots & a_{2n} \\ \vdots & & & \vdots \\ \vdots & & & \vdots \\ a_{n1} & a_{n2} & \cdots & a_{nn} \end{bmatrix} \begin{bmatrix} x_1 \\ x_2 \\ \vdots \\ \vdots \\ x_n \end{bmatrix}$$

$$+ \begin{bmatrix} b_{11} & b_{12} & \cdots & b_{1m} \\ b_{21} & b_{22} & \cdots & b_{2m} \\ \vdots & & & \vdots \\ b_{n1} & b_{n2} & \cdots & b_{nm} \end{bmatrix} \begin{bmatrix} u_1 \\ u_2 \\ \vdots \\ u_m \end{bmatrix} + D \begin{bmatrix} w_1 \\ w_2 \\ \vdots \\ w_n \end{bmatrix}$$

In this way, the response of state vector from the dynamic system 10 to be examined in a faulty condition can be represented by the sum of a response {Ax(t)+Bu(t)} from the dynamic system 10 in a normal condition and disturbance {Dw(t)}. The disturbance estimating means 32 is configured so as to estimate the disturbance Dw(t).

The disturbance is estimated in the following way.

In a first step, there is formed an extended system of the dynamic system 10 which includes disturbance w(t) in the state thereof. To this end, the following supposition is made with respect to the disturbance w(t), and the disturbance w(t) is added to the state of the dynamic system 10.

$$\dot{w}(t) = 0 \tag{4}$$

As a result, the extended system of the dynamic system which includes the disturbance w(t) is written as follows;

$$\frac{d}{dt}\begin{bmatrix} x \\ w \end{bmatrix} = \begin{bmatrix} A & D \\ 0 & 0 \end{bmatrix} \begin{bmatrix} x \\ w \end{bmatrix} + \begin{bmatrix} B \\ 0 \end{bmatrix} u \tag{4b}$$

$$y = [C \ 0]\begin{bmatrix} x \\ w \end{bmatrix}$$

In a second step, the state represented by [xTwT]T in Equation (4b) is estimated and calculated through use of a conventional linear control theory.

As shown in FIG. 5, the supposition of Equation (4) signifies that disturbance 100 which originally changes continually is approximated such that it changes stepwise as indicted by 110 in FIG. 5. The accuracy of approximation of disturbance improves as the width of each step becomes narrower. The width of the step corresponds to the time period over which the disturbance estimating means 32 estimates disturbance. In practice, the time period over which the disturbance estimating means 32 estimates disturbance can be reduced to a very short period of time compared with the speed at which the disturbance changes. Accordingly, the approximation of disturbance is sufficiently practicable.

In this way, so long as the extended system can be observed, the disturbance estimating means 32 can estimate an unmeasurable state and the disturbance corresponding to a fault, even in a case where the entire state of the dynamic system to be examined cannot be measured.

Next, the correlation calculation means 34 will be described.

As previously described, the total disturbance vector w(t) estimated by the disturbance estimating means 32 is a combination of the internal disturbance caused by a fault in the dynamic system 10 and vibration disturbance "d" occurring in the dynamic system 10 as a result of vibration regardless of whether the dynamic system 10 is in a normal or anomalous condition.

The vibration disturbance "d" is a vibration caused by a signal irrelevant to the internal state quantity vector and has the feature that a mean value obtained by averaging the vibration disturbance over a given period of time becomes zero when the dynamic system is vibrated through use of a white signal. In consideration of this feature, calculation is performed in the present invention in order to separate from the estimated total disturbance w(t) a component which is relevant to internal disturbance (i.e., variable components ΔA and ΔB of the parameters) and stems from a fault. A representative method of such a calculation is the least square method.

First, the following expression is defined by Equation (3).

$$\theta^T = [\Delta A \Delta B], \; \zeta^T = [X^T U^T] \tag{5}$$

$\dot{\theta}$ which minimizes the following equation $$J(\hat{\theta}) = \sum_{K=1}^{N} \left( \hat{\theta}^T \zeta(k) - D\hat{w}(k) \right)^2 \tag{6}$$

is calculated from N data items through use of the least square method. Such $\dot{\theta}$ is obtained by partially differentiating Equation (6) with $\dot{\theta}$ and by taking the thus-obtained equation as zero, and is expressed as $$\hat{\theta} = \left\{ \sum_{K=1}^{N} \zeta(k)\zeta^T(k) \right\}^{-1} \left\{ \sum_{K=1}^{N} \zeta(k)D\hat{w}(k) \right\} \quad (7)$$

Further, if Equation (7) is transformed to a recurrence formula, the formula will be written as $$\Gamma(N) = \Gamma(N-1) - \{\Gamma(N-1)\zeta(N)\Gamma(N-1)\}/\{1 + \zeta^T(N)\Gamma(N-1)\zeta(N)\}$$

$$\theta(N) = \hat{\theta}(N-1) - \{\Gamma(N-1)\zeta(N)\}/\{1+\zeta^T(N)\Gamma(N-1)\zeta(N)\} \cdot e(N)$$

where $e(N) = \zeta^T(N)\hat{\theta}(N-1) - D\hat{w}(N)$; $\hat{\theta}$ corresponds to a directional vector; and $\zeta$ corresponds to a basis vector. As a result, the variable components $\Delta A$ and $\Delta B$ of the parameters can be sequentially estimated.

Next, a specific example of calculation of correlation is explained with reference to a case where there is no correlation between the vector $\zeta$ and the elements. In this case, the component relevant to internal disturbance can be separated from the total disturbance w(t) by calculating the correlation between the total disturbance w(t) and the internal state quantity x(t) irrelevant to vibration disturbance.

For example, the i-th element of an estimated value of the disturbance vector w(t) is represented by the following equation.

$$\hat{W}_i = \Delta a_{i1}X_1 + \Delta a_{i2}X_2 + \ldots + \Delta b_{i1}U_1 + \ldots + d_i \quad (8)$$

where $\hat{W}_i$ represents an estimated value of disturbance $w_i$.

As is evident from Equation (8), the i-th element of the estimated disturbance is a linear combination of a quantity $\Delta a_{ij}$ representing a fault in the dynamic system 10 and elements x1, x2 ... of the internal state quantity vector x(t).

In order to determine the quantity of the fault from the i-th element of the estimated disturbance, the cross-correlation between the i-th element of the estimated disturbance and the internal state quantity of the dynamic system 10 is calculated. At this time, the internal state quantity of the dynamic system used for calculation of the cross-correlation may be a value directly measured by a sensor, or the like, provided in the dynamic system 10 or, as previously described, a value estimated by the disturbance estimating means 32.

First, an explanation will be given of the calculation of a cross-correlation function between the i-th element of the estimated disturbance and the j-th element xj of the internal state quantity vector "x" represented by Equation (8). The cross-correlation function is defined by the following formula.

$$C(\hat{W}_i, x_j) \underline{\Delta} Cij = \Delta aij vi$$

As previously mentioned, this description is based on the assumption that there is no correlation between the elements of the vibration disturbance vector d(t) and the elements of the internal state quantity vector x.

The cross-correlation function and the autocorrelation function are represented by the following formulae.

$$C(\hat{w}_i, x_j) = \frac{1}{N} \sum_{k=1}^{N} (\hat{w}_i - \overline{\hat{w}_i})(x_j, \overline{x}_j) \quad (9)$$

$$V_{zj} = \frac{1}{N} \sum_{k=1}^{N} (x_j, \overline{x}_j)^2$$

The values used in Equation (9) are represented by the following formulae.

$$\overline{\hat{w}}_i = \frac{1}{N} \sum_{k=1}^{N} \hat{w}_i$$

$$\overline{X}_j = \frac{1}{N} \sum_{k=1}^{N} X_j$$

The calculation which employs Equation (8) is based on the assumption that the internal state quantity xj is directly measured through use of a sensor, or the like. In contrast, in a case where the internal state quantity xj is not directly measured, a cross-correlation function is desirably calculated from the value estimated by the disturbance estimating means 32 by the following equation.

$$C(\hat{w}_i, x_j) = \frac{1}{N} \sum_{k=1}^{N} (\hat{w}_i - \overline{\hat{w}_i})(\hat{x}_j, \overline{\hat{x}}_j) \quad (10)$$

where $\hat{x}_j$ represents an estimated value of $x_j$.

$$\overline{\hat{w}}_j = \frac{1}{N} \sum_{k=1}^{N} \hat{w}_j \quad (11)$$

$$\overline{\hat{x}}_j = \frac{1}{N} \sum_{k=1}^{N} \hat{x}_j$$

The disturbance estimating means 32 is capable of estimating the internal state quantity xj of the dynamic system 10 without errors regardless of the existence of a fault, external disturbance, or vibration disturbance. Consequently, even in a case where the cross-correlation function as represented by Equations (10) and (11) is used, there can be obtained a result which is substantially the same as that obtained by use of the directly-measured internal state of the dynamic system.

Next, the diagnostic means 36 will be described.

The diagnostic means 36 detects a fault and localizes the position of the fault by means of the correlation function Cij which is calculated by the correlation calculation means 34 and represents a component relevant to internal disturbance. More specifically, the diagnostic means 36 can detect a variable component $\Delta a_{ji}$ of the parameter by dividing the correlation function Cij by the autocorrelation vxj of the state to thereby normalize the correlation function Cij. This is expressed as follows:

$$\Delta a_{ij} = \frac{\sum_{k=1}^{N} (\hat{w}_i - \overline{\hat{w}}_i)(\hat{x}_j, \overline{\hat{x}}_j)}{\sum_{k=1}^{N} (x_j - \overline{x}_j)^2}$$

When the mean value is taken as zero, the above formula becomes equivalent to Equation (7), which is based on the assumption that there is no correlation between elements of the vector ζ.

For example, the dynamic system 10 to be examined comprises constituent element I and constituent element II. It is assumed that the parameter expressing the constituent element I is provided at the first row-first column position of the matrix A of the dynamic system expressed by the equation of state (1), and that the parameters expressing the constituent element II is provided at the first row-first column position and the first row-second column position of the matrix A. At this time, if the correlation function C12, or Δa12, takes on any value, it is immediately determined that a fault is present in the constituent element II. If the correlation function C12 takes on no value, and the function C11, or Δa11, takes on any value, it is determined that a fault is present in the constituent element I.

As described above, according to the present invention, a fault occurring in any of the constituent elements constituting the dynamic system 10 is reliably detected, and the location of the fault can be correctly detected.

For a conventional technique for calculating a quantity corresponding to a fault from a residual between a state estimated by an observer and a directly measured state, it is impossible to localize the fault by means of a simple calculation such as the calculation of a correlation, because the relationship between the residual and the fault is not simple (i.e., the relationship cannot be represented by a simple equation such as Equation (8)).

According to the design of the disturbance estimating means 32, the present invention may take the following modes.

In a first mode, the entire internal state quantity x(t) of the dynamic system 10 can be measured through use of a sensor, or the like, and the disturbance estimating means 32 is formed so as to estimate only the total disturbance vector w(t). In this case, the degree of the disturbance estimating means 32 is required to correspond only to the degree of disturbance, and hence the disturbance estimating means 32 has the advantages of simple configuration and the highest degree of fault detection.

In a second mode, there may be a case where the internal state quantity x(t) of the dynamic system 10 can be partially measured or can be estimated by the disturbance estimating means without measurement. In such a case, the disturbance estimating means 32 is formed so as to estimate and calculate the total disturbance vector w(t) and the internal state quantity which cannot be measured or is not measured.

In this case, there is no need to measure a part of the internal state quantity of the dynamic system 10, thereby eliminating need for the sensor. The disturbance estimating means 32 estimates the internal state quantity which cannot be measured, as well as the quantity of disturbance. By use of the thus-estimated quantity in the calculation of a correlation, a fault can be measured in substantially the same way where the entire internal state of the dynamic system 10 is measured.

A third mode is directed to a case where a part of the internal state quantity x(t) of the dynamic system 10 cannot be measured, and the disturbance estimating means 32 estimates and calculates the total disturbance vector w(t) and the entire internal state quantity x(t) including an unmeasurable internal state quantity.

Even in this case, as in the second mode, the sensor can be eliminated, and a fault can be localized in substantially the same way where the overall internal state quantity of the dynamic system 10 is measured.

This mode has an advantage that the design of the disturbance estimating means 32 is slightly simplified compared with that in the second mode.

The calculation required for the first through third modes will be described in detail. First, as previously described with reference to the first mode, the overall internal state quantity of the dynamic system 10 is measured.

In this case, a mean value of the disturbance vector defined by Equation (8) is expressed by the following equation.

$$\overline{\hat{w}}_i = \Delta a_{i1} \frac{1}{N} \sum_{k=1}^{N} x_i + \Delta a_{i2} \frac{1}{N} \sum_{k=1}^{N} x_2 + \ldots + \Delta b_{iI} \frac{1}{N} \sum_{k=1}^{1} u_1 + \ldots + \frac{1}{N} \sum_{k=1}^{1} d_1$$

$$= \Delta a_{iI} \overline{x}_1 + \Delta a_{i2} \overline{x}_2 + \ldots + \Delta b_{iI} \overline{u}_{iI} + \ldots + \overline{d}_1$$

Accordingly, in a case where the entire internal state quantity of the dynamic system can be measured, the cross-correlation function between the estimated disturbance vector and the internal state quantity xj is written as follows:

$$c(\hat{w}_i, x_j) = \frac{1}{N} \sum_{k=1}^{N} (\hat{w}_i - \overline{\hat{w}}_i)(x_j - \overline{x}_j) \quad (12)$$

$$= \Delta a_{iI} \frac{1}{N} \sum_{k=1}^{N} (x_1 - \overline{x}_1)(x_j - \overline{x}_j)$$

$$+ \Delta a_{i2} \frac{1}{N} \sum_{k=1}^{N} (x_2 - \overline{x}_2)(x_j - \overline{x}_j)$$

$$+ \ldots + \Delta a_{iI} \frac{1}{N} \sum_{k=1}^{N} (x_j - \overline{x}_j)(x_j - \overline{x}_j)$$

$$+ \ldots = \Delta b_{i2} \frac{1}{N} \sum_{k=1}^{N} (u_1 - \overline{u}_1)(x_j - \overline{x}_j)$$

$$+ \frac{1}{N} \sum_{k=1}^{N} (d_1 - \overline{d}_1)(x_j - \overline{x}_j)$$

Provided that no correlation exists between the quantities of state of the dynamic system, the terms included in Equation (12) are represented by the following formula.

$$\frac{1}{N} \sum_{k=1}^{N} (x_1 - \overline{x}_1)(x_j - \overline{x}_j) \cong 0$$

$$\frac{1}{N} \sum_{k=1}^{N} (x_2 - \overline{x}_2)(x_j - \overline{x}_j) \cong 0$$

$$\vdots$$

$$\frac{1}{N} \sum_{k=1}^{N} (x_j - \overline{x}_j)(x_j - \overline{x}_j) =$$

-continued $$\frac{1}{N}\sum_{k=1}^{N}(x_j-\overline{x}_j)^2\Delta V_{xj} \neq 0$$

Further, assuming that there is no correlation between the state of the dynamic system xj and the vibration disturbance, the following equation holds.

$$\frac{1}{N}\sum_{k=1}^{N}(d_1-\overline{d}_1)(x_j-\overline{x}_j) \cong 0$$

As a result, the value of the correlation function is finally expressed by the following equation.

$$C(w_i, x_i) \cong \Delta a_{ij}\frac{1}{N}\sum_{k=1}^{N}(x_j-\overline{x}_j)(x_j-\overline{x}_j) = \Delta a_{ij}V_{xj}$$

$$V_{xj} = \frac{1}{N}\sum_{k=1}^{N}(x_j-\overline{x}_j)^2$$

$$\overline{x}_j = \frac{1}{N}\sum_{k=1}^{N}x_j$$

As in the second and third modes, when the cross-correlation function is calculated from the value estimated by the disturbance estimating means 32, the calculation is expressed by the following formula.

$$c(\hat{w}_1, \hat{x}_j) = \frac{1}{N}\sum_{k=1}^{N}(\hat{w}_i - \overline{\hat{w}}_i)(\hat{x}_j - \overline{\hat{x}}_j)$$

$$= \Delta a_{i1}\frac{1}{N}\sum_{k=1}^{N}(x_1-\overline{x}_1)(\hat{x}_j - \overline{\hat{x}}_j)$$

$$+\Delta a_{i2}\frac{1}{2}\sum_{k=1}^{N}(\hat{x}_2-\overline{x}_2)(x_j-\hat{x}_j)\ldots$$

$$+\Delta a_{i1}\frac{1}{2}\sum_{k=1}^{N}(x_j-\overline{x}_j)(\hat{x}_j-\overline{\hat{x}})+\ldots$$

$$+\Delta b_{i1}\frac{1}{2}\sum_{k=1}^{N}(u_1-\overline{u}_1)(\hat{x}_j-\overline{\hat{x}}_j)+\ldots$$

$$+\frac{1}{N}\sum_{k=1}^{N}(d_1-\overline{d}_1)(\hat{x}_j-\overline{\hat{x}}_j)$$

Assuming that no correlation exists between the quantities of state of the dynamic system, the terms included in Equation (13) are represented as follows:

$$\frac{1}{N}\sum_{k=1}^{N}(x_1-\overline{x}_1)(\hat{x}_j-\overline{\hat{x}}_j) \cong 0$$

$$\frac{1}{N}\sum_{k=1}^{N}(x_2-\overline{x}_2)(\hat{x}_j-\overline{\hat{x}}_j) \cong 0$$

$$\vdots$$

$$\frac{1}{N}\sum_{k=1}^{N}(x_j-\overline{x}_j)(\hat{x}_j-\overline{\hat{x}}_j)\Delta V_{xj} \neq 0$$

-continued $$\vdots$$

$$\frac{1}{N}\sum_{k=1}^{N}(d_1-\overline{d}_1)(\hat{x}_j-\overline{\hat{x}}_j) \cong 0$$

Consequently, the value of the above correlation function is expressed by the following equation.

$$C(\hat{w}_{i1}, \hat{x}_j) \cong \Delta a_{ij}\frac{1}{N}\sum_{k=1}^{N}(x_j-\overline{x}_j)(\hat{x}_j-\overline{\hat{x}}_j)$$

$$= \Delta a_{ij}v_{zj}$$

$$v_{xj} = \frac{1}{N}\sum_{k=1}^{N}(x_j-\overline{x}_j)(\hat{x}_j-\overline{x}_j)$$

$$\overline{\hat{x}}_j = \frac{1}{N}\sum_{k=1}^{N}\hat{x}_j$$

Even by use of the thus-obtained correlation function, a fault and the location of the fault can be detected in a similar manner to that employed previously.

In a case where the control output becomes sufficiently large because of application of large external disturbance d', the controller 12 suspends the vibration control performed on the basis of the vibration signal Δu. In this case, a fault and the location of the fault can be detected solely by replacing the vibration disturbance "d" in the foregoing equation with external disturbance d'.

In the diagnosis based on the previously-described principle, the disturbance estimating means for estimating the disturbance stemming from a fault as one state is used as the fault detection means. As a result, there are no fault detection speed/fault detection sensitivity trade-offs, and hence the fault detection speed and the fault detection sensitivity are both remarkably improved. Further, there is no need to use a plurality of observers corresponding to the number of faults, and a fault in an object to be examined can be localized with a high degree of sensitivity without measuring the entire state of the object, as required.

Further, since the relationship between the estimated disturbance and the location of the fault can be expressed by simple numerical equations, the external disturbance can be easily separated from the internal disturbance stemming from a fault by executing a simple calculation such as the calculation of a correlation between the estimated disturbance and the internal state quantity of the object, thereby enabling localization of the fault.

In this case, the internal state quantity used for calculation of a correlation can be represented by not only the internal state quantity of the object directly measured solely by a sensor, but also the internal state quantity of the object estimated by the disturbance estimating means at the same time it estimates disturbance, as required. As a result, detailed detection of a fault becomes feasible even when the entire internal state quantity of the object is not measured.

(2) Invention Directed to a Tire Air-pressure Diagnostic Apparatus

[Description of the Invention]

Next, an explanation will be given of a case where the foregoing principle of the apparatus for diagnosing a dynamic system is applied to an apparatus for diagnosing the air pressure in the tire.

With reference to the previously-described dynamic system diagnostic apparatus shown in FIG. 1, the tire air-pressure diagnostic apparatus according to the present invention will be described in more detail.

In the present invention, the dynamic system 10 to be examined is a system comprising a suspension system and a wheel. If there are variations in the air pressure in a tire, the internal state quantity of the system differs from that obtained when the air pressure is normal. In a sense, the response output from the system when there are variations in the air pressure in the tire can be considered to be a sum of the response output from the system when the air pressure is normal and the internal disturbance corresponding to the variation in the air pressure. If this disturbance, or a total disturbance vector, is estimated by use of the disturbance estimating means 32, variations in the air pressure in the tire can be detected.

It is assumed that the dynamic system 10 comprising a suspension system and a wheel is expressed by the following equation of state. The following description is based on the assumption that the wheels receive a small degree of disturbance or no disturbance from the road surface. This situation corresponds to a case where the vehicle is traveling over a road in good condition.

$$X = Ax + Bu + d$$
$$y = Cx \qquad (14)$$

where reference symbol "x" represents an internal state quantity vector of the system 10; "u" represents a control input; and "y" represents a control output vector (an internal state quantity vector) directly detected by and output from the system 10. Further, reference symbol "d" represents vibration disturbance caused through vibration. Matrices A, B, C are matrices of constants determined by physical parameters of the system 10.

The vibration disturbance "d" is related to an vibration input Δu according to the following equation.

$$d = B \cdot \Delta u$$

Here, in a case where the suspension system is an active suspension system, the control input "u" can be handled as the quantity of actuation of the active suspension system. In this case, the quantity of actuation (u+Δu)—which is the sum of the quantity of actuation "u" and the quantity of vibrating actuation Δu for vibrating the active suspension system—is input to the active suspension system.

In other cases, the control input "u" can be handled as a mean braking force instruction sent to a control solenoid valve which applies braking force to the wheel cylinder of the wheel. In this case, an instruction (u+Δu)—which is the sum of a mean braking force instruction "U" and an vibration instruction Δu for vibrating the braking force—is input to a control solenoid valve. This method can be applied to both the active suspension system and a conventional passive suspension system.

As a matter of course, in the case of the active suspension system, the active suspension system and the braking force can be vibrated at the same time.

FIG. 3 shows the configuration of the tire air-pressure diagnostic apparatus in a case where vibration is controlled by means of braking force.

The tire air-pressure diagnostic apparatus shown in FIG. 3 is equipped with a braking force controlling means 190—which controls the braking force exerted on wheels—in lieu of the controller 12 shown in FIG. 1. The braking force control means 190 applies mean braking force Pm to the wheels in response to the braking force instruction "u," as well as minutely vibrated braking force Pv to the wheels in response to a micro-vibration braking force instruction Δu which is irrelevant to the internal state quantity of the system 10. As a result, the braking force is minutely vibrated to the braking force Pv in the vicinity of the mean braking force Pm, and the vibration disturbance "d" is imparted to the system 10.

The braking force instruction "u" output from the braking force control means 190 is converted into the braking force Pm—which is actually exerted on the wheels—by way of transmission characteristics 192 and is input to the disturbance estimating means 32. The transmission characteristics 192 are represented by a transmission function H of a mechanism for converting the braking force instruction "u" into the actual braking force Pm.

The braking force control means 190 receives the control output 16 and determines whether or not to vibrate the braking force according to the value of the control output 16 in response to the micro-vibration braking force instruction Δu. In a case where the braking force control means 190 does not determine whether or not to vibrate the braking force according to the control output 16, the tire air-pressure diagnostic apparatus is arranged so as to have a configuration such as that shown in FIG. 4. More specifically, an output terminal of the dynamic system which outputs a control output is not connected to the braking force control means 190.

The braking force control means 190 can be configured such that even in a case where the mean braking force Pm is not applied to the wheels (i.e., u=0, Pm=0), vibration of the braking force according to the micro-vibration braking force instruction Δu is possible. The detailed configuration of the braking force control means 190 will be described later (FIGS. 20 to 21).

The present invention will be separately described with reference to a case where the system 10 receives an input "u" and to a case where the system 10 does not receive the input "u."

(Taking a system input into consideration)

In this case, variations in the air pressure in the tire, or the like, are converted into variations in physical parameters of the system 10. These variations can be expressed through use of variations in the matrix A. More specifically, if the matrix A is shifted by only ΔA by means of variations in the air pressure, the system after occurrence of variations in the air pressure is expressed as follows:

$$x = Ax + Bu + (\Delta Ax + d)$$
$$= Ax + Bu + Dw$$

where Dw is expressed by the following equation.

$$Dw = \Delta Ax + d \qquad (15)$$

From Equation (15), it is understood that variations in the air pressure in the tire induce new disturbance ΔAx. Reference symbol D designates a matrix consisting of 0 and 1 and is set according to a channel—into which vibration disturbance enters—and to the source of disturbance stemming from variations in the parameter of the system 10.

As described above, a response of state vector output from the system when there are variations in the air pressure in the tire can be expressed as the sum of the response output when the air pressure is normal and the disturbance Dw (t). The disturbance estimating means 32 is configured so as to estimate the disturbance "w."

The disturbance estimating means 32 is configured in two steps as shown below.

In the first step is formed an extended system of the system whose state includes the disturbance w(t). To this end, the following supposition is made with regard to the disturbance w(t), and the disturbance w(t) is added to the state of the system 10 to be examined.

w=0

As a result, the extended system of the system 10 which includes the disturbance "w" is expressed by the following equation.

$$\frac{d}{dt}\begin{bmatrix} x \\ w \end{bmatrix} = \begin{bmatrix} A & D \\ 0 & 0 \end{bmatrix}\begin{bmatrix} x \\ w \end{bmatrix} + \begin{bmatrix} B \\ 0 \end{bmatrix}u \quad (16)$$

$$y = \begin{bmatrix} C & 0 \end{bmatrix}\begin{bmatrix} x \\ w \end{bmatrix}$$

In the second step, the estimating means 32 for estimating the state [xTwt] expressed by Equation (16) is configured through use of conventional linear control theory. The disturbance "w" is estimated by means of the thus-designed estimating means 32.

As has already been explained, the assumption of Equation (23) signifies that the disturbance w(t) which changes continually is approximated such that it changes stepwise as indicated by 110 in FIG. 5.

The disturbance estimating means 32 having the foregoing configuration can estimate an unmeasurable state and the disturbance corresponding to a fault even in a case where the entire internal state quantity vector x of the system 10 cannot be measured.

As is obvious from Equation (15), the disturbance estimated by the estimating means 32 is the sum of the vibration disturbance "d" stemming from vibration and the internal disturbance ΔAx occurring in the system 10 as a result of variations in the air pressure in the tire. Equation (15) is expressed as a vector; for example, the first element of this vector is expressed by the following equation.

$$[Dw]_1 = \Delta D_{11}X_1 + \Delta D_{12}X_2 + \ldots + \Delta a_{1j}X_j + \ldots + d_1 \quad (17)$$

where $\Delta a_{1j}$ is the first row-jth column element of the matrix ΔA.

The disturbance estimating means 32 will be described specifically on the basis of Equation (17).

In Equation (17), assume that $\Delta a_{11}$ is an element stemming from variations in the air pressure in the tire, and other elements stem from variations in components other than the air pressure in the tire. In this case, it is understood that the internal disturbance stemming from variations in the air pressure in the tire depends on the state quantity x1. More specifically, in this case, the state quantity which affects the system 10 as a result of variations in the air pressure in the tire is x1.

In order to detect only the component—which is relevant to internal disturbance stemming from variations in the air pressure in the tire—by eliminating the vibration disturbance "d" from the disturbance [Dw]1 estimated by the estimating means 32, the cross-correlation between the estimated disturbance [Dw]1 and the internal state quantity x1 is calculated. The cross-correlation is calculated by means of the correlation calculation means 34. Provided that the cross-correlation calculated at this time is C([Dw]1, w1), the value represented by the following expression is obtained.

$$C([Dw]1, x1) = \Delta a_{11} \frac{1}{N} \sum_{k=1}^{N} (x_1 - \bar{x}_1)^2 \quad (18)$$

where $\bar{\chi}_1$ is a mean value represented by $$\frac{1}{N} \sum_{k=1}^{N} x_1,$$

and N is the number of samples used for the calculation of a correlation.

As previously described, the term related to the vibration disturbance and the term related to the internal disturbance stemming from variations in components other than the air pressure are irrelevant to the internal state quantity x1. Accordingly, only the internal disturbance corresponding to variations in the air pressure in the tire can be extracted from the estimated disturbance "w" by calculation of the correlation expressed by Equation (18).

The thus-calculated correlation function takes on a value corresponding to the frequency component of internal disturbance stemming from only variations in the spring constant of the tire from among various frequency components included in the estimated disturbance "w." Accordingly, the amount of variation in the spring constant can be detected from the values calculated by the correlation function.

The correlation function expressed by Equation (18) can be represented by the product of item $\Delta a_{11}$ representing variations in the spring constant and the autocorrelation function of the state quantity represented by the following equation. For example, the diagnostic means 36 can quantitatively detect the amount of variation $\Delta a_{11}$ in the spring constant by dividing the cross-correlation function by the autocorrelation function of state quantity.

$$\frac{1}{N} \sum_{k=1}^{N} (x_1 - \bar{x}_1)^2$$

The diagnostic means 36 determines that the air pressure is anomalous when the thus-detected amount of variation $\Delta a_{11}$ in the spring constant reaches the amount of variation in the spring constant corresponding to the air pressure in the tire determined to be anomalous.

(Where there is no input to the system 10)

An explanation will now be given of a case where there is no input to the system 10, and the system 10 is only minutely vibrated.

In this case, the dynamic system 10 comprising the suspension system and the wheels is expressed by the following equation of state.

x=Ax+d y=Cx.

Where "x" designates a state quantity vector of the system 10; "y" designates an output vector measured directly by means of a sensor of the system; and "d" designates vibration disturbance. The matrices A, B, and C are matrices of constants determined by physical parameters of the system 10. The system 10 is different from the active suspension system in that there is no input "u," expressed by Equation (14), to the system 10.

Given that the matrix A is shifted by ΔA because of variations in air pressure, the system after the air pressure has changed is expressed by the following equation.

$$x = Ax + (\Delta Ax + d) \quad (19)$$
$$= Ax + Dw$$

where Dw is represented as $$Dw = \Delta Ax + d \quad (20)$$

From Equations (19) and (20), the extended system of the system 10 which includes the disturbance "w" is expressed by the following equation.

$$\frac{d}{dt}\begin{bmatrix} x \\ w \end{bmatrix} = \begin{bmatrix} A & D \\ 0 & 0 \end{bmatrix}\begin{bmatrix} x \\ w \end{bmatrix}$$

$$y = \begin{bmatrix} C & 0 \end{bmatrix}\begin{bmatrix} x \\ w \end{bmatrix}$$

The system including the disturbance observer 32 is completely the same in configuration and operation as the active suspension system, with the exception of the input "u."

As described above, even in a case where there is no input to the system 10, as in the conventional suspension system, an anomaly in the air pressure in the tire can be detected.

The foregoing dynamic system diagnostic apparatus can also be applied to the diagnosis of the state of components around a tire (e.g., the damping force of a damper used in the suspension system, the eccentric state of a tire, the state of a wheel, the wear of the tire, and foreign objects cut into the tire).

As has been described above, according to a first aspect of the invention, since there is provided means for vibrating the dynamic system, the control output can be increased even when there is a small degree of external disturbance. As a result, there is yielded an advantage of the ability to highly accurately diagnose a fault or variations in the air pressure in the tire.

Further, according to the present invention, the dynamic system is vibrated with a signal irrelevant to a state quantity of the dynamic system, and hence there is yielded an advantage of the ability to constantly maintain a high degree of accuracy of fault detection compared with a diagnosing apparatus which utilizes external disturbance as an input.

To accomplish the aforementioned object, according to a second aspect of the present invention, there is provided a braking force estimation device, comprising; a first input means for receiving a wheel speed; a second input means for receiving a physical quantity which indicates the slipping ability of a wheel; braking pressure estimating means for estimating a mean braking pressure from an wheel speed and the physical quantity.

In the second aspect of the present invention, the braking pressure estimating means estimates a mean braking pressure from the wheel speed and the physical quantity. The physical quantity includes, the gradient of friction coefficient between the road surface and the wheel with respect to a slip speed, the gradient of braking force with respect to a slip speed, and the gradient of braking torque with respect to a slip speed.

As described above, in a second aspect of the present invention, the mean braking pressure is estimated from the wheel speed and the physical quantity. The coefficient of friction reaches its peak value when the physical quantity is zero regardless of the state of the road surface. In the present invention, regardless of the state of the road surface, the mean braking pressure can be stably estimated highly accurately without use of a pressure sensor.

According to a third aspect of the present invention, there is provided a braking force estimating device, comprising: first input means for receiving a wheel speed input; second input means for receiving a resonance gain which is a ratio of a micro amplitude of the wheel speed at a resonance frequency with respect to a micro amplitude of a braking pressure at the time of vibration of the braking pressure at the resonance frequency of a resonance system including a vehicle body, a wheel, and a road surface; a third input means for receiving a pressure increase/decrease time required to achieve a mean braking pressure with respect to a given master cylinder pressure or a physical quantity associated with the pressure increase/decrease time; braking pressure estimating means for estimating the mean braking pressure from the input wheel speed and a resonance gain on the basis of a model in which the gradient of braking torque with respect to a slip speed is proportional to the resonance gain; master cylinder pressure estimating means for estimating a master cylinder pressure on the basis of the mean braking pressure estimated by said braking pressure estimating means and the pressure increase/decrease time required to achieve the mean braking pressure or the physical quantity associated with the pressure increase/decrease time; and micro amplitude estimating means for estimating the micro amplitude of the braking pressure on the basis of the master cylinder pressure estimated by said master pressure estimating means and of the pressure increase/decrease time required to achieve the mean braking pressure or the physical quantity associated with the pressure increase/decrease time.

In the third aspect of the present invention, the braking pressure estimating means estimates a mean braking pressure from the input wheel speed and the resonance gain on the basis of a model in which the gradient of braking torque with respect to the slip speed is proportional to the resonance gain. Subsequently, the master cylinder pressure estimating means estimates master cylinder pressure on the basis of the estimated mean braking pressure and the pressure increase/decrease time required to achieve the input mean braking pressure or the physical quantity associated with the pressure increase/decrease time. The micro amplitude estimating means estimates the micro amplitude of the braking pressure on the basis of the master cylinder pressure estimated by the master cylinder pressure estimating means and of the pressure increase/decrease time required to achieve the input mean braking pressure or the physical quantity associated with the pressure increase/decrease time.

The pressure increase/decrease time required to achieve the mean braking pressure include a pressure increase time and a pressure decrease time of the valve which is controlled so as to apply the mean braking force. For example, the physical quantity associated with the pressure increase/decrease time includes a mean braking pressure (i.e., a mean braking pressure reference value which will be described later) corresponding to the pressure increase/decrease time and under which pressure the micro amplitude of the braking pressure becomes constant while the master cylinder pressure is constant.

As described above, in the third aspect of the present invention, master cylinder pressure is estimated from the mean braking pressure estimated on the basis of a model in which the friction-torque gradient is proportional to the resonance gain. The coefficient of friction reaches its peak value when the friction-torque gradient is zero regardless of the state of the road surface. In the present invention, regardless of the state of the road surface, the master cylinder pressure can be stably estimated highly accurately without use of a pressure sensor.

According to a fourth aspect of the present invention, there is provided an anti-lock brake controller comprising: wheel speed detection means for detecting a wheel speed; resonance gain calculation means for calculating a resonance gain which is the ratio of the micro amplitude of the wheel speed at a resonance frequency with respect to the micro amplitude of a braking pressure at the time of vibration of the braking pressure at the resonance frequency of a resonance system including a vehicle body, a wheel, and a road surface; braking pressure estimating means for estimating a mean braking pressure from the wheel speed detected by said wheel speed detection means and the resonance gain calculated by said resonance gain calculation means on the basis of a model in which the gradient of braking torque with respect to a slip speed is proportional to the resonance gain; master cylinder pressure estimating means for estimating master cylinder pressure on the basis of the mean braking pressure estimated by said braking pressure estimating means and a pressure increase/decrease time required to achieve the mean braking pressure or a physical quantity associated with the pressure increase/decrease time; micro amplitude estimating means for estimating the micro amplitude of the braking pressure on the basis of the master cylinder pressure estimated by said master pressure estimating means and the pressure increase/decrease time required to achieve the mean braking pressure or the physical quantity associated with the pressure increase/decrease time and for outputting the estimated micro amplitude of the braking pressure to said resonance gain calculation means; control means for controlling the pressure increase/decrease time required to achieve the mean braking pressure in such a way that the resonance gain calculated by said resonance gain calculation means matches or substantially matches a reference gain; and reference means for outputting to the master cylinder pressure estimating means the pressure increase/decrease time which is required to achieve the mean braking pressure and is controlled by said control means or the physical quantity associated with the pressure increase/decrease time.

In the fourth aspect, the aforementioned braking pressure estimating device is applied to an anti-lock brake controller. As a result, stable anti-lock braking operation becomes feasible by means of a simply-structured apparatus and without use of a pressure sensor regardless of the state of the road surface.

According to a fifth aspect of the present invention, there is provided a braking pressure controller comprising: a control valve equipped with a pressure increase valve for increasing the braking pressure exerted on a wheel cylinder and a pressure decrease valve for decreasing the braking pressure; and controlling means for controlling the control valve in such a way as to alternately switch, at a given cycle, between a first state, including a pressure increasing state in which the braking pressure is increased by the pressure increase valve and a pressure holding state in which the braking pressure is held, and a second state, including the state in which the braking pressure is decreased by the pressure decrease valve and, the pressure holding state and for controlling the periods for the pressure increasing state and pressure decreasing state of the control valve.

In the fifth aspect of the present invention, the first state including a pressure increasing state and the second state including a pressure decreasing state are alternatively switched at a given cycle. The braking pressure is controlled by controlling the pressure increase and decrease time periods in each of the states, thereby enabling continuous control of braking pressure. The cycle at which the states are switched is made constant, and hence the present invention is easily applied to an ABS system which controls anti-lock braking operation on the basis of variations in the resonance characteristics of the braking pressure by minutely vibrating the braking pressure. In the fifth aspect of the present invention, when the braking pressure is to be held, the pressure increase and decrease valves are both closed.

The braking pressure can be minutely vibrated to such an extent that resultant variations in the braking pressure do not provide the driver with unpleasant feeling by shortening the cycle at which the first and second states are switched (i.e., by increasing the cycle to a high frequency), thereby preventing kickback. As a result, vehicle behavior is not subjected to great variations. In a case where the anti-lock brake controller is applied to an ABS system, ABS control can be improved further.

The mean braking pressure can be continually controlled without changing the valve configuration which comprises two valves; i.e., a pressure increase valve and a pressure decrease valve, and is used in the current ABS system, thereby not requiring a change in hardware.

As has been described above, in the second aspect of the present invention, since the master cylinder pressure is estimated from the mean braking pressure estimated on the basis of the model in which the friction-torque gradient is proportional to the resonance gain, the present invention provides an advantage of being capable of stably estimating the master cylinder pressure highly accurately without use of a pressure sensor regardless of the state of the road surface.

Further, in the third aspect of the present invention, the master cylinder pressure is estimated from the mean braking pressure estimated on the basis of the model in which the friction-torque gradient is proportional to the resonance gain, and the resonance gain used for determining the state of the wheel immediately before wheel lock is calculated from the micro amplitude of the braking pressure obtained on the basis of the master cylinder pressure. As a result, the present invention provides an advantage that highly-accurate stable anti-lock braking operation is enabled regardless of the state of the road surface through use of a device having a simple structure without use of any pressure sensor.

In the fifth aspect of the present invention, the first state including the pressure increasing state and the second state including the pressure decreasing state are alternatively switched at a given cycle, and the braking pressure is controlled by adjusting the pressure increase and decrease time periods in each of the states. As a result, the present invention provides an advantage of enabling smooth and continuous braking pressure control.

Still further, in the fourth aspect of the present invention, the cycle at which1 the first and second states are switched is shortened, thereby resulting in still other advantages of suppressing variations in the braking pressure to such an extent as not to provide the driver with unpleasant feeling and of preventing great variations from arising in vehicle behavior. In a case where the anti-lock brake controller is applied to an ABS system, ABS control can be improved to a much greater extent. In addition, the mean braking pressure can be continually controlled without changing the valve configuration including two valves; i.e., a pressure increase valve and a pressure decrease valve, used in the conventional ABS system, thereby not requiring a change in hardware.

BRIEF DESCRIPTION OF THE DRAWINGS

FIG. 2 is a block diagram showing a second example of a diagnostic of the present invention for a dynamic system;

FIG. 3 is a block diagram showing the first example of a diagnostic apparatus of the present invention for a dynamic system composed of a wheel and a suspension system;

FIG. 5 is a curve showing a method of approximating disturbance used in a first embodiment;

FIG. 7 is a block diagram showing a diagnostic apparatus in accordance with a first mode of the first embodiment for diagnosing the suspension system model shown in FIG. 6;

FIG. 8 is a block diagram showing a second mode of the diagnostic apparatus in accordance with the first embodiment;

FIG. 13 is a block diagram showing a diagnostic apparatus in accordance with a fourth embodiment for diagnosing the dynamic system shown in FIG. 12;

FIG. 15 is a dynamic model of the vehicle in accordance with the fourth embodiment;

FIG. 17 is a block diagram showing the configuration of the diagnostic apparatus in accordance with the fourth embodiment of the present invention;

FIG. 18 is a flowchart showing the flow of operation of the diagnostic apparatus (e.g., the diagnosis of air pressure in the tire) in accordance with the fourth embodiment;

FIG. 20 is a block diagram showing the configuration of braking force control means of the dynamic system in accordance with the fourth embodiment;

FIG. 25A is a timing chart showing the relationship between hydraulic braking pressure and the pressure increasing, decreasing and holding instructions for the valve in an ordinary situation;

FIG. 25B is a timing chart showing the between hydraulic braking pressure and the pressure increasing, decreasing and holding instructions for the valve in a case where pressure-increase time $t_i$ is longer than pressure-decrease time $t_r$;

FIG. 25C is a timing chart showing the between hydraulic braking pressure and the pressure increasing, decreasing and holding instructions for the valve in a case where pressure-increase time $t_i$ is shorter than pressure-decrease time $t_r$;

DESCRIPTION OF THE PREFERRED EMBODIMENTS

First Embodiment

An example of application of the present invention to detection of a fault in an active suspension control system in a vehicle will now be described as a first embodiment.

Figure 1:
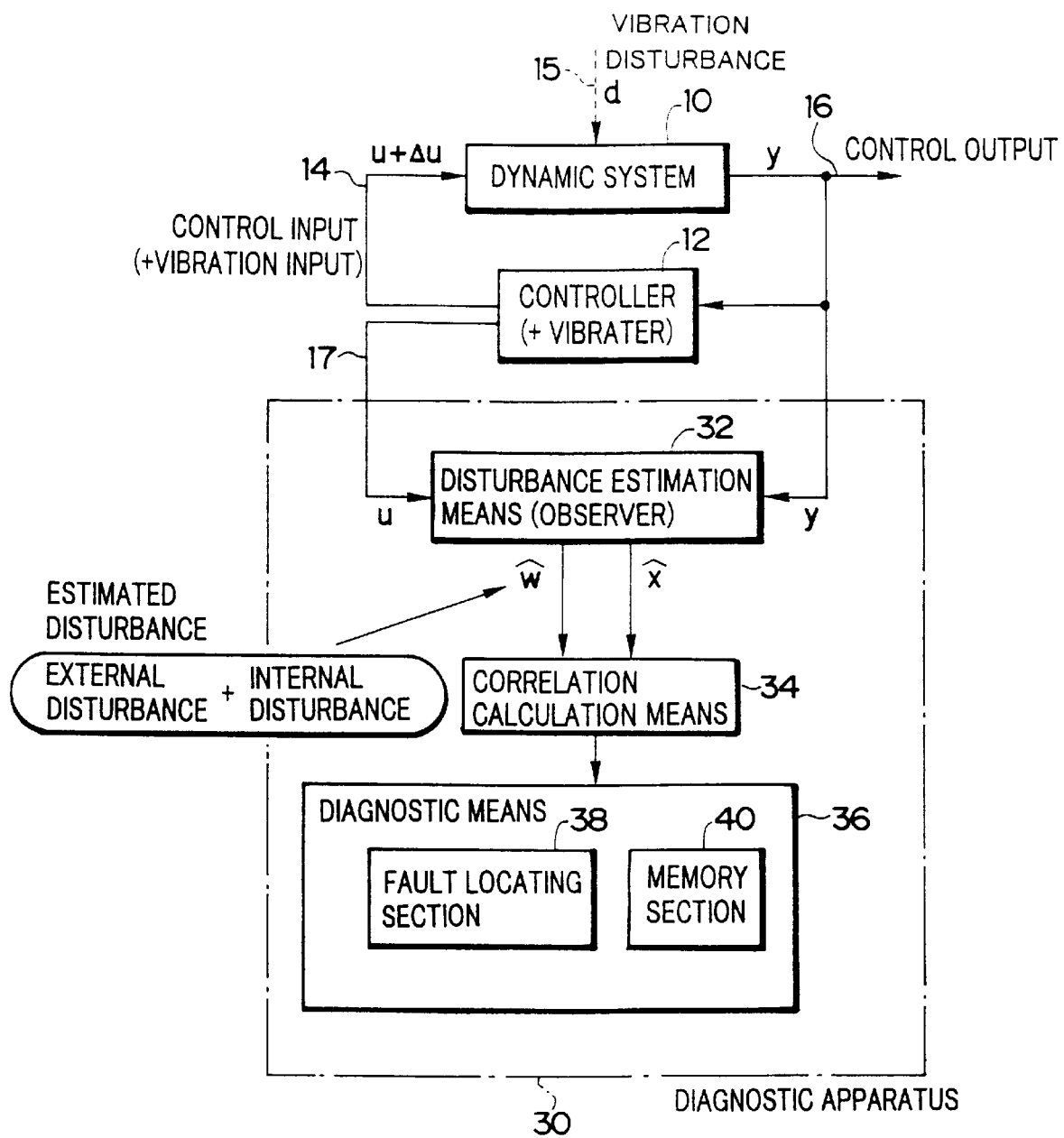
FIG. 1 is a block diagram showing a first example of a diagnostic apparatus of the present invention for a dynamic system.
Figure 6:
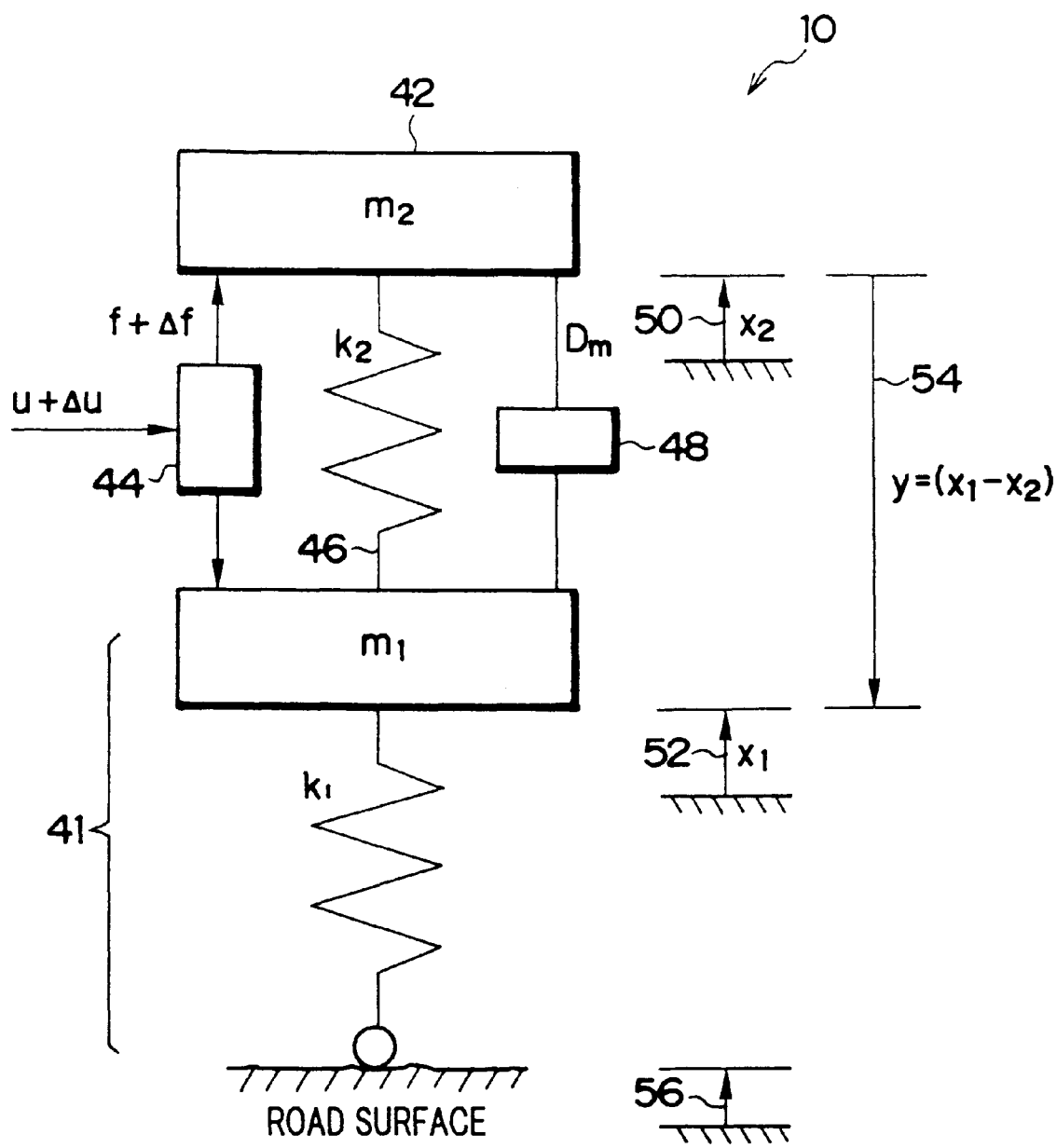
FIG. 6 is a schematic representation of a suspension system of a vehicle to be diagnosed in accordance with the first embodiment.

FIG. 6 shows a specific example of a dynamic system 10 shown in FIG. 1 to be examined in the first embodiment. This dynamic system 10 represents a vibration model of a single wheel suspension unit of the vehicle. In the drawing, a wheel 41 is represented by a combination of an unsprung mass section expressed by a parameter m1 and a spring section of the wheel (or tire) expressed by a spring constant k1. Reference numeral 42 designates a vehicle body having a spring constant m2; 46 designates a gas spring having a spring constant k2; 48 designates a damper having a damping constant Dm; and 56 designates the amount of displacement with reference to the road surface. Further, reference numeral 52 designates unsprung displacement represented by a variable x1; 50 designates sprung displacement represented by a variable x2; 54 designates relative displacement (i.e., x1−x2) represented by a variable "y"; and 44 designates a control force generator which produces active control force "f" required for control operation, from the quantity of actuation "u" output from a controller for controlling the suspension unit.

At the time of diagnosis of the dynamic system 10, the quantity of actuation (u+Δu) made by addition of another quantity of actuation Δu for vibration purposes to the quantity of actuation "u" is input to the control force generator 44. The control force generator 44 produces active control force (f+Δf) which is the sum of the active control force "f" and vibration control force Δf. As a result, the vehicle body 42 and the wheel 41 are vibrated by the vibration control force Δf around the area displaced by the control force "f." Further, a white signal or a frequency-shifted signal is used as the quantity of actuation Δu. It is assumed that the displacement occurring in the dynamic system 10 as a result of vibration control force Δf is taken as x0. This value x0 is given by the following equation.

$$x0-\Delta y=\Delta x1-\Delta x2$$

Since the first embodiment is based on the assumption that the vehicle travels over a road in good condition, the displacement 56 with reference to the road surface is smaller than the displacement x0. Accordingly, external disturbance is ignored (the same applies to other embodiments which will be described below).

From the drawing, the equation of state 1-1 is represented as follows;

$$\frac{d}{dt}\begin{bmatrix} y \\ \dot{y} \\ x_2 \\ \dot{x}_2 \\ f \end{bmatrix} = \begin{bmatrix} 0 & 1 & 0 & 0 & 0 \\ -a & -Dm-b & k_1/m_1 & 0 & -b \\ 0 & 0 & 0 & 1 & 0 \\ k_2/m_2 & Dm/m_2 & 0 & 0 & 1/m_2 \\ 0 & 0 & 0 & 0 & -1/T \end{bmatrix} \begin{bmatrix} y \\ \dot{y} \\ x_2 \\ \dot{x}_2 \\ f \end{bmatrix} + \begin{bmatrix} 0 \\ 0 \\ 0 \\ 0 \\ 1/T \end{bmatrix} u + \begin{bmatrix} 0 \\ k_1/m_1 \\ 0 \\ 0 \\ 0 \end{bmatrix} x_0$$

where T represents the response time of the control force generator 44; i.e., a time lag between the quantity of actuation "u" and the active control force "f." Further, "a" and "b" are expressed as $$a=k1/m1+k2/m1+k2/m2$$

$$b=1/m1+1/m2.$$

Presumable faults in the first embodiment are an anomaly in the air pressure in a broken tire, an anomalous pressure in the gas spring 46, and a fault in the damper 48. These faults are handled as variations in the respective parameters k1, k2, and Dm. A disturbance observer 32 is formed on the basis of the foregoing vibration model 10.

More specifically, the parameters k1, k2, Dm exist in the second and fourth elements in the right side of Equation (2-2). Accordingly, the channel along which the internal disturbance stemming from a presumable fault enters the actuation unit is set to these two areas. The channel is set according to the matrix D expressed by Equation (2). In this case, the channel is desirably set in a manner as represented by the following expression.

$$D_w = \begin{bmatrix} 0 & 0 \\ 1 & 0 \\ 0 & 0 \\ 0 & 1 \\ 0 & 0 \end{bmatrix} \begin{bmatrix} w_2 \\ w_4 \end{bmatrix} = \begin{bmatrix} 0 \\ w_2 \\ 0 \\ w_4 \\ 0 \end{bmatrix} \quad (21)$$

The extended system represented by Equation (4b) is formed through use of the matrix D, and the disturbance observer 32 shown in FIG. 7 is formed.

In the first embodiment is formed the disturbance observer 32 according to three modes shown below.

The first mode is a case where all of the sprung displacement x2, sprung speed, relative displacement "y," relative speed, and active control force "f" in the suspension model 10 can be measured. In this mode, there is no need for the disturbance observer 32 to estimate the internal state quantity of the dynamic system. The sprung speed and relative speed are respectively expressed by the following equations.

Sprung speed=$x_2$

Relative speed=y

The second mode is a case where only the sprung displacement x2 and the relative displacement "y" can be measured, and the disturbance observer 32 estimates the unmeasurable internal state quantity of other elements in the suspension system (e.g., the sprung speed and the relative speed in this case).

The third mode is a case where only the sprung displacement x2 and the relative displacement y can be measured, and the disturbance observer 32 estimates the entire internal state quantity of the suspension system including the sprung displacement and the relative displacement.

The disturbance observer 32 used for each of the foregoing modes and a diagnostic apparatus 30 employing this disturbance observer 32 will be described in detail hereinbelow.

First Mode

FIG. 7 shows a block diagram of the diagnostic apparatus 30 used for the first mode. In the drawing, reference 10 designates the dynamic system (a suspension system for a single wheel) shown in FIG. 6; 12 designates a controller for controlling the suspension system; 14 designates the quantity of actuation (u+Δu) output from the controller 12 for controlling the suspension system; and 16 designates the entire internal state quantity of the suspension system measured through use of a sensor (not shown).

Since the entire internal state quantity of the suspension system is measured through use of the sensor, there is no need for the disturbance observer 32 to estimate a part of, or the entirety of, the internal state quantity of the suspension system, unlike the second and third modes, which will be described later. Reference numeral 17 designates the quantity of actuation "u" input to the disturbance observer 32 from the controller 12. Only the quantity of actuation "u" resulting from subtraction of the vibration input Δu from the quantity of actuation (u+Δu) is input to the disturbance observer 32.

The disturbance observer 32 in the first embodiment acknowledges, as internal disturbance in the dynamic system 10 to be examined, an anomaly in the air pressure in the tire in the dynamic system 10, an anomaly in the pressure in the gas spring, or a fault in the damper. A total disturbance vector "w"—which is a sum of an vibration disturbance vector and an internal disturbance vector of the dynamic system 10—is estimated from the quantity of actuation 14 of the controller 12 and the entire state quantity 16 of the dynamic system 10, and the thus-estimated total disturbance vector "w" is output to a correlation calculation section 34.

The correlation calculation section 34 calculates a cross-correlation between the value of the total disturbance vector "w" estimated and calculated by the disturbance observer 32 and the internal state quantity of the dynamic system 10; namely, the sprung displacement, the relative displacement, and the relative speed. At this time, the internal state quantity; i.e., the sprung displacement, the relative displacement, or the relative speed, is irrelevant to vibration disturbance. For this reason, the influence of the vibration disturbance is eliminated from the internal state quantity by calculation of a cross-correlation between the internal state quantity and the estimated value of the total disturbance vector, thereby separating from the internal state quantity the components associated with the internal disturbance stemming from the fault. The result of such calculation can be output to a diagnostic section 36.

The diagnostic section 36 detects a fault occurring in the dynamic system 10 on the basis of the result of calculation received from the cross-correlation calculation section 34, and localizes a specific location of the fault in the suspension system on the basis of the location of the internal disturbance calculated by the cross-correlation calculation section 34.

The diagnostic apparatus 30 in accordance with the first embodiment has the aforementioned configuration, and the operation of the diagnostic apparatus 30 will now be described.

Assume that the presumable fault has arisen in the dynamic system 10 shown in FIG. 6. In such a case, the disturbance observer 32 estimates, from the control input "f" sent to the suspension system 10 and the state of the dynamic system 10, the second and fourth elements w2, w4 of the total disturbance vector previously set according to a fault. At this time, given that lag in the estimation of the disturbance is negligibly small, the estimated value is expressed by the following Equation (22).

$$\hat{w}_2 \cong -\frac{\Delta k_1}{m_1} + \frac{\Delta k_2}{m_1} + \frac{\Delta k_2}{m_2}y - \Delta Dmby - \frac{\Delta k_1}{m_1}x_2 + \frac{k_1 + \Delta k_1}{m_1}x_0 \quad (22)$$

$$\hat{w}_4 \cong \frac{\Delta k_2}{m_1}y + \frac{\Delta Dm}{m_2}y$$

$$\hat{w}_1 = \hat{w}_3 = \hat{w}_5 = 0$$

where $\hat{W}_1, \hat{W}_2, \hat{W}_3, \hat{W}_4, \hat{W}_5$ represent estimated values of $w_1, w_2, w_3, w_4,$ and $w_5$, respectively.

In Equation (22), Δk1 represents a variation in the parameter stemming from an anomaly in the air pressure in the tire; Δk2 represents a variation in the parameter stemming from an anomaly in the pressure in the gas spring; and ΔDm represents a variation in the parameter stemming from a fault in the damper.

The thus-estimated total disturbance is a sum of the sum of products—between the variations in the parameters and a variable of state of the suspension system (i.e., the relative displacement "y," the relative speed of displacement, and the sprung displacement x2)—and the displacement x0 exerted on the suspension system as vibration disturbance.

On the basis of the estimated total disturbance, the cross-correlation calculation section 34 and the diagnosis section 36 separate the vibration disturbance from the internal disturbance and determines a fault in the following manner.

First, a correlation function C21 between the estimated value of w2 and the measured value "y," a correlation function C41 between the estimated value of w4 and the measured value "y," and a correlation function C42 between the estimated value of w4 and the measured value thereof (i.e., relative speed), are calculated. Although the estimated value of w2 includes vibration disturbance, the influence of displacement stemming from the vibration disturbance irrelevant to the measured value "y" is eliminated by finding the correlation between the measured value "y" and the estimated value of w2. As a result, only the disturbance stemming from the fault is extracted in the form of; e.g, a value of the correlation function C21.

Next, the fault is localized on the basis of the thus-obtained correlation functions. For example, only the value corresponding to a variation in the gas spring is obtained from the correlation function C41. For this reason, if there is any anomaly in this value, a fault in the gas spring can be localized.

Similarly, if there is any anomaly in the value of the correlation function C42, the damper is determined to be faulty.

Finally, an anomaly in the air pressure in the tire is determined by the correlation function C21. If the gas spring is faulty or the air pressure in the tire is anomalous, the correlation function C21 takes on a value. However, a fault in the gas spring is detected by the determination made by the correlation function C41. Hence, if the gas spring is in a normal condition, and there is an anomaly in the value of the correlation function C21, an anomaly in the air pressure in the tire can be determined. If an anomaly in the gas spring and an anomaly in the air pressure in the tire simultaneously arise, it is impossible to distinguish the anomalies from one another. However, such a trouble occurs very rarely, and hence no actual problem arises.

As described above, the relationship between the estimated value of the total disturbance and the location of a fault can be expressed by a simple mathematical equation in the first embodiment. Consequently, a fault can be localized by executing a simple calculation such as calculation of a correlation between the state of the object to be examined and an estimated value.

Further, disturbance is imparted to the dynamic system through vibration in the first embodiment even when external disturbance is very small, as in a case where the vehicle travels over a road in good condition. As a result, a reduction in the accuracy of calculation attributable to a reduction in the control output can be prevented. Moreover, as a result of imparting to the dynamic system the vibration disturbance irrelevant to the internal state quantity of the dynamic system, a fault can be highly accurately detected at all times.

(Second Mode)

FIG. 8 is a block diagram showing the disturbance observer 32 configured so as to correspond to the previously-described second mode and the diagnostic apparatus 30 employing this disturbance observer 32. The elements which are the same as those shown in FIG. 7 are assigned the same reference numerals, and hence their explanations will be omitted here.

In the present embodiment, only the sprung displacement x2 and the relative displacement "y" are directly measured, as the internal state quantity of the dynamic system 10, from the dynamic system 10 constituting the vibration model of the suspension system. The internal state quantity of another element in the dynamic system 10; e.g., relative speed, is not directly measured.

In this case, from the quantity of actuation 14 and the measured value 16, the disturbance observer 32 estimates and calculates the sprung speed, the relative speed, and the active control force among the internal state quantity of the dynamic system 10 which have not yet been measured, as well as the total disturbance vector of the dynamic system 10. The thus-estimated factors are output to the correlation calculation section 36.

The disturbance observer 32 is designed in the manner as represented by the following equations.

First, an expanded system of the dynamic system 10 is formed on the basis of Equations (4b), (2), and (21).

$$\frac{d}{dt}\begin{bmatrix} y \\ \dot{y} \\ x_2 \\ \dot{x}_2 \\ f \\ w_2 \\ w_4 \end{bmatrix} = \begin{bmatrix} 0 & 1 & 0 & 0 & 0 & 0 & 0 \\ -a & -Dmb & \frac{k_1}{m_1} & 0 & -b & 1 & 0 \\ 0 & 0 & 0 & 1 & 0 & 0 & 0 \\ \frac{k_2}{m_2} & \frac{Dm}{m_2} & 0 & 0 & \frac{1}{m_1} & 0 & 1 \\ 0 & 0 & 0 & 0 & \frac{1}{T} & 0 & 0 \\ 0 & 0 & 0 & 0 & 0 & 0 & 0 \\ 0 & 0 & 0 & 0 & 0 & 0 & 0 \end{bmatrix} \begin{bmatrix} y \\ \dot{y} \\ x_2 \\ \dot{x}_2 \\ f \\ w_2 \\ w_4 \end{bmatrix} + \begin{bmatrix} 0 \\ 0 \\ 0 \\ 0 \\ -\frac{1}{T} \\ 0 \\ 0 \end{bmatrix} u \quad (23)$$

The measurable state quantities "y" and x2 are separated from the unmeasurable state quantity through use of Equation (23).

$$\frac{d}{dt}\begin{bmatrix} y \\ x_2 \\ \cdots \\ \dot{y} \\ \dot{x}_2 \\ f \\ w_2 \\ w_4 \end{bmatrix} = \begin{bmatrix} 0 & 0 & \vdots & 1 & 0 & 0 & 0 & 0 \\ 0 & 0 & \vdots & 0 & 1 & 0 & 0 & 0 \\ \cdots & \cdots & \vdots & \cdots & \cdots & \cdots & \cdots & \cdots \\ -a & -\frac{k_1}{m_1} & \vdots & -Dmb & 0 & -b & 1 & 0 \\ \frac{k_2}{m_2} & 0 & \vdots & \frac{Dm}{m_2} & 0 & \frac{1}{m_2} & 0 & 1 \\ 0 & 0 & \vdots & 0 & 0 & -\frac{1}{T} & 0 & 0 \\ 0 & 0 & \vdots & 0 & 0 & 0 & 0 & 0 \\ 0 & 0 & \vdots & 0 & 0 & 0 & 0 & 0 \end{bmatrix} \begin{bmatrix} y \\ x_2 \\ \cdots \\ \dot{y} \\ \dot{x}_2 \\ f \\ w_2 \\ w_4 \end{bmatrix} + \quad (3\text{-}3)$$

$$\begin{bmatrix} 0 \\ 0 \\ \cdots \\ 0 \\ 0 \\ -\frac{1}{T} \\ 0 \\ 0 \end{bmatrix} u$$

To simplify the expression, Equation (3-3) is transformed in the manner as shown below.

$$\frac{d}{dt}\begin{bmatrix} x_a \\ \cdots \\ x_b \end{bmatrix} = \begin{bmatrix} A_{11} & \vdots & A_{12} \\ \cdots & \vdots & \cdots \\ A_{21} & \vdots & A_{22} \end{bmatrix} \begin{bmatrix} x_a \\ \cdots \\ x_b \end{bmatrix} + \begin{bmatrix} B_1 \\ \cdots \\ B_2 \end{bmatrix} u \quad (4\text{-}4)$$

where $$x_a = \begin{bmatrix} y \\ x_2 \end{bmatrix}, x_b = [\,\dot{y}\ \dot{x}_2\ f\ w_2\ w_4\,]^T$$

The state quantity xb—which includes total disturbance and is unmeasurable—is estimated through use of the following equation.

$$\hat{x}b = A_{21}x_a + A_{22}\hat{x}b + B_{2u} + G\{x_a - (A_{11}x_a + A_{12}\hat{x}b + B_1u)\} \quad (24)$$

From Equations (4-4) and (24), an error between a true value xb and an estimated value can be written as $$\hat{x}_b - x_b = A_{21}x_a + A_{21}\hat{x}_b + B_{2u} + G\{x_a - (A_{11}x_a + A_{12}\hat{x}_b + B_1 u)\} - (A_{21}x_a + A_{22}x_b + B_2 u)$$

$$= A_{22}(\hat{x}_b - x_b) + G\{(A_{11}x_a + A_{12}x_b + B_{1u}) - (A_{11}x_a + A_{12}\hat{x}_b + B_{1u})\}$$

$$= (A_{22} - GA_{12})(\hat{x}_b - x_b) \quad (25)$$

where $\hat{x}_b$ represents an estimate value and Xb represents a true value.

Consequently, so long as the matrix of real number G is determined in such a way that all the characteristic values of the vector of (A22−GA12) in Equation (25) become negative, the error expressed by Equation (25) converges on zero with time. More specifically, the estimated value converges on a true value.

Figure 14:
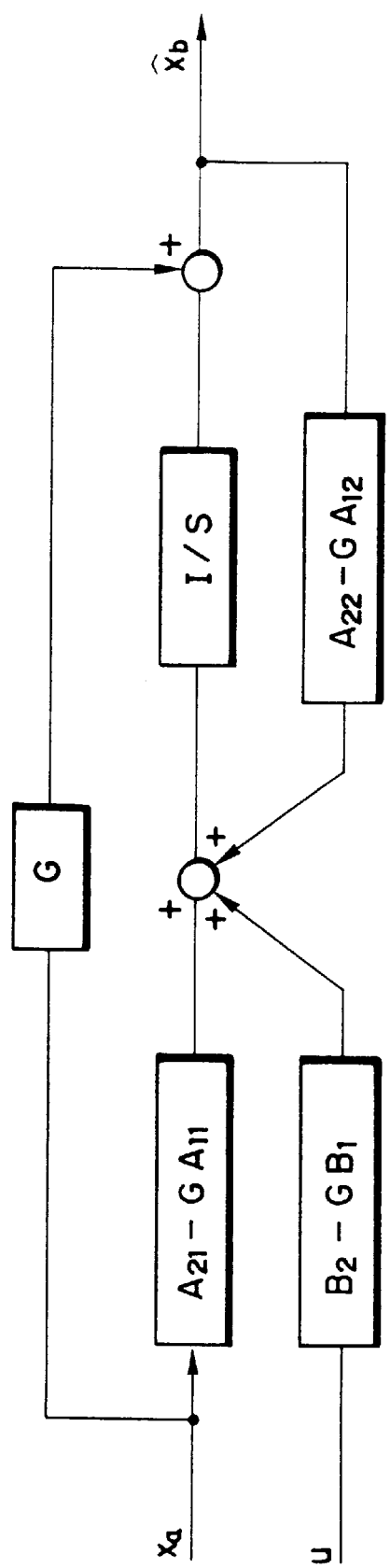
FIG. 14 is a block diagram showing a minimum dimension observer in accordance with the first embodiment.

Equation (24) can be illustrated such as that shown in FIG. 14. As shown in FIG. 14, the unmeasurable state quantity xb can be estimated through use of the control input "u" and the measurable state quantity xa=[y x2]T.

As described above, a disturbance observer 32 in the second mode is configured in the form of a minimum dimension observer which estimates the total disturbance "w" and the unmeasurable internal state quantity; e.g., relative speed, from the control input delivered to the suspension system and the measured quantities of internal state x2, y of the suspension system 10. Even in a case where the disturbance observer 32 is formed so as to have the foregoing configuration, the thus-estimated total disturbance can be represented by Equation (22). Consequently, as in the first mode, the diagnosis section 36 can detect and localize a fault as a result of the correlation function being executed by the correlation function calculation section 34.

More specifically, an estimated value of the relative speed required for correlation calculation is represented by Estimated value of $\dot{y} = \hat{\dot{y}}$ Accordingly, it is only required that correlation function similar to that performed in the first mode be executed by replacing the relative speed with the estimated value.

Since the disturbance observer 32 estimates the internal state quantity without any substantial errors even if a fault arises in the dynamic system, a correlation function essentially analogous to that used in the first mode can be obtained even if the correlation is calculated through use of the estimated value in the manner as previously described. After acquisition of the correlation function, the disturbance observer can localize the fault in a manner analogous to that employed in the first mode, and hence its explanation will be omitted here.

As described above, in the second mode, the state quantity of the dynamic system directly measured through use of a sensor, as well as the internal state quantity of the same estimated by the disturbance observer 32 at the same time it estimated the total disturbance, can be used for calculation of a correlation function in the second mode. Accordingly, even if the entire internal state quantity of the dynamic system 10 to be examined is not directly measured, a fault can be detected in detail.

(Third Mode)

Figure 9:
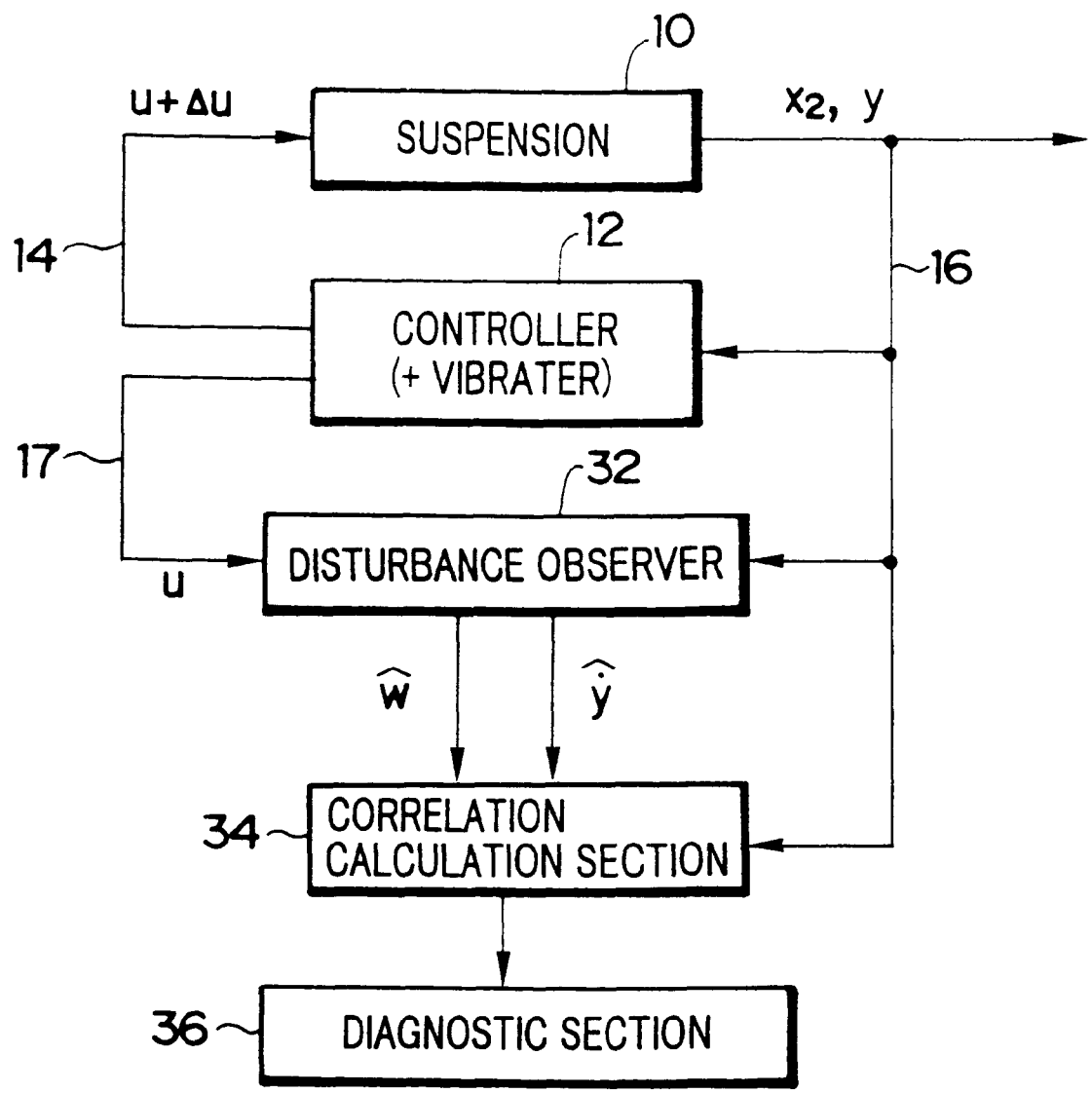
FIG. 9 is a block diagram showing a third mode of the diagnostic apparatus in accordance with the first embodiment.

FIG. 9 is a block diagram showing the disturbance observer 32 used for the foregoing third mode and the diagnostic apparatus 30 employing the observer 32.

The third mode is different from the second mode in that the disturbance observer 32 is configured as a complete dimension observer.

More specifically, the disturbance observer 32 in the third mode is configured so as to estimate the overall disturbance and the entire internal state quantity of the dynamic system 10 from the control input "f" delivered to the suspension system and from the directly-measured internal state quantities x2, y of the dynamic system 10.

The disturbance observer 32 is designed on the basis of Equations (4b), (2-2), (21), and the following equation.

$$\frac{d}{dt}\begin{bmatrix} \hat{y} \\ \hat{\dot{y}} \\ \hat{x}_2 \\ \hat{\dot{x}}_2 \\ \hat{f} \\ \hat{w}_2 \\ \hat{\dot{w}}_2 \end{bmatrix} = \begin{bmatrix} 0 & 1 & 0 & 0 & 0 & 0 & 0 \\ -a & -Dmb & \frac{k_1}{m_1} & 0 & -b & 1 & 0 \\ 0 & 0 & 0 & 1 & 0 & 0 & 0 \\ \frac{k_2}{m_2} & \frac{Dm}{m_2} & 0 & 0 & \frac{1}{m_1} & 0 & 1 \\ 0 & 0 & 0 & 0 & -\frac{1}{T} & 0 & 0 \\ 0 & 0 & 0 & 0 & 0 & 0 & 0 \\ 0 & 0 & 0 & 0 & 0 & 0 & 0 \end{bmatrix} \begin{bmatrix} \hat{y} \\ \hat{\dot{y}} \\ \hat{x}_2 \\ \hat{\dot{x}}_2 \\ \hat{f} \\ \hat{w}_2 \\ \hat{\dot{w}}_2 \end{bmatrix} + \begin{bmatrix} 0 \\ 0 \\ 0 \\ 0 \\ \frac{1}{T} \\ 0 \\ 0 \end{bmatrix} u + \quad (5\text{-}5)$$

$$G\left(\begin{bmatrix} y \\ x_2 \end{bmatrix} - \begin{bmatrix} 0 & 0 & 0 & 0 & 0 & 0 & 0 \\ 0 & 0 & 1 & 0 & 0 & 0 & 0 \end{bmatrix} \begin{bmatrix} \hat{y} \\ \hat{\dot{y}} \\ \hat{x}_2 \\ \hat{\dot{x}}_2 \\ \hat{f} \\ \hat{w}_2 \\ \hat{\dot{w}}_2 \end{bmatrix}\right)$$

where Λ represents an estimated value, and G represents a matrix of real number having seven rows and two columns.

Even in this case, a differential equation related to an error between an estimated value and a true value used in Equation (25) is formed, and the matrix of real number G is determined in such a way that all the characteristic value of the vector of the foregoing equation become negative. Although greater absolute values of the characteristic values are more desirable, they are desirably set to about −300 to −700 rad/s.

In this way, an estimated value represented by the following equation can be calculated from the control input "u" and the estimated values y, x2.

estimated value $[\hat{y}\hat{\dot{y}}\hat{x}_2\hat{\dot{x}}_2\hat{f}\hat{w}_2\hat{w}_4]^T$ The thus-estimated total disturbance is represented by Equation (22), and hence the correlation function is calculated in a manner analogous to that employed in the first mode. The estimated values of the relative displacement and the relative speed are used for calculation of the correlation function. After the correlation function has been calculated, a fault is localized in a manner analogous to that employed in the first mode.

As described above, a fault can be localized by use of simple calculation in the third mode. In addition, the disturbance observer 32 employed in the third mode is configured in the form of a complete dimension observer, and hence the procedures required for its configuration are simpler than those required for the minimum dimension observer used in the second mode.

Second Embodiment

A second embodiment of the present invention will now be described.

Figure 10:
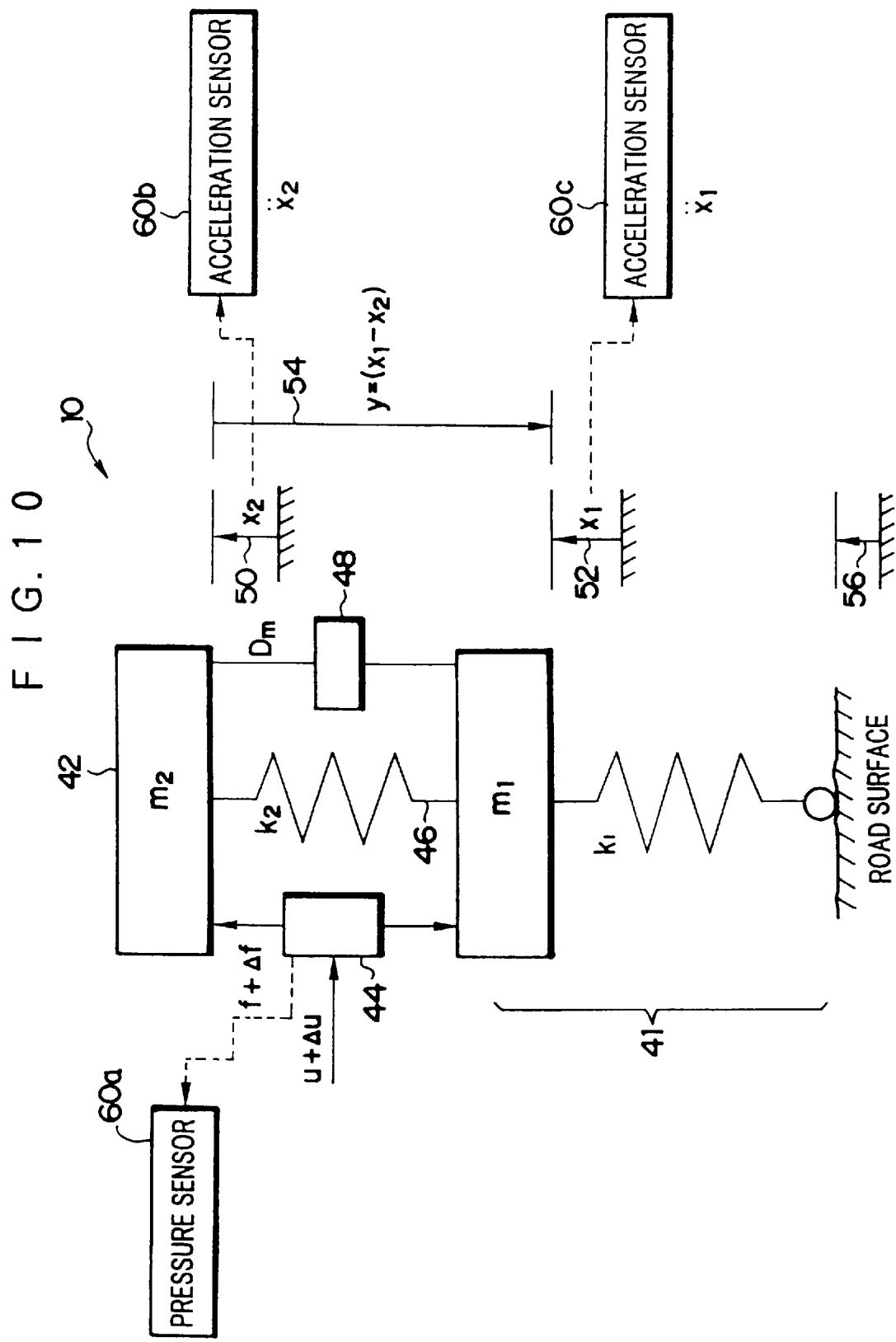
FIG. 10 is a schematic representation showing a dynamic system including an active suspension system and a wheel.

FIG. 10 shows a specific example of the dynamic system 10 to be examined in the second embodiment which comprises an active suspension system and wheels. The members corresponding to those shown in FIG. 6 are assigned the same reference numerals, and their explanations will be omitted here.

Such an active suspension system is usually provided with a pressure sensor 60*a* as a member required for active control of the suspension system. The pressure sensor 60*a* is provided in the control force generator 16 so as to be able to measure the active control force "f." Further, acceleration sensors 60*b* and 60*c* are provided for detecting an anomaly in the air pressure in the tire. Both the acceleration sensors 60*b* and 60*c* are provided at the upper end and at the lower end of the suspension spring, respectively, so as to be able to detect the acceleration of vertical vibrations.

In such a dynamic system 10, the equation of state represented by Equation (16) is specifically expressed in the following form.

$$\frac{d}{dt}\begin{bmatrix} \dot{x}_2 \\ \ddot{x}_2 \\ \dot{y} \\ \ddot{y} \\ f \end{bmatrix} = \begin{bmatrix} 0 & 1 & 0 & 0 & 0 \\ 0 & 0 & \frac{k_2}{m_2} & 0 & \frac{-1}{m_2 T} \\ 0 & 0 & 0 & 1 & 0 \\ -\frac{k_1}{m_1} & 0 & -a & 0 & \frac{b}{T} \\ 0 & 0 & 0 & 0 & \frac{-1}{T} \end{bmatrix} \begin{bmatrix} \dot{x}_2 \\ \ddot{x}_2 \\ \dot{y} \\ \ddot{y} \\ f \end{bmatrix} + \begin{bmatrix} 0 \\ \frac{-1}{m_2 T} \\ 0 \\ \frac{-b}{T} \\ \frac{1}{T} \end{bmatrix} u + \begin{bmatrix} 0 \\ 0 \\ 0 \\ \frac{k_1}{m_1} \\ 0 \end{bmatrix} x_0 \quad (26)$$

where $a = k_1/m_1 + k_2/m_1 + k_2/m_2$, $b = 1/m_1 + 1/m_2$, and T represents lag time between the quantity of actuation "u" and the active control force "f."

Figure 11:
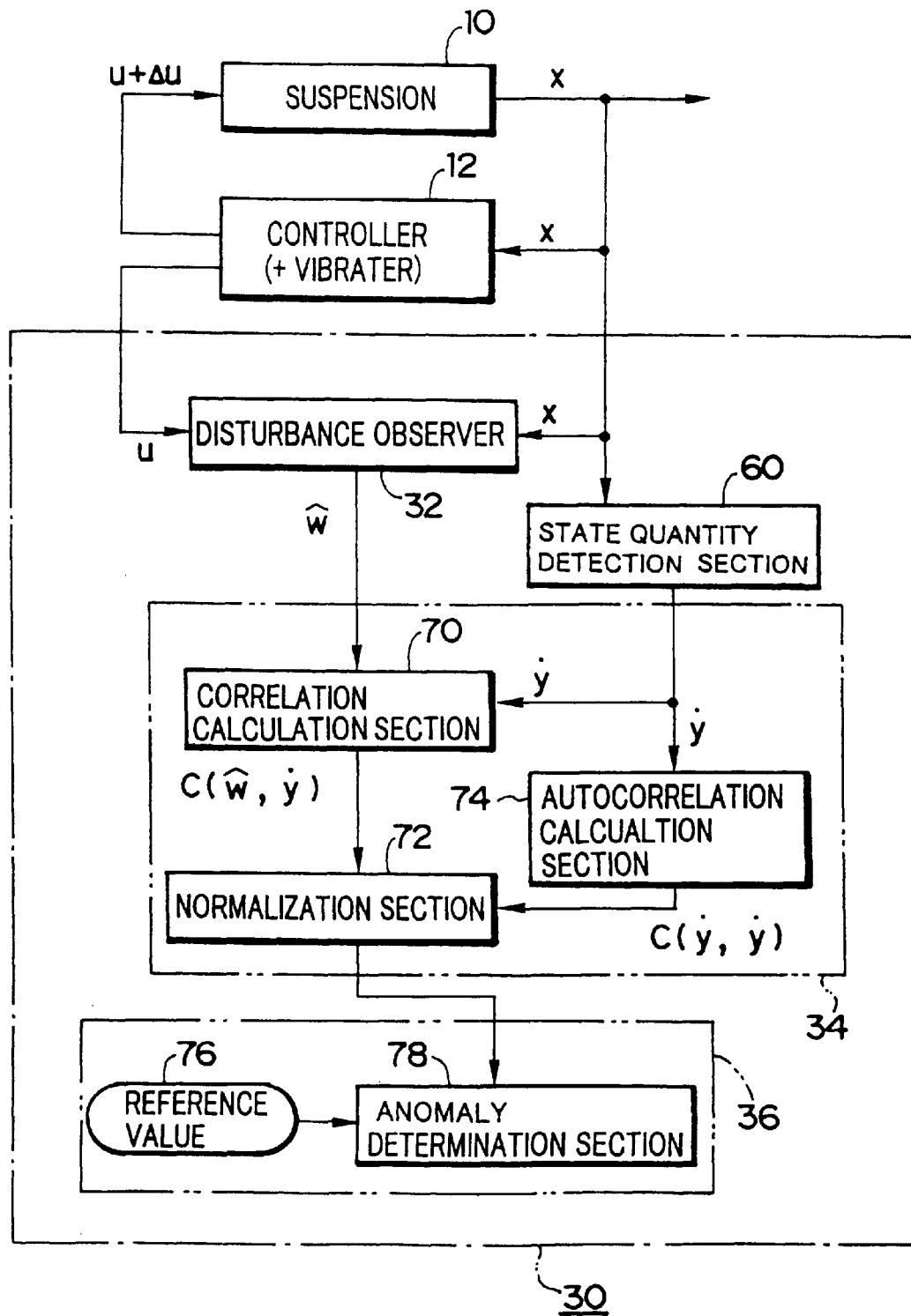
FIG. 11 is a block diagram showing a diagnostic apparatus in accordance with a second embodiment for diagnosing the dynamic system shown in FIG. 10.

FIG. 11 is a block diagram of the dynamic system in accordance with the second embodiment. As previously mentioned, the suspension system 10 to be examined is configured so as to receive the quantity of actuation (u+Δu) from the controller 12 and to handle the following vector contained in Equation (26) as the internal state quantity.

$$x = [\dot{x}_2 \ \ddot{x}_2 \ \dot{y} \ \ddot{y} \ f]^T$$

Of the elements included in the internal state quantity vector "x," sprung acceleration is directly detected by the acceleration sensor 60*b* shown in FIG. 10, and sprung speed is calculated by integration of the sprung acceleration. Relative acceleration is calculated from a difference between the unsprung acceleration detected by the acceleration sensor 60*c* and the sprung acceleration. Further, relative speed is calculated by integration of the relative acceleration. Assume that calculation sections which perform the foregoing calculations are incorporated into the suspension system 10 in accordance with the second embodiment at all times. Accordingly, the output from the suspension system 10 represents the internal state quantity vector included in Equation (26); i.e., $$x = [\dot{x}_2 \ \ddot{x}_2 \ \dot{y} \dot{y} f]^T$$

The controller 12 in accordance with the second embodiment receives the thus-output internal state quantity vector "x" as an input and calculates and outputs the quantity of actuation (u+Δu) used as an input signal of the active suspension system 10.

The diagnostic apparatus 30 that diagnoses the active suspension system 10 comprises the disturbance observer 32, the correlation calculation section 34, and the diagnostic section 36.

The disturbance observer 32 is formed so as to receive the output "u" from the controller 12 and the internal state quantity vector "x" output from the active suspension system 10 and estimates and calculates variations in a spring constant k1 of the tire as internal disturbance occurring in the active suspension system 10.

From the internal state quantity vector "x" output from the active suspension system 10, a state quantity detection section 60 extracts the state quantity which affects the active suspension system 10 as a result of a variation in the air pressure in the tire (i.e., relative speed in this embodiment).

The correlation calculation section 34 comprises a cross-correlation calculation section 70, a normalization section 72, and an autocorrelation section 74.

The cross-correlation calculation section 70 calculates and outputs a cross-correlation between the total disturbance estimated by the disturbance observer 32 and the relative speed.

The autocorrelation calculation section 74 calculates the autocorrelation function of the relative speed.

The normalization section 72 normalizes the cross-correlation function calculated by the cross-correlation calculation section 70 by dividing it by the autocorrelation function calculated by the autocorrelation calculation section 74, thereby extracting only the quantity of variation in the spring constant of the tire. The thus-extracted quantity of variation is output to the diagnostic section 36.

The diagnostic section 36 comprises a memory 76 which stores reference values and an anomaly determination section 78. The diagnostic section 36 is arranged so as to determine an anomaly in the air pressure in the tire by comprising of the quantity of variation in the spring constant of the tire calculated by the normalization section 72 with the reference quantity of variation in the spring constant corresponding to an anomalous air pressure stored in the memory 76.

The dynamic system in accordance with the second embodiment an the aforementioned construction, and its operation will now be described.

In the dynamic system 10 shown in FIG. 10 that comprises an active suspension system and a wheel, if the air pressure in the tire changes and thus the spring constant of the tire changes, the internal state quantity vector "x" of the dynamic system 10 becomes different from that output when the air pressure is normal. This different internal state quantity vector "x" can be deemed as a sum of the internal state quantity vector output when the air pressure is normal and the internal disturbance corresponding to a change in the air pressure.

The disturbance observer 32 estimates and calculates total disturbance—including the internal disturbance and vibration disturbance—from the internal state quantity vector "x" output from the active suspension system 10 and the quantity of actuation "u."

Consequently, assuming that the air pressure in the tire is in a normal condition, and that the spring constant of the tire at that time is k1, the disturbance observer 32 calculates and outputs the vibration disturbance expressed by the following equation.

$$\hat{W} = \frac{k_1}{m_1} x_0$$

The thus-estimated vibration disturbance corresponds to a differential value of displacement x0 stemming from white control force Δf and is random and completely irrelevant to the state of the active suspension system 10.

Under such conditions, assuming that the air pressure in the tire has changed and the spring constant of the tire has changed by Δk1 to (k1+Δk1) the disturbance observer 32 outputs total disturbance expressed by the following equation.

$$\hat{W} = \frac{\Delta k_1}{m_1}\dot{x}_2 - \frac{\Delta k_1}{m_1}\dot{y} + \frac{k_1 + \Delta k_1}{m_1}\dot{x}_0 \quad (27)$$

Although control outputs x2 and "y" included in the total disturbance are irrelevant to the vibration disturbance, these outputs take on large values corresponding to the magnitude of the vibration disturbance through vibration even when the vehicle travels over a road in good condition.

From Equation (27), it becomes necessary to detect only the internal disturbance stemming from a variation in the air pressure in the tire by eliminating the vibration disturbance from the value of the total disturbance estimated by the disturbance observer 32. To this end, the correlation calculation section 70 calculates a cross-correlation between the estimated total disturbance and the elements of the internal state quantity irrelevant to the vibration disturbance. Although Equation (27) includes the relative speed and the sprung speed as the state of quantity corresponding to the internal state quantity, a cross-correlation between the estimated total disturbance and the relative speed output from the active suspension system 10 is calculated in the second embodiment. Taking the cross-correlation function as $C(\hat{w}, \dot{y})$, the function is calculated in the manner as expressed by $$c(\hat{w}, \dot{y}) = \frac{1}{N}\sum_{k=1}^{N}(\hat{w} - \overline{\hat{w}})(\dot{y} - \overline{\dot{y}}) \quad (28)$$

As a result of calculation of such a cross-correlation function, separation of the quantity of variation $\Delta k$ in the air pressure in the tire and separation of the item of vibration disturbance can be carried out. More specifically, the estimated total disturbance and the relative speed output from the active suspension system 10 are continually sampled over N times, to thereby obtain a mean value expressed by the following equation.

$$\overline{\hat{w}} = \frac{1}{N}\sum_{k=1}^{N}\hat{w}, \quad \overline{\dot{y}} = \frac{1}{N}\sum_{k=1}^{N}\dot{y}$$

The cross-correlation function expressed by Equation (28) is performed through use of the mean value, to thereby obtain the correlation function $c(\hat{w},\dot{y})$.

As a result, the item of sprung speed and the displacement speed are eliminated, the value of the correlation function is obtained as follows:

$$c(\hat{w}, \dot{y}) \cong \frac{\Delta k_1}{m_1} \cdot \frac{1}{N}\sum_{k=1}^{N}(\dot{y} - \overline{\dot{y}})^2$$

The thus-calculated correlation function can be expressed by the product of an item representing a variation in the spring constant in the tire ($\Delta k_1/m_1$) and an autocorrelation function of relative speed of the active suspension system used for the calculation of the cross-correlation function [expressed by Equation (29)]. Accordingly, the quantity of variation in the spring constant can be quantitatively detected by dividing the cross-correlation function by the autocorrelation function of the state quantity (i.e., the relative speed).

$$\frac{1}{N}\sum_{k=1}^{N}(\dot{y} - \overline{\dot{y}})^2 \quad (29)$$

As is evident from Equation (29), the cross-correlation function $c(\hat{w},\dot{y})$ takes on a value corresponding to a frequency component of the internal disturbance, which stems from only the variation in the spring constant of the tire, from among various frequency components of the estimated total disturbance. Accordingly, the quantity of variation in the spring constant can be obtained from the cross-correlation function $c(\hat{w},\dot{y})$.

The foregoing autocorrelation function of the relative speed is calculated by the autocorrelation function calculation section 74 and is input to the normalization section 72. The normalization section 72 detects the quantity of variation in the spring constant of the tire expressed by the following equation by dividing the cross-correlation function $c(\hat{w},\dot{y})$ output from the cross-correlation function calculation section 70 by the autocorrelation function $c(\dot{y}, \dot{y})$ output from the autocorrelation function calculation section 74.

$$J \equiv \frac{c(\hat{w}, \dot{y})}{c(\dot{y}, \dot{y})} \cong -\frac{\Delta k_1}{m_1}$$

In this equation, the parameter m1 represents a known value; i.e., the mass of the tire, and therefore the quantity of variation in the spring constant $\Delta k1$ can be accurately calculated from the output J from the normalization section 72.

The anomaly determination section 78 determines an anomaly in the air pressure by comparison of the thus-obtained quantity of variation $\Delta k1$ of the spring constant with the reference quantity of variation corresponding to an anomaly.

In the prior art, a correlation function—which represents the quantity of variation stemming from a fault similar to the foregoing quantity of variation in the spring constant—is calculated from a control value output from the dynamic system when there is an input of irregular external disturbance. In this case, if the external disturbance becomes smaller, the control output also becomes smaller. Even if the cross-correlation function based on this control output is normalized by being divided by the autocorrelation function, an error of the output J due to quantization errors is increased, thereby resulting in a reduction in the accuracy of fault detection. Further, since there are variations in the statistical characteristics and magnitude of the external disturbance, the accuracy of fault detection cannot be constantly maintained.

In contrast, in the present embodiment, an vibration disturbance is applied to the active suspension system through vibration by the controller, to thereby set the control output value to or greater than a given magnitude, enabling highly-accurate fault detection at all times regardless of the condition of the road surface. Further, since controlling means employed in the conventional active suspension is used as means for vibrating the dynamic system, the need for additional vibrating means is eliminated.

Third Embodiment

Figure 12:
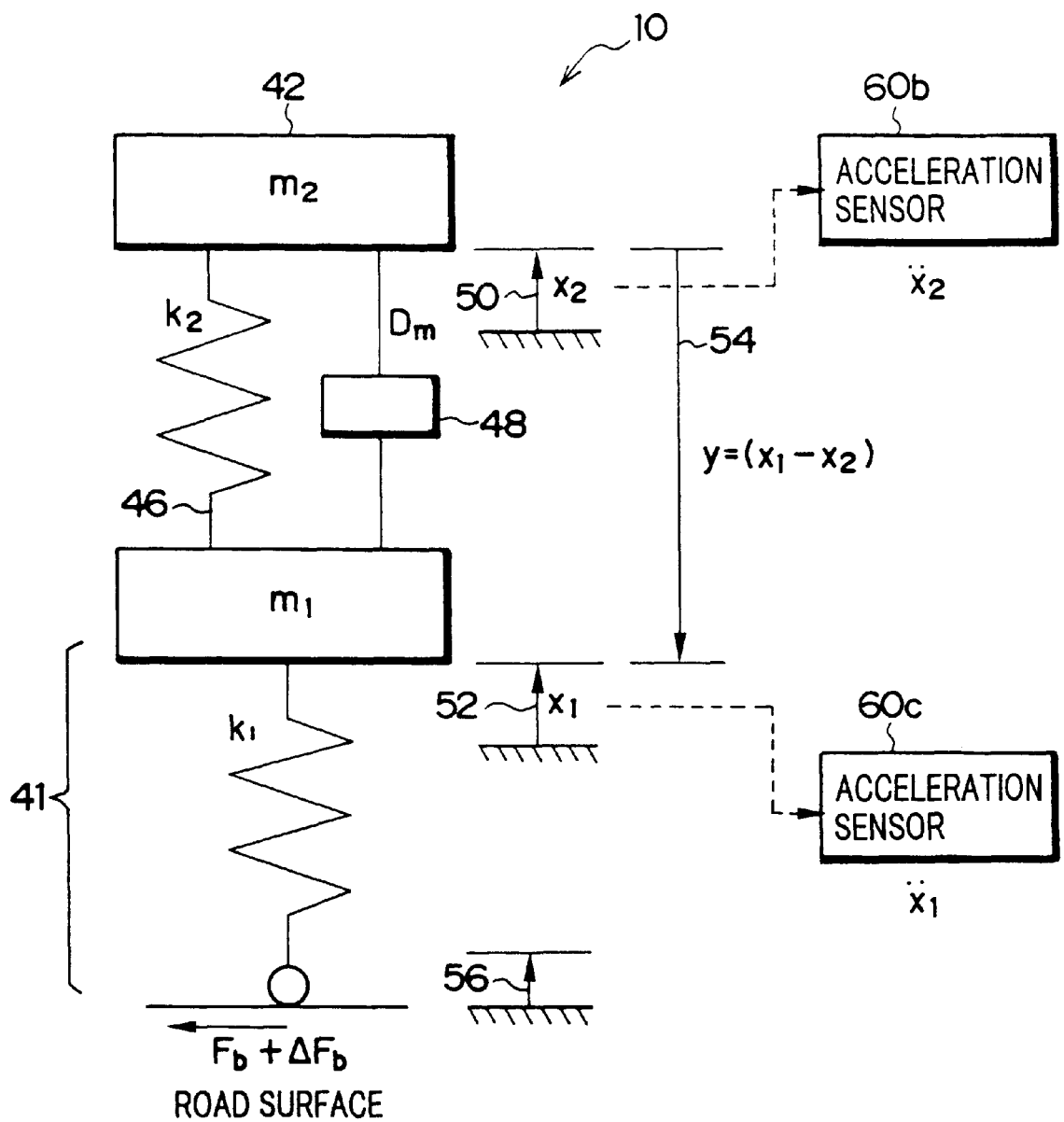
FIG. 12 is a schematic representation showing a dynamic system including a conventional suspension system and a wheel.

FIG. 12 shows the suspension system 10 comprising a conventional suspension (not an active suspension) and wheels. In the suspension system 10, the wheel 41 is represented by combination of an unsprung mass section expressed by a parameter m1 and a spring section of the tire expressed by a spring constant k1. Reference numeral 42 designates a vehicle body having a sprung mass m2; 46 designates a spring having a spring constant k2; 48 designates a damper having damping constant Dm; 56 designates displacement with reference to the road surface; 52 designates unsprung displacement expressed by variation x1; 50 designates sprung displacement represented by variation x2; and 54 designates relative displacement (x1−x2) represented by variable "y." Even in this dynamic system 10, as in the previous embodiments, the acceleration sensors 60b and 60c for detecting vertical vibrations of the wheel are provided in the respective sprung and unsprung sections.

Figure 4:
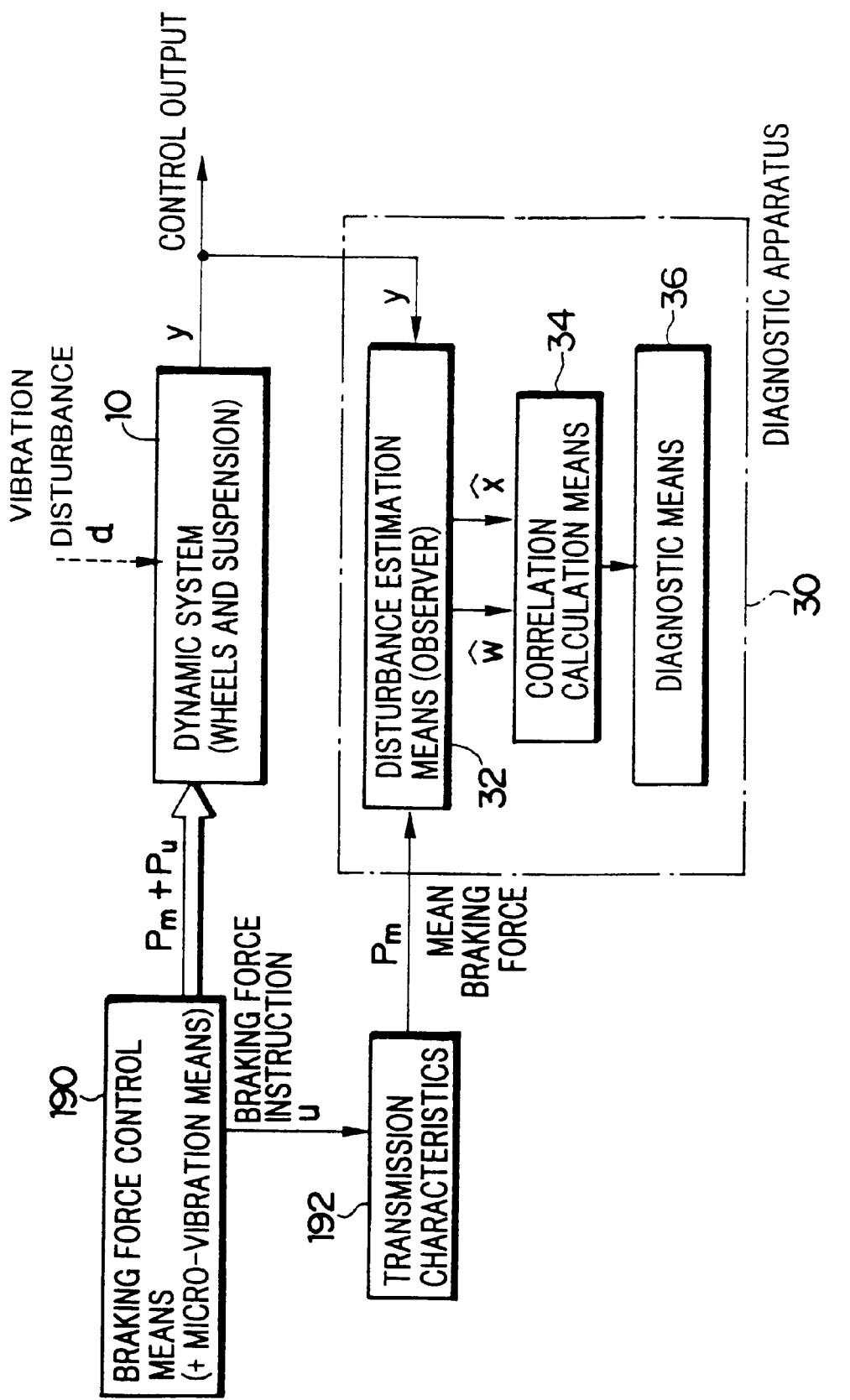
FIG. 4 is a block diagram showing the second example of the diagnostic apparatus of the present invention for a dynamic system composed of a wheel and a suspension system.

In the third embodiment, the braking force exerted on the wheel is minutely vibrated by means of the braking force control means 190 shown in FIGS. 3 and 4. In practice, as shown in FIG. 12, vibrated braking force $\Delta F_b$ is applied to the mean braking force $F_b$ which the wheel receives as reaction from the road surface. The braking force $\Delta F_b$ is vibrated by a white signal or a frequency-shifted signal, so that white vibration disturbance occurs in the vehicle even when the vehicle travels over a road in good condition. As a result of the vibration disturbance, the displacement x0 (=Δy) of the suspension system constantly changes within a certain extent of amplitude, thereby holding the value output from the suspension system 10 at a given value or more.

Such a suspension system 10 is represented by the equation of state in the following way.

$$\frac{d}{dt}\begin{bmatrix} x_2 \\ \dot{x}_2 \\ y \\ \dot{y} \end{bmatrix} = \begin{bmatrix} 0 & 1 & 0 & 0 \\ 0 & 0 & \frac{k_2}{m_2} & \frac{D_m}{m_2} \\ 0 & 0 & 0 & 1 \\ -\frac{k_1}{m_1} & 0 & -a & -Dmb \end{bmatrix}\begin{bmatrix} x_2 \\ \dot{x}_2 \\ y \\ \dot{y} \end{bmatrix} + \begin{bmatrix} 0 \\ 0 \\ 0 \\ \frac{k_1}{m_1} \end{bmatrix}\dot{x}_0 \quad (30)$$

where $a=k_1/m_1+k_2/m_1+k_2/m_2$, $b=1/m_1+1/m_2$.

FIG. 13 is a block diagram showing the suspension system 10 to be examined shown in FIG. 12.

Some conventional suspension systems are designed so as to change the damping force of the suspension according to the condition of the road surface or the driver's decision. Such a suspension system can be modeled by assuming that the damping constant Dm of the damper changes. At this time, assume that Dm shown in FIG. 12 represents a representative value of the changeable Dm.

As in the previous embodiments, the elements contained in the internal state quantity vector "x" expressed by Equation (30) are calculated by the calculation section provided in the suspension system 10, and the result of such calculation is output. More specifically, the sprung acceleration is directly output from the sensor 60b, and the sprung speed is calculated by integration of the value of the sprung acceleration. Relative acceleration is calculated from a difference between the unsprung acceleration and the sprung acceleration, and relative speed is calculated by integration of the relative acceleration. Accordingly, the output from the suspension system 10 becomes equal to the internal state quantity vector "x" expressed by Equation (30).

The diagnostic apparatus 30 in accordance with the third embodiment which examines the suspension system 10 having the foregoing configuration will be described hereinbelow in detail.

In a case where the air pressure in the tire is normal, and the spring constant of the tire is k1, the disturbance observer 32 estimates and calculates the total disturbance expressed by the following equation.

$$\hat{w} = \begin{bmatrix} \hat{w}_1 \\ \hat{w}_2 \end{bmatrix} = \begin{bmatrix} \frac{\Delta Dm}{m^2}\ddot{y} \\ -\Delta Dm b \ddot{y} + \frac{k_1}{m_1}\dot{x}_0 \end{bmatrix}$$

The foregoing equation is based on the assumption that the damping constant Dm of the suspension changes, and the quantity of variation with reference to the representative value thereof is expressed as ΔDm.

If the air pressure in the tire changes, and the spring constant of the tire changes by Δk1 to (k1+Δk1), the disturbance observer 32 outputs a signal expressed by the following equation.

$$\hat{w} = \begin{bmatrix} \hat{w}_1 \\ \hat{w}_2 \end{bmatrix} = \begin{bmatrix} \frac{\Delta Dm}{m^2}\ddot{y} \\ -\Delta Dm b \ddot{y} + \frac{\Delta k_1}{m_1}\dot{x}_2 - \frac{\Delta k_1}{m_1}\dot{y} + \frac{k_1+\Delta k_1}{m_1}\dot{x}_0 \end{bmatrix} \quad (6\text{-}6)$$

As can be seen from the above equation, the total disturbance estimated by the disturbance observer 32 includes the disturbance resulting from the change in the damping constant, the internal disturbance stemming from the change in the air pressure in the tire, and the vibration disturbance resulting from vibration of the braking force.

A cross-correlation function calculation section 70 calculates a correlation function between the relative speed and the second element of the estimated total disturbance which includes the internal disturbance stemming from the change in the air pressure in the tire. An autocorrelation function calculation section 74 calculates the autocorrelation function of the relative speed by means of a method analogous to that previously employed in the preceding embodiments.

A normalization section 72 detects the quantity of variation in the spring constant by dividing an output from the cross-correlation function calculation section 70 by an output from the autocorrelation function calculation section 74, and the thus-detected quantity of variation is output to an anomaly determination section 78.

Accordingly, the anomaly determination section 78 determines an anomaly in the air pressure by comparison of the thus-received quantity of variation in the spring constant with a predetermined reference value.

As described above, in the third embodiment, even in the case of the wheel attached to the conventional non- active suspension, an anomaly in the air pressure in the tire can be detected only by provision of the acceleration sensors 60b, 60c for sensing the vertical acceleration of each of the sprung and unsprung sections of the suspension system.

Even in the third embodiment, a fault can be highly accurately detected at all times regardless of the condition of the road surface by application of vibration disturbance to the suspension system through vibration of the braking force until the control output value is set to a given value or more. The third embodiment has an advantage that it can be applied to a vehicle having a non-active suspension system. Further, a conventional ABS actuator used for anti-lock braking (ABS) operation purposes can be also used as the means for vibrating the braking force (see FIGS. 20 to 21 related to a fourth embodiment).

Fourth Embodiment

A fourth embodiment of the present invention will now be described.

(Principle of the Fourth Embodiment)

Figure 16:
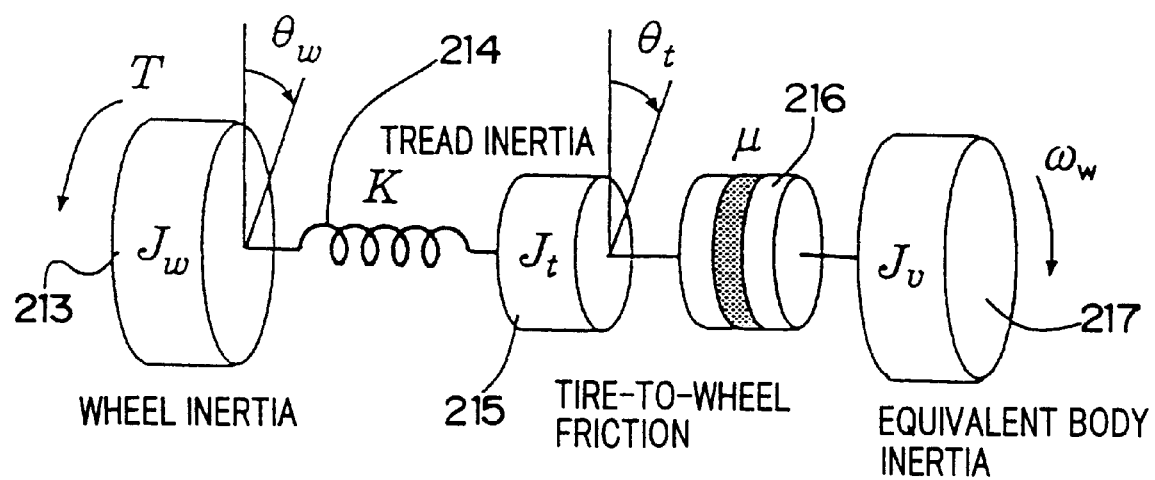
FIG. 16 is an equivalent model made by conversion of the dynamic model of the vehicle along the axis of rotation.

As shown in FIG. 15, the phenomenon of vibration occurring in a wheel when a vehicle equipped with a body 212 having a weight W is traveling at speed "v"; i.e., the phenomenon of vibration occurring in a wheel resonance system comprising the body, the wheel, and the road surface, will now be examined in reference to a model shown in FIG. 16 in which the phenomenon of vibration is equivalently modeled with reference to the rotary shaft of the wheel.

The braking force acts on the road surface via the surface of a tire tread 215 of the tire which is in contact with the road surface. In practice, the braking force acts on a body 212 as reaction from the road surface. Therefore, a model 217—which is equivalent to the vehicle weight converted with reference to the rotary shaft of the wheel—is attached opposite to a wheel 213 via a frictional element 216 existing between the tire tread and the road surface. As in the case of a chassis dynamometer, the modeling of vehicle weight is similar to the simulation of vehicle weight by utilization of great inertia existing below the wheel; i.e., mass provided opposite to the wheel.

In FIGS. 15 and 16, it is assumed that the inertia of the wheel 213 including a tire rim is Jw; the spring constant of a spring element 214 provided between the tire rim and the tread 215 is K; the inertia of the tread 215 is Jt; the coefficient of friction of the frictional element 216 provided between the tread 215 and the road surface is $\mu$; and the inertia of the model 217—which is equivalent to the weight of the body 212 converted with reference to the rotary shaft of the wheel—is Jv. The characteristics of the entire suspension system are expressed by the following Equations (2a) to (4a). In the following equations, the first differential d/dt with time is expressed by symbol "'", and the second differential $d^2/dt^2$ with time is expressed by symbol "''".

$$J_w\theta_w'' = -T + K(\theta_t - \theta_w) \quad (2a)$$

$$J_t\theta_t'' = -K(\theta_t - \theta_w) + \mu WR \quad (3a)$$

$$J_v\omega_v' = -\mu WR \quad (4a)$$

$$W_w = \theta_w' \quad (5a)$$

$$J_v = R^2 W \quad (6a)$$

$$\omega_v = v/r \quad (7a)$$

where $\theta_w$ represents a rotational angle of the wheel 213; $\theta_w''$ represents the rotational angular acceleration of the wheel 213; $w_w$ represents the rotational angular velocity of the wheel 213, or the wheel speed; $\theta_t$ represents the rotational angle of the tread 215; $\theta_t''$ represents the rotational angular acceleration of the tread 215; $\omega_v$ represents the rotational angular velocity of the vehicle-body equivalent model 217; T represents the braking torque applied to the wheel 213; W represents the weight of the vehicle body; and R represents the radius of the wheel. In effect, the braking torque T is applied by control of pressure $P_b$ in a brake valve.

Assuming that the tread 215 is directly connected to the equivalent model 217 when the tire grips the road surface, resonance occurs between the inertia of the wheel 213 and the inertia of the sum of the inertia of the equivalent model 217 and the inertia of the tread 215, and the resonance frequency $f_1$ of the wheel resonance system at this time is given by $$f_1 = \sqrt{\{(J_w + J_t + J_v)K/J_w(J_t + J_v)\}}/2\pi \quad (8a).$$

From Equation (8a), it is understood that the resonance frequency $f_1$ changes in proportion to a square root of the spring constant K which is a physical quantity relevant to the air pressure in the tire. Under normal conditions, the change in each moment of inertia can be ignored. For this reason, the change in the spring constant K; i.e., the change in the air pressure in the tire, can be detected from the change in the resonance frequency $f_1$ on condition that the tire grips the road surface.

Figure 19:
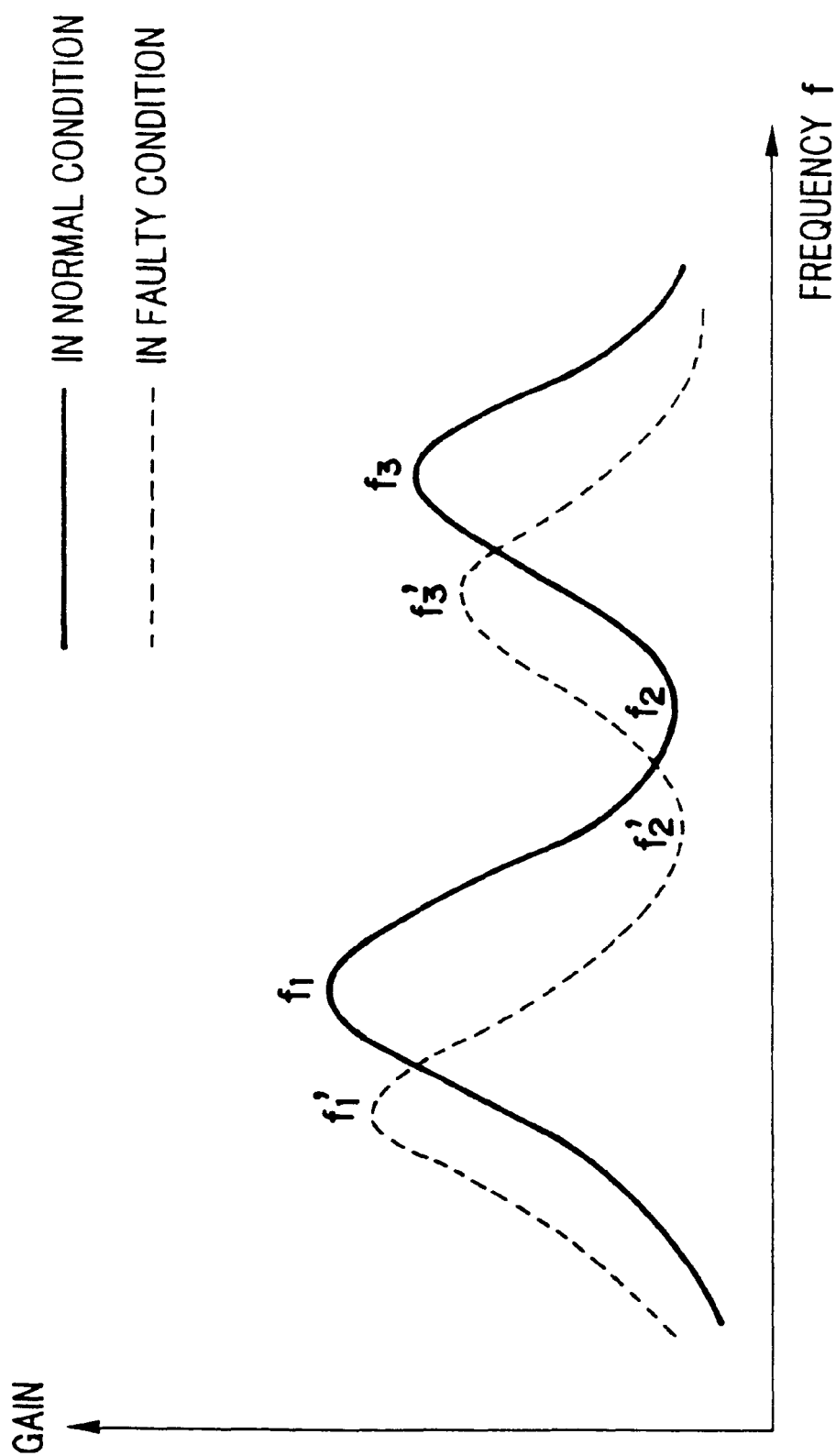
FIG. 19 is a graph showing a difference in vibration characteristics between the dynamic system in a normal condition and the dynamic system in an anomalous condition in accordance with the fourth embodiment.

FIG. 19 shows the vibration characteristics of the dynamic system such as the foregoing wheel vibration system. FIG. 19 shows the frequency characteristics of a gain of oscillatory component output from the dynamic system through vibration of the dynamic system by use of a white signal (i.e., a ratio of an amplitude of the output signal from the dynamic system to an amplitude of the vibration signal). In FIG. 19, the vibration characteristics of the dynamic system in a normal condition is designated by a solid line, and the vibration characteristics of the dynamic system in an anomalous condition is designated by a broken line. Further, the gain output from the wheel resonance system corresponds to a ratio of the amplitude of the oscillatory component of the wheel speed to the amplitude of vibration.

As shown in FIG. 19, it is understood that resonance frequencies $f_1'$, $f_3'$ are shifted toward a lower frequency range compared with resonance frequencies $f_1$, $f_3$. $f_1'$ and $f_3'$ are resonance frequencies at which the gain becomes largest when the dynamic system is faulty, and $f_1$ and $f_3$ are those at which the gain becomes largest when the dynamic system is normal. This phenomenon corresponds to the shift of the resonance frequency $f_1$ of the wheel resonance system toward a lower frequency range. It is also understood that a non-resonance frequency $f_2'$—at which the gain becomes smallest when the dynamic system is faulty—is also shifted toward a lower frequency range compared with a non-resonance frequency $f_2$ at which the gain becomes smallest when the dynamic system is normal. Depending on the characteristics of the dynamic system or the oscillatory component of interest, the frequencies—at which the gain becomes largest and smallest, respectively, when the dynamic system is faulty—may shift toward a higher frequency range compared with the frequencies at which the gain becomes largest and smallest, respectively, when the dynamic system is normal.

As described above, the vibration characteristics calculated from the output from the vibrated dynamic system differ according to whether the dynamic system is in a normal or anomalous condition. The dynamic system can be diagnosed by detecting the difference between the vibration characteristics. The dynamic system can be diagnosed by detection of the change in the resonance frequency, as well as by detection of a change in the functional relationship between the frequency and the gain (e.g., the number of maximum and minimum gains).

Further, the fault can be localized on the basis of the functional relationship between the frequency and the gain. For example, a variation pattern differs according to whether the change is a change in the functional relationship stemming from a variation in the air pressure in the tire or a change due to another fault other than the change in the air pressure in the tire. The fault of the dynamic system can be localized by utilization of the variation pattern.

(Configuration and Operation of the Fourth Embodiment)

FIG. 17 is a block diagram showing the configuration of a dynamic system in accordance with a fourth embodiment of the present invention. The dynamic system shown in FIG.

17 is designed so as to impart micro vibration to the dynamic system comprising a wheel and a suspension system through braking force.

As shown in FIG. 17, the diagnostic apparatus in accordance with the fourth embodiment is provided with braking force control means 402 which applies a braking force ($P_m+P_v$) to the wheel of a dynamic system 400. Reference symbol $P_m$ designates a mean braking force applied to the wheel, which corresponds to the master cylinder pressure resulting from application of the driver's leg power to the brake pedal. $P_v$ represents the oscillatory component of the braking force vibrated in the vicinity of the mean braking force or the braking force vibrated by a white signal such as a M-series signal or a frequency-shifted signal.

The rotational speed $\omega_w$ (i.e., wheel speed) of the wheel output from a wheel speed sensor (not shown) attached to the wheel of the dynamic system 400 is output to braking force control means 402. As will be described later, on the basis of the wheel deceleration speed calculated from the wheel speed $\omega_w$, the braking force control means 402 determines whether or not to apply a micro vibration component $P_v$ to the braking force exerted on the wheel.

The diagnostic apparatus has an FFT calculation section 404 which calculates a frequency spectrum of the wheel speed by fast Fourier transformation (FFT) of time-series data regarding the wheel speed $\omega_w$ received at a given cycle; a vibration characteristics detection section 406 for detecting the vibration characteristics of the dynamic system 400 on the basis of the thus-calculated frequency spectrum of the wheel speed: and a diagnostic section 408 for diagnosing the dynamic system 400 on the basis of the detected vibration characteristics.

Internal memory of the diagnostic section 408 stores vibration characteristic data concerning the dynamic system 400 when it is in a normal condition and a plurality of sets of data concerning anomalous vibration-characteristic patterns (i.e., anomalous vibration characteristic patterns). The diagnostic section 408 diagnoses a fault in the dynamic system 400 (i.e., the air pressure in the tire) by determining a difference between the detected vibration characteristics and the vibration characteristics obtained when the dynamic system is in a normal condition.

The anomalous vibration characteristic pattern can be represented by a frequency value including the maximum and minimum values improbable as the vibration characteristics of the dynamic system 400 in a normal condition, by data concerning the number of these maximum and minimum values, or by data concerning the functional characteristics of the frequency value. The location and type of a fault in the dynamic system are specified for each of anomalous vibration characteristic patterns. When there is an anomaly in the detected vibration characteristics, the diagnostic section 408 checks the detected vibration characteristics against the anomalous vibration characteristic patterns. The location and type of a fault corresponding to the anomalous vibration characteristic pattern most analogous to the detected vibration characteristics are specified, thereby diagnosing the fault in the dynamic system.

Next, the configuration of the braking force control means 402 will be described in reference to FIGS. 20 to 21.

The braking force control means 402 includes a brake valve driver which converts the instruction signal "u" concerning the mean braking power $P_m$ and an vibration instruction signal $\Delta u$ concerning the minutely vibrated braking force $P_v$ into braking torque actually applied to the wheel. As shown in FIG. 20, the brake valve driver comprises a booster 235, a valve control system 236, a brake caliper 237, a reservoir tank 238, and an oil pump 239.

A brake pedal 234 is connected to a pressure increase valve 240 of the valve control system 236 via the booster 235 which increases the force used for actuating the brake pedal 234. The valve control system 236 receives a valve actuation instruction signal and is connected to the brake caliper 237. Further, the valve control system 236 is connected to the reservoir tank 238 via a pressure decrease valve 241.

Figure 21:
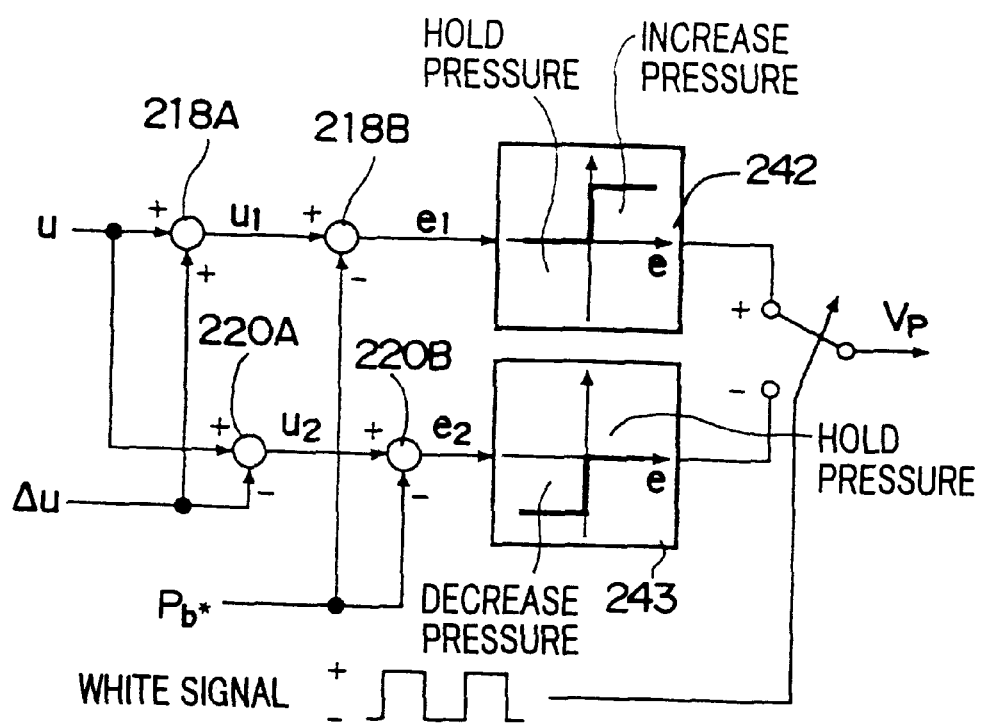
FIG. 21 is a block diagram showing an vibration instruction signal generation section of the braking force control means of the dynamic system in accordance with the fourth embodiment.

The valve actuation instruction signal is produced by a circuit shown in FIG. 21. This circuit receives the instruction signal "u" concerning the mean braking power $P_m$ and the vibration instruction signal $\Delta u$ concerning the minutely vibrated braking force $P_v$. As shown in FIG. 21, the mean braking force $P_m$ is vibrated by means of a white signal.

The principle of operation of the dynamic system will now be described. First, an calculation section 218A calculates a sum $u_1$ of the instruction signal "u" concerning the mean braking power $P_m$ and the vibration instruction signal $\Delta u$ concerning the minutely vibrated braking force $P_v$. A calculation section 220A calculates a difference $u_2$ between the instruction signal "u" concerning the mean braking power $P_m$ and the vibration instruction signal $\Delta u$ concerning the minutely vibrated braking force $P_v$. The sum $u_1$ corresponds to the upper limit of the braking force instruction, whereas the sum $u_2$ corresponds to the lower limit of the braking force instruction. A calculation section 218B calculates a difference $e_1$ between the upper limit of the braking force instruction $u_1$ and actual braking pressure $P_{b^*}$, and a calculation section 220B calculates a difference $e_2$ between the lower limit of the braking force instruction $u_2$ and the actual braking pressure $P_{b^*}$. Instruction signal generation sections 242, 243 calculate the positions of the valves from the differences $e_1$, $e_2$, respectively, and produce instruction signals. The braking pressure is vibrated by switching the instruction signals at an vibration frequency corresponding to a white signal. Only an instruction signal for increasing the pressure of the valve and maintaining the thus-increased pressure is produced with respect to the sum $u_1$. Similarly, only an instruction signal for decreasing the pressure of the valve and maintaining the thus-decreased pressure is produced with respect to the difference $u_2$. As a result, excessive switching of the instructions for controlling the braking pressure can be prevented.

The operation of the dynamic system in accordance with the fourth embodiment will be described in reference to a flowchart shown in FIG. 18.

As shown in FIG. 18, first, it is determined whether or not the wheel deceleration calculated from the wheel speed $\omega_w$ is smaller than a negative value −a used as the reference value (step 300) If the wheel deceleration is smaller than the negative value −a (YES in step 300), it is determined that the wheel may fail to grip the road surface. The next diagnosing step is not performed, and the processing is in a wait condition. If the wheel fails to grip the road surface, the tread 215 shown in FIG. 15 is separated from the equivalent model 217 in an equivalent manner. As a result, resonance arises between the tread 215 and the wheel 213, and the resonance frequency of the wheel resonance system shifts toward a higher frequency range regardless of the existence of a variation in the air pressure in the tire.

Figure 22:
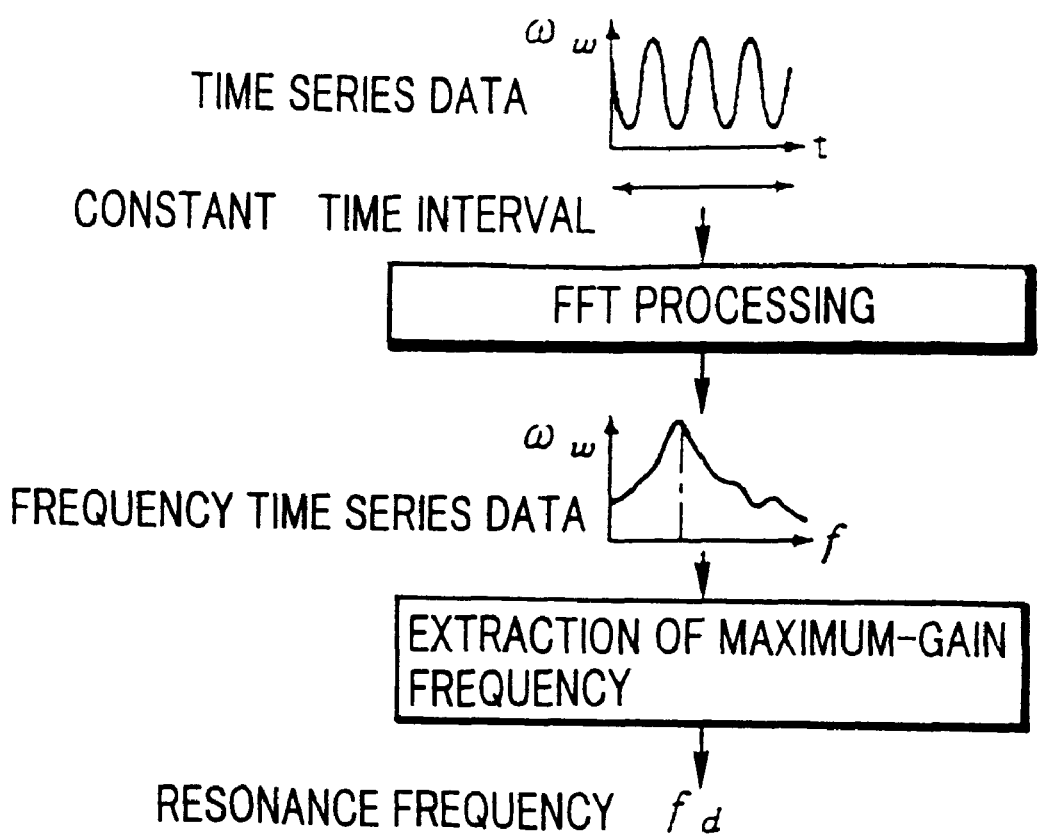
FIG. 22 is a diagrammatic representation showing the processing performed by an FFT calculation section and an vibration characteristics detection section of the diagnostic apparatus in accordance with the fourth embodiment.

In contrast, if the wheel deceleration is larger than the negative value −a (NO in step 300), the braking force control means 402 commences micro vibration of the braking force (step 302). Next, the FFT calculation section 404 performs fast Fourier transformation for the time-series data which are sampled at predetermined intervals and relate to the wheel speed $\omega_w$ including an vibration component, thereby outputting the thus-calculated frequency time-series data (step 303). The vibration characteristic detection section 406 extracts a maximum-gain frequency from the frequency time-series data output from the FFT calculation section 404, to thereby detect the resonance frequency $f_d$ (step 304). FIG. 22 illustrates the flow of processing performed in steps 303 and 304.

As shown in FIG. 18, if the vibration characteristics are detected, the diagnostic section 408 reads out from the memory the vibration characteristic data when the air pressure in the tire is in a normal condition (step 306). The vibration characteristic data in a normal condition include the resonance frequency $f_1$ expressed by Equation (8a).

Next, the diagnostic section 408 compares the detected vibration characteristics of the dynamic system with the vibration characteristics of the dynamic system in a normal condition, to thereby detect the change $\Delta f$ in the vibration characteristics (step 308). For example, the change $\Delta f$ is calculated as the quantity of shift ($=f_1-f_d$) in the resonance frequency.

Next, it is determined whether or not the thus-calculated change $\Delta f$ is in excess of a reference value Th (>0) (step 310). If the change $\Delta f$ is determined to exceed the reference value Th (YES in step 310), it is determined that there is an anomaly in the air pressure in the tire of the dynamic system 400. In steps 310 and 312, the location and type of the fault may be estimated by comparing the detected vibration characteristics with the data concerning the anomalous vibration characteristic patterns stored in the internal memory of the diagnostic section 408 to thereby determine which of the anomalous vibration characteristic patterns corresponds to the detected vibration characteristics. Further, the degree of the fault can also be estimated on the basis of the degree of similarity between the thus-detected vibration characteristic pattern and the anomalous vibration characteristic patterns.

In contrast, if the change $\Delta f$ is determined not to be in excess of the reference value Th (NO in step 310), the air pressure in the tire is determined to be normal (step 314). However, in the case of $\Delta f<0$ which is improbable to obtain from Equation (8a), it is determined that there arises a fault stemming from a reason other than the variation in the air pressure in the tire. In this case, the location and type of the fault may be specified by checking the detected vibration characteristic pattern against the anomalous vibration characteristic patterns.

As described above, in accordance with the fourth embodiment, a fault in the dynamic system is diagnosed on the basis of the vibration characteristics which faithfully reflect a fault in the dynamic system (i.e., a change in the resonance frequency), thereby resulting in an advantage of ability to correctly diagnose a fault through use of a simple method.

Fifth Embodiment

Figure 23A:
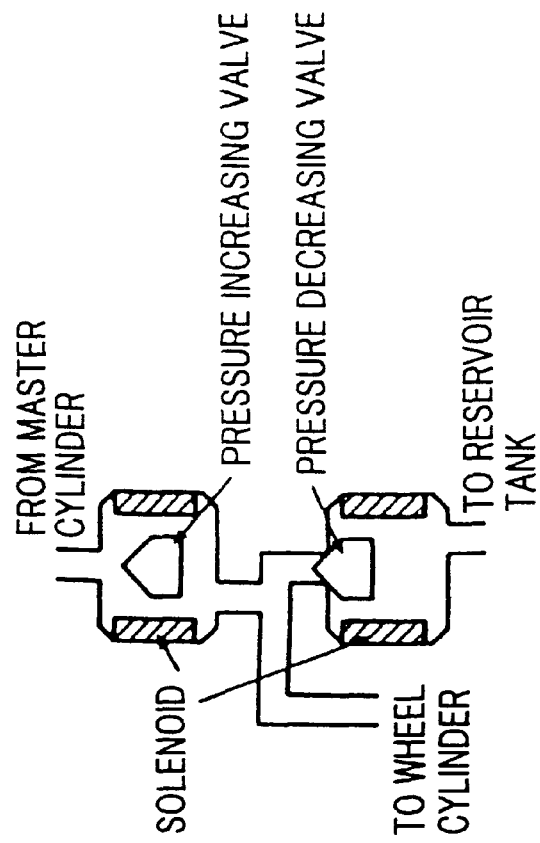
FIG. 23A is a schematic representation showing an ABS actuator including one 3-position valve.
Figure 23B:
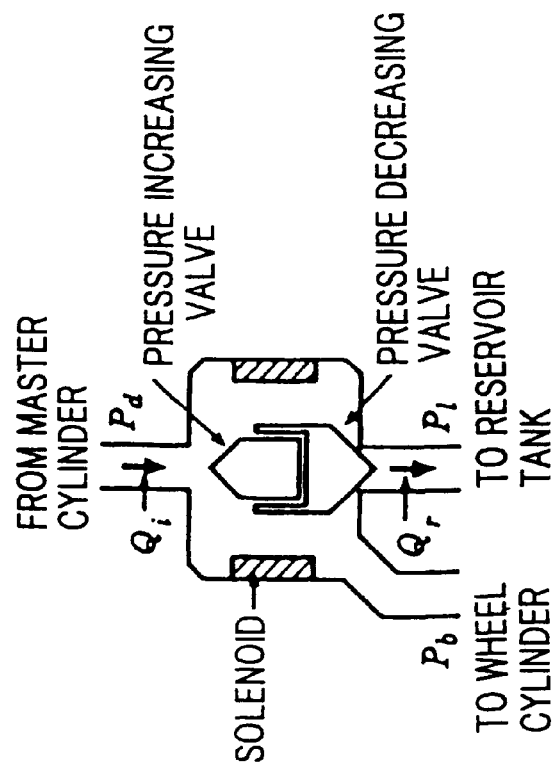
FIG. 23B is a schematic representation showing an ABS actuator including two 2-position valves.
Figures 24A, 24B, 24C:
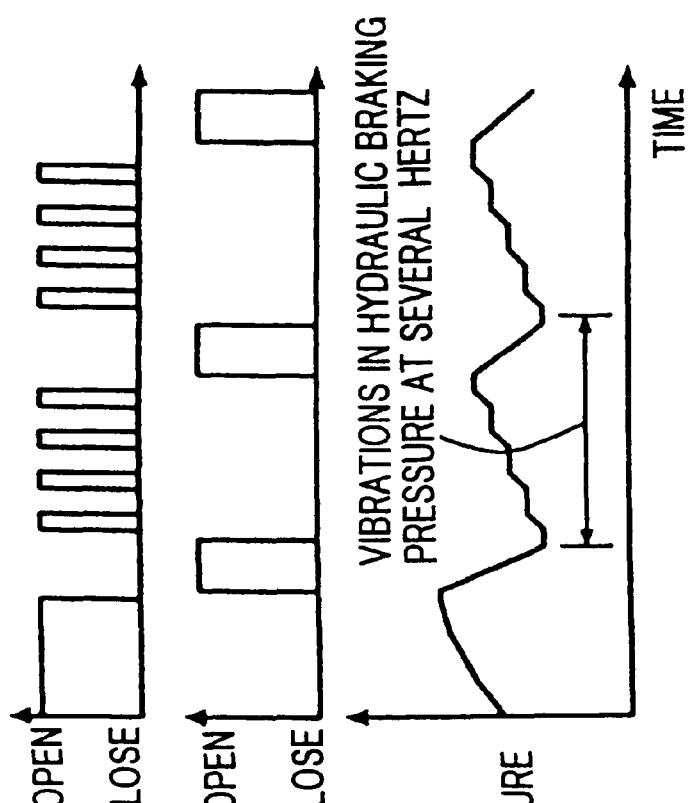
FIG. 24A is a plot showing pulses for opening or closing a pressure increase valve.
FIG. 24B is a plot showing pulses for opening or closing a pressure decrease valve.
FIG. 24C is a plot showing variations in hydraulic wheel cylinder pressure with time when the pressure increase and decrease valves are controlled by means of the foregoing pulses.

FIG. 23A shows an ABS actuator comprising one 3-position valve, and FIG. 23B shows an ABS actuator comprising two 2-position valves. As shown in FIGS. 23A and 23B, the ABS actuator comprises a pressure increase valve connected to a master cylinder and a pressure decrease valve connected to a reservoir tank. These valves are opened or closed in accordance with electrical instruction signals from a control section (not shown). With the pressure increase valve being open and the pressure decrease valve being closed, the wheel cylinder pressure is increased to the master cylinder pressure in proportion to the pressure resulting from the driver's depression of the pedal. Conversely, with the pressure increase valve being closed and the pressure decrease valve being opened, the wheel cylinder pressure is reduced to the pressure in the reservoir which is substantially the same as the atmospheric pressure. With both valves closed, the wheel cylinder pressure is maintained.

Provided that the wheel cylinder pressure is $P_b$; the master cylinder pressure is $P_d$; and the reservoir pressure is $P_1$, the quantity of brake fluid $Q_i$ flowing into the wheel cylinder at the time of an increase in the pressure and the quantity of brake fluid Qr flowing out of the wheel cylinder at the time of reduction in the pressure are each expressed by $$Q_i = A_i \sqrt{\frac{2}{\rho}(p_d - p_b)} \qquad (31)$$

$$Q_r = A_2 \sqrt{\frac{2}{\rho}(p_b - p_l)}. \qquad (32)$$

The quantities of brake fluid $Q_i$ and $Q_r$ are proportional to a square root of a pressure difference. In the mode in which the pressure is held, the quantities of brake fluid $Q_h$ flowing into or out of the wheel cylinder is represented by $$Q_h = 0 \qquad (33).$$

In Equations (31) to (33), $A_1$ and $A_2$ represent constants; and "$\rho$" is a density of the brake fluid. When it is assumed that a variation in the density "$\rho$" is small, that is, "$\rho$" is and constant, a variation in the hydraulic pressure in the brake with time ($dP_b/dt$) becomes proportional to the quantity of fluid Q. Therefore, there are obtained $$\frac{dP_b}{dt} = a_1 \sqrt{P_d - P_b} \ldots \text{(Pressure Increase: } P_b < P_d) \qquad (34)$$

$$\frac{dP_b}{dt} = -a_1 \sqrt{P_b - P_l} \ldots \text{(Pressure Decrease: } P_b > P_l) \qquad (35)$$

$$\frac{dP_b}{dt} = 0 \ldots \text{(Pressure Hold)} \qquad (36)$$

As a result of use of the foregoing mathematical model, a waveform Pb concerning the hydraulic braking pressure of the wheel cylinder becomes similar to that shown in FIGS. 25A to 25C when the instruction signals output to the valve are switched at a given cycle between the pressure increase/hold mode and the pressure decrease/hold mode. In FIGS. 25A to 25C, the pressure increase time is $t_i$, and the pressure decrease time is $t_r$.

As shown in FIGS. 25B and 25C, it is understood that the mean value of the hydraulic braking pressure (i.e., mean braking pressure) can be controlled by means of a ratio of the pressure increase time $t_i$ to the pressure decrease time $t_r$, and that the amplitude of the micro vibration (or the micro amplitude of braking pressure) can be controlled according to the period of each of the pressure increase time $t_i$ and the pressure decrease time $t_r$.

At this time, if the master cylinder pressure is constant, the mean braking pressure $P_m$ and the micro amplitude $P_v$ of the braking pressure are determined uniquely with respect to the pressure increase and decrease time $t_i$ and $t_r$. More specifically, the mean braking pressure $P_m$ and the micro amplitude $P_v$ of the braking pressure can be represented as functions of the pressure increase and decrease time $t_i$ and $t_r$.

$$P_m = (\text{Mean value of } P_b(t_i, t_r)) \quad (37)$$
$$= P_m(t_i, t_r)$$

$$P_v = (\text{Minute amplitude of } P_b(t_i, t_r)) \quad (38)$$
$$= P_v(t_i, t_r)$$

Figure 26B:
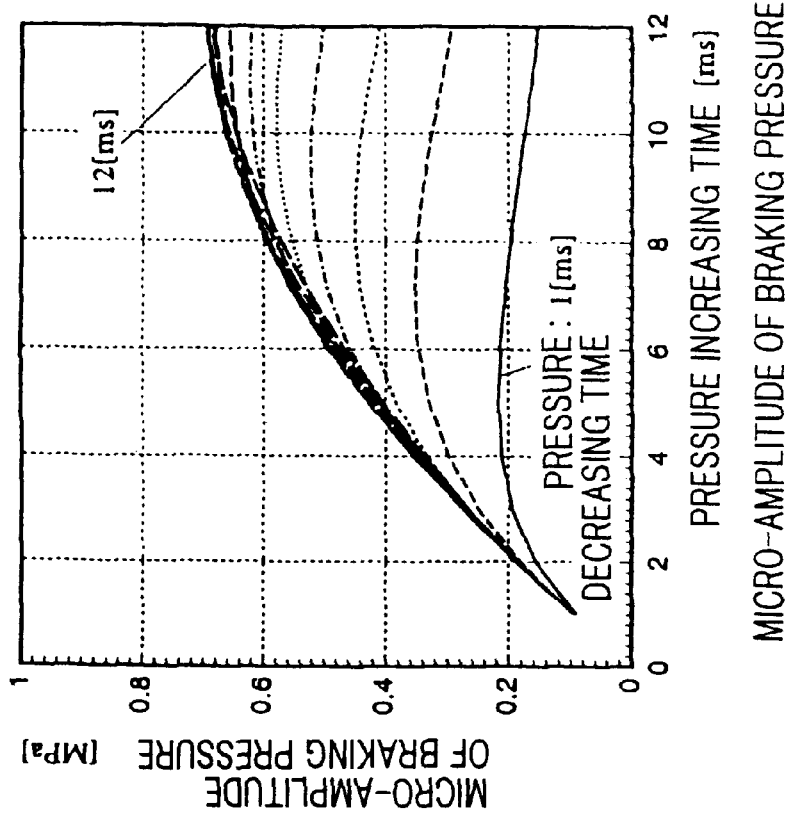
FIG. 26B is a graph showing the characteristics of a hydraulic braking pressure with respect to the pressure increase and decrease time periods, and particularly, the micro amplitude characteristics of the braking pressure.
Figure 26A:
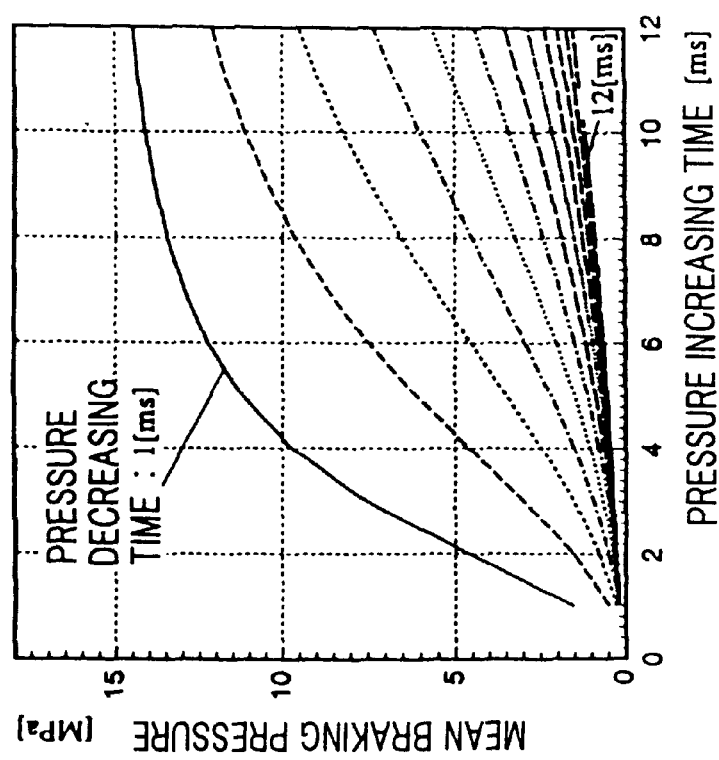
FIG. 26A is a graph showing the characteristics of a hydraulic braking pressure with respect to the pressure increase and decrease time periods, and particularly, the characteristics of a mean braking pressure.

FIGS. 26A and 26B show variations in the mean braking pressure and the micro amplitude of the braking pressure when the pressure increase and decrease time of the valve is changed in a case where the master cylinder pressure is constant at 15.5 (MPa). The graphs shown in FIGS. 26A and 26B are obtained by simulation of the mean braking pressure when the pressure increase and decrease time of the valve is switched at a cycle of 24 ms while the master cylinder pressure is maintained at a pressure of 15.5 MPa.

Figure 27B:
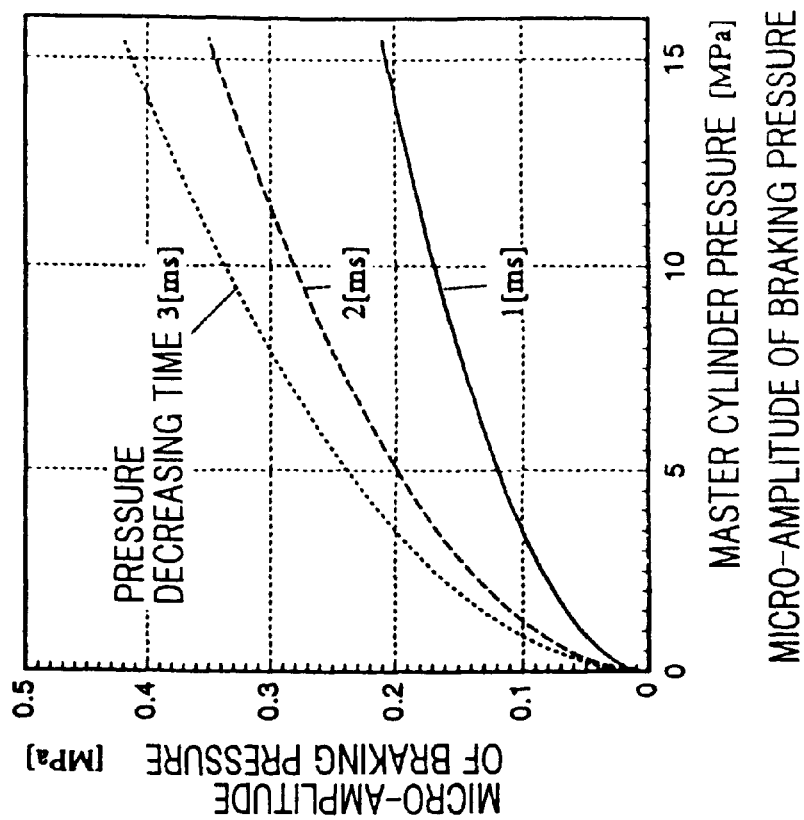
FIG. 27B is a graph showing the characteristics of a hydraulic braking pressure with respect to the pressure increase/decrease time, and particularly, the micro amplitude characteristics of the braking pressure.
Figure 27A:
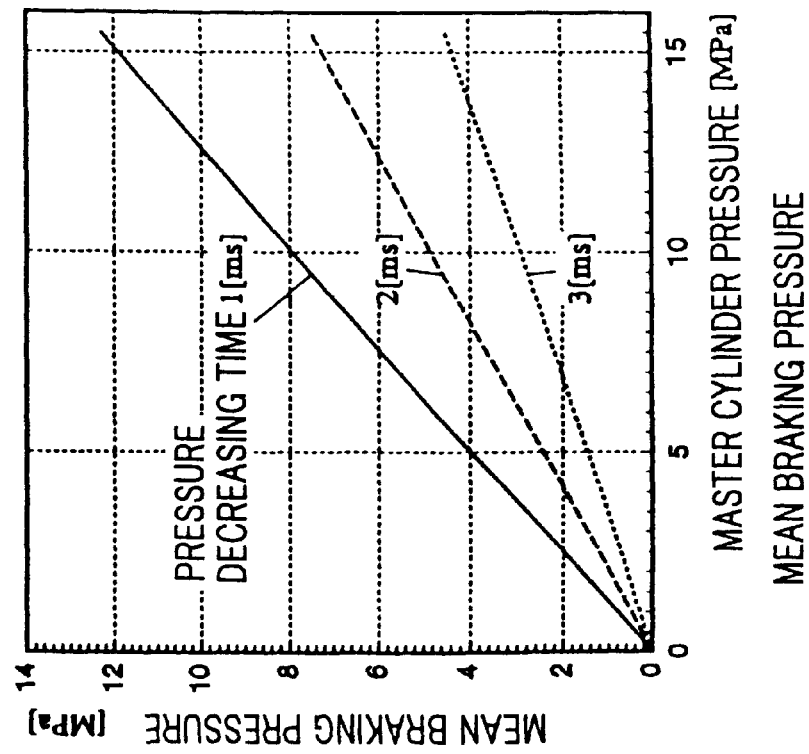
FIG. 27A is a graph showing the characteristics of a hydraulic braking pressure with respect to the master cylinder pressure, and particularly, the characteristics of a mean braking pressure.

FIGS. 27A and 27B show variations in the mean braking pressure and the micro amplitude of the braking pressure when the master cylinder pressure is changed. FIGS. 27A and 27B show the case where the pressure increase time is constantly held at 6 ms while the pressure decrease time is sequentially changed from 1, 2, and 3 ms. From FIGS. 27A and 27B, it is seen that the next two things hold with respect to the identical pressure increase and decrease time.

(1) The mean braking pressure is proportional to the master cylinder pressure.

(2) The micro amplitude of the braking pressure is proportional to the square root of the master cylinder pressure.

From FIGS. 26A to 27B, it is understood that so long as the master cylinder pressure is determined, and the pressure increase and decrease time of the valve is apparent, the mean braking pressure and the micro amplitude of the braking pressure can be uniquely determined.

Figure 28:
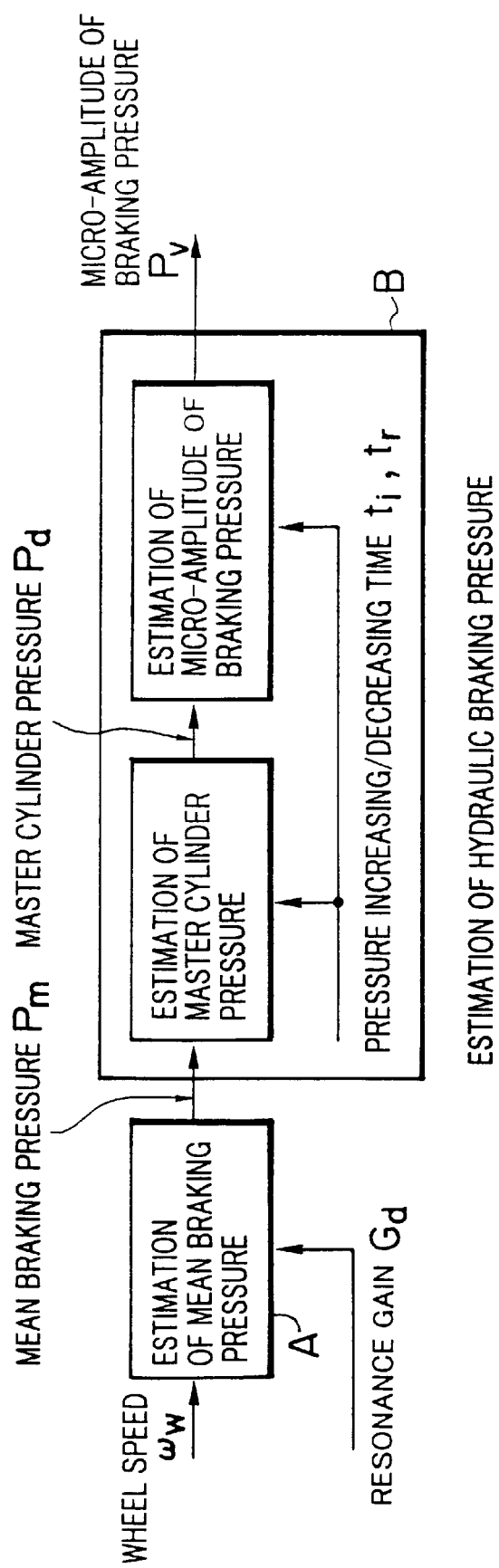
FIG. 28 is a block diagram showing estimation of hydraulic braking pressure in accordance with a fifth embodiment.

Next, in reference to FIG. 28, an explanation will be given of the fact that the micro amplitude of the braking pressure and the master cylinder pressure can be estimated from the mean braking pressure calculated from the change in wheel speed and the pressure increase and decrease time periods in a reverse manner. FIG. 28 is a block diagram showing the flow of estimation.

As shown in FIG. 28, the mean braking pressure $P_m$ is estimated on the basis of the wheel speed $\omega_w$ and a resonance gain $G_d$, which will be described later, in block A. Subsequently, in a first step in block B, the master cylinder pressure $P_d$ is estimated on the basis of the pressure increase time $t_i$, the pressure decrease time $t_r$, and the mean braking pressure $P_m$ estimated in the block A. In a second step in the block B, the micro amplitude $P_v$ of the braking pressure is estimated on the basis of the pressure increase time $t_i$, the pressure decrease time $t_r$, and the master cylinder pressure $P_d$ estimated in the first step.

The principle of the estimating operation performed in each of the blocks shown in FIG. 28 will now be described in detail.

(Principle of Estimating the Mean Braking Pressure in Block A)

First, in order to explain the principle of estimating the mean braking pressure $P_m$ from the wheel speed $\omega_w$ in the block A, a mathematical model of the vibration system comprising a wheel, a vehicle body, and the road surface is employed. Given that vehicle body speed is $\omega_u$; wheel speed is $\omega_w$; and slip speed is $\Delta\omega$, the vehicle body speed is expressed as $$\omega_u = \omega_w + \Delta\omega \quad (39).$$

Assume that the first differential of the vehicle body speed $\omega_u$ with time is proportional to the braking torque $T_b$ existing between the tire and the road surface, the braking torque is expressed as $$T_b = -k\frac{d\omega_u}{dt} = -k\left(\frac{d\omega_w}{dt} + \frac{d\Delta\omega}{dt}\right) \quad (40)$$

Assume that $T_b$ in the second term on the right side of Equation (40) is taken as a parameter, the braking torque $T_b$ can be transformed into $$T_b = -k\left(\frac{d\omega_w}{dt} + \frac{d\Delta\omega}{dT_b}\frac{dT_b}{dt}\right) \quad (41)$$
$$= -k\left(\frac{d\omega_w}{dt} + \frac{1}{\frac{dT_b}{d\Delta\omega}}\frac{dT_b}{dt}\right).$$

In Equation (41), the denominator $(dT_b/d\Delta\omega)$ of the coefficient $(dT_b/dt)$ in Equation (41) represents the gradient of the braking torque $T_b$ with respect to the slip speed $\Delta\omega$.

The phenomenon of vibrations in the wheel when the vehicle equipped with a body having weight W is traveling at speed $\omega_u$; i.e., the phenomenon of vibrations in a vibration system comprising the vehicle body, the wheel, and the road surface, will be considered in reference to the model shown in FIG. 16 in which the phenomenon of vibration is equivalently modeled with reference to the rotary shaft of the wheel, as in the previous embodiment.

The braking force acts on the road surface via the surface of a tire tread 215 of the tire which is in contact with the road surface. In practice, the braking force acts on a vehicle body as reaction from the road surface. Therefore, the model 217—which is equivalent to the vehicle weight converted with reference to the rotary shaft of the wheel—is attached opposite to the wheel 213 via the frictional element 216 (road surface $\mu$) existing between the tire tread and the road surface. As in the case of a chassis dynamometer, the modeling of vehicle weight is similar to the simulation of vehicle weight by utilization of great inertia existing below the wheel; i.e., mass provided opposite to the wheel.

In FIG. 16, the inertia of the wheel 213 including a tire rim is Jw; the spring constant of a spring element 214 provided between the tire rim and the tread 215 is K; the radius of the wheel is R; the inertia of the tread 215 is $J_t$; the coefficient of friction of the frictional element 216 between the tread 215 and the road surface is $\mu$; and the inertia of the equivalent model 217 is $J_v$. Transmission characteristics between a torque $T_b'$ and the wheel speed $\omega_w$ caused by the wheel cylinder pressure are defined as $$\omega_w = \frac{\mu_0 J_v KRWS - \{J_t J_v s^3 + \alpha(J_t + J_v)R^2 WS^2 + J_v Ks + \alpha KR^2 W\}T_b}{s\{J_w J_t J_u s^3 + \alpha J_w (J_1 + J_v)R^2 WS^2 + (J_w + J_t)J_v Ks + \alpha(J_w + J_t + J_v)KR^2 W\}}. \quad (42)$$

Figure 29:
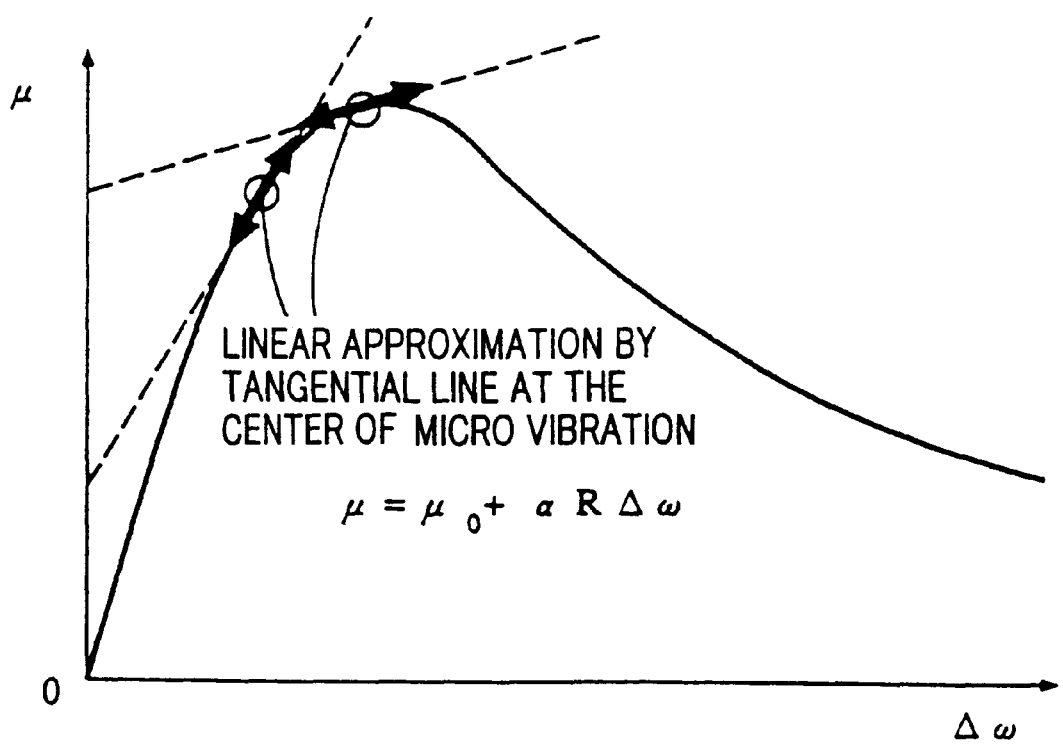
FIG. 29 is a graph showing the relationship between slip speed $\Delta\omega$ and a coefficient of friction $\mu$ and a gradient of the friction of coefficient $\mu$ in relation to the slip speed $\Delta\omega$.

Further, as shown in FIG. 29, a functional relationship—in which the coefficient of friction $\mu$ reaches its peak value at a certain slip rate—holds between the slip speed $\Delta\omega$ and the coefficient of friction $\mu$ of the road surface. In the functional relationship shown in FIG. 29, if the coefficient of friction $\mu$ changes with respect to the slip speed $\Delta\omega$ as a result of micro vibrations in the vicinity of a certain slip rate, the coefficient of friction $\mu$ of the road surface can be approximated to $$\mu = \mu_0 + \alpha R \Delta\omega \tag{43}$$

More specifically, since the change in the slip speed stemming from micro vibration is small, the coefficient of friction can be approximated to a line with gradient $\alpha R$.

If Equation (43) is substituted into the relationship of braking torque $T_b = \mu W$ caused by the coefficient of friction $\mu$ between the tire and the road surface, we have $$T_b = \mu W = \mu_0 w + \alpha R \Delta\omega W \tag{44}$$

Both sides of Equation (44) are differentiated one time with $\Delta\omega$, we have $$\frac{dT_b}{d\Delta\omega} = \alpha RW. \tag{45}$$

With regard to the transmission characteristics expressed by Equation (42), the resonance frequency $\omega\infty$ obtained when the tire grips the road surface is expressed as $$\omega^\infty = \sqrt{\frac{J_w + J_t + J_v}{J_w(J_t + J_v)}K}. \tag{46}$$

As the state of friction between the tire and the road surface approaches the peak value $\mu$, the tire becomes more apt to separate from the road surface and the resonance frequency shifts toward the higher frequency range. In other words, the state of friction can be detected by detection of the resonance frequency.

The vibration component $((\omega_w/P_b)|s=j\omega\infty)$ at the resonance frequency $\omega\infty$ of the ratio $(\omega_w/P_b)$ of the wheel speed $\omega_w$ to the braking pressure $P_b$ is taken as the resonance gain $G_d$. The following description is based on the assumption that the ABS actuator applies micro vibration at the resonance frequency $\omega\infty$ in the vicinity the mean braking pressure.

Since the torque $T_b'$ caused by the wheel cylinder pressure is in proportion to the braking pressure $P_b$, the resonance gain $G_d$ is proportional to the vibration component at the resonance frequency $\omega\infty$ of the $(\omega_w/T_b')$, and the resonance gain $G_d$ is expressed by the following equations.

$$G_d = \left.\frac{\omega_w}{P_b}\right|_{s=j\omega^\infty} \propto \left.\frac{\omega_w}{T_b'}\right|_{s=j\omega^\infty} \tag{47}$$

$$= \frac{jJ_v(J_B J_t - J_v J_w)K\sqrt{J_A J_B J_w K} + \alpha J_B^3 J_w KR^2 W}{J_A J_v^2 J_w^2 K^2}$$

$$= jA + \alpha B (j \text{ represents imaginary unit})$$

where $J_A = J_t + J_v + J_{w1}$, $J_B = J_t + J_v$ (48)

$$A = \frac{J_v(J_B J_t - J_v J_w)K\sqrt{J_A J_B J_w K}}{J_A J_v^2 J_w^2 K^2}, \quad B = \frac{J_B^3 J_w KR^2 W}{J_A J_v^2 J_w^2 K^2}. \tag{49}$$

In general, there is obtained the following relationship $$|A| = 0.012 << |B| = 0.1 \tag{50}$$

and hence the following expression is derived from Equations (45) and (47).

$$\frac{dT_b}{d\Delta\omega} \propto G_d \tag{51}$$

More specifically, the gradient of the braking torque $T_b$ with respect to the slip speed $\Delta\omega$ is in proportion to the resonance gain $G_d$.

Therefore, Equation can be converted as follows:

$$T_b = -k\left(\frac{d\omega_w}{dt} + \frac{h}{G_d}\frac{dT_b}{dt}\right) \tag{52}$$

where h is a proportional coefficient. Consequently, by simplification of Equation (52), the transmission function is expressed as $$T_b = -\frac{ks}{1 + h/G_d s}\omega_w. \tag{53}$$

where "s" represents an operator for Laplace transformation purposes. The torque $T_b'$ caused by the wheel cylinder pressure is the sum of the braking torque $T_b$ and the torque caused by the inertia of wheel $J_w$ and is represented by $$T_b' = T_b - J_w\frac{d\omega_w}{dt}, \tag{54}$$

hence the transmission function is expressed as $$T_b' = \left(-\frac{ks}{1 + h/G_d s} - J_w s\right)\omega_w. \tag{55}$$

Assuming that the mean value of $T_b'$ on the left side of Equation (55) is proportional to the mean value $P_m$ of the wheel cylinder pressure $P_b$, the mean value $P_m$ is expressed as $$Pm = -\frac{K}{1 + \tau LPFs}\left(\frac{ks}{1 + h/G_d s} + J_w s\right)\omega_w, \tag{56}$$

given that K is a proportional coefficient, where $\tau$LPF is a time constant of a low pass filter (i.e., a time constant used for calculation of the mean value).

(Principle of Estimating the Master Cylinder Pressure and the Minute Amplitude of the Braking Pressure in Block B)

As has already been mentioned, if the pressure increase time $t_i$ and the pressure decrease time $t_r$ instructed to the valve when the master cylinder pressure Pd is constant, the mean braking pressure $P_m$ and the micro amplitude $P_v$ of the braking pressure are uniquely determined by Equations (37) and (38). Further, provided that the pressure increase and decrease time periods are constant with respect to the change in the master cylinder pressure $P_d$, the mean braking pressure $P_m$ is proportional to the master cylinder pressure $P_d$ (see FIG. 27A), and the micro amplitude $P_v$ changes in proportion to the square root of the master cylinder pressure Pd (FIG. 27B).

Accordingly, the master cylinder pressure $P_d$ can be calculated from the pressure increase time $t_i$, the pressure decrease time $t_r$, and the mean braking pressure $P_m$ given by Equation (56). Further, the micro amplitude $P_v$ of the braking pressure can be calculated from the relationship between the thus-calculated master cylinder pressure $P_d$ and the pressure increase and decrease time $t_i$, $t_r$ (see FIG. 27B).

For example, assume that there is prepared a two-dimensional table $P_{m0}$ ($t_i$, $t_r$) for the pressure increase and decrease time periods required for the mean braking pressure with respect to the master cylinder pressure $P_{d0}$. If it is found from Equation (56) that the actual mean braking pressure is $P_w$, the master cylinder pressure $P_d$ can be calculated as follows by comparison of $P_{m0}(t_i, t_r)$ with $P_m$ from the pressure increase and decrease time $t_i$, $t_r$ at that time.

$$P_d = \frac{P_m}{P_{m0}(t_i, t_r)} P_{d0} \tag{57}$$

Further, the micro amplitude $P_v$ at this time can be calculated as follows by use of the two-dimensional table $P_{v0}(t_i, t_r)$ with respect to the master cylinder pressure $P_{d0}$.

$$P_v = \sqrt{\frac{P_d}{P_{d0}}} P_{v0}(t_i, t_r) \tag{58}$$

As previously mentioned, the foregoing calculations are based on the fact that the mean braking pressure is proportional to the master cylinder pressure when the pressure increase time period and the pressure decrease time periods are the same, and the micro amplitude of the braking pressure is proportional to the square root of the master cylinder pressure.

The foregoing method enables estimation of the master cylinder pressure and of the micro amplitude of the braking pressure. However, two two-dimensional tables must be prepared. In order to simplify the processing, the pressure increase and decrease time are limited in such a way that the micro amplitude of the braking pressure becomes constant with respect to a given master cylinder pressure.

Figure 30A:
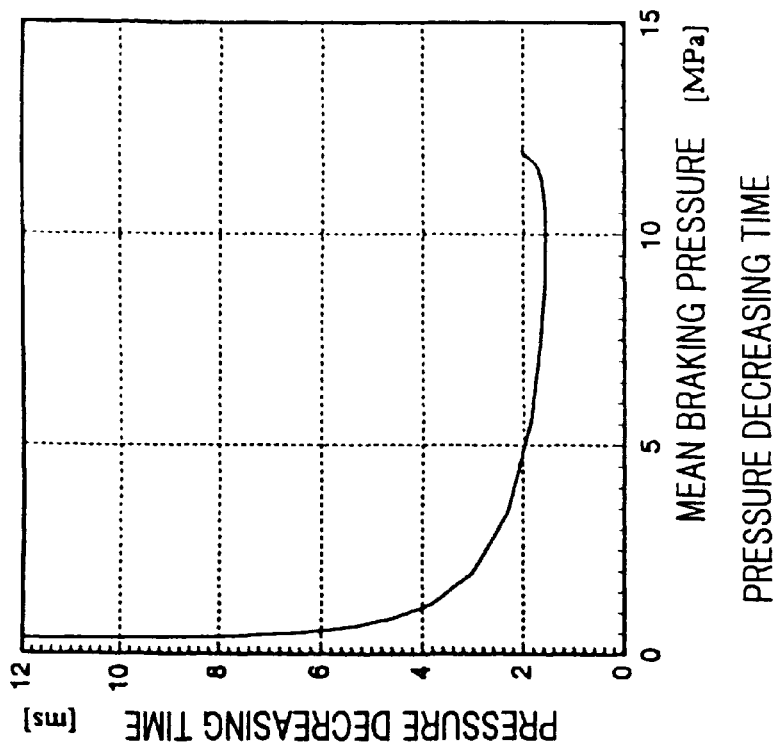
FIG. 30A is a graph showing the pressure increase and decrease time periods for maintaining the constant micro amplitude of the braking pressure, and particularly, the relationship between a mean braking pressure and pressure increase time.
Figure 30B:
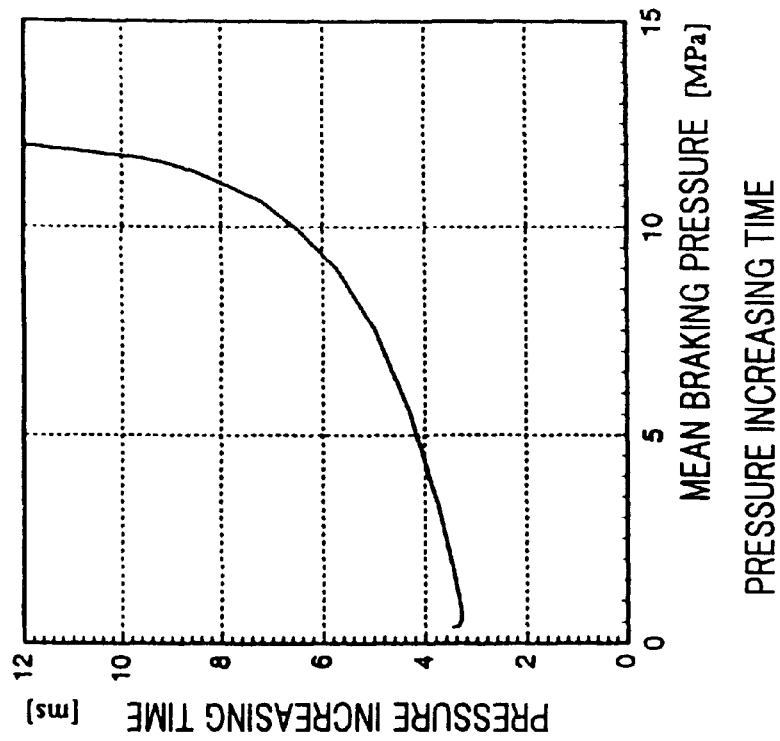
FIG. 30B is a graph showing the pressure increase and decrease time periods for maintaining the constant micro vibration of the braking pressure, and particularly, the relationship between the mean braking pressure and pressure decrease time.

FIGS. 30A and 30B show the results of calculation of pressure increase and decrease time periods—at which the micro amplitude of the braking pressure becomes constant at 0.3 MPa when the master cylinder pressure is maintained at 15.5 MPa—with respect to each of the mean braking pressures. From the relationship shown in FIGS. 30A and 30B, the mean braking pressure referred to obtain the pressure increase and decrease time periods—at which both the master cylinder pressure and the micro amplitude of the braking pressure become constant—is taken as a mean braking pressure reference value $P_{mc}$.

With reference to FIGS. 30A and 30B, if the valve is actuated at the pressure increase and decrease time corresponding to the mean braking pressure reference value $P_{mc}$, the master cylinder pressure $P_d$ and the micro amplitude $P_v$ of the braking pressure can be obtained as shown below with respect to the mean braking pressure $P_m$ estimated at this time.

$$P_d = \frac{P_m}{P_{mc}} P_{d0} \tag{59}$$

$$P_v = \sqrt{\frac{P_d}{P_{d0}}} P_{v0} \tag{60}$$

Since the $P_{d0}$ and $P_{v0}$ in Equations (59) and (60) are constant ($P_{d0}$=15.5 MPa and $P_{v0}$=0.3 Mpa), the two two-dimensional tables can be omitted, thereby simplifying the brake pressure estimation apparatus.

(Anti-Lock Brake Controller Using the Brake Pressure Estimation Apparatus)

Figure 31:
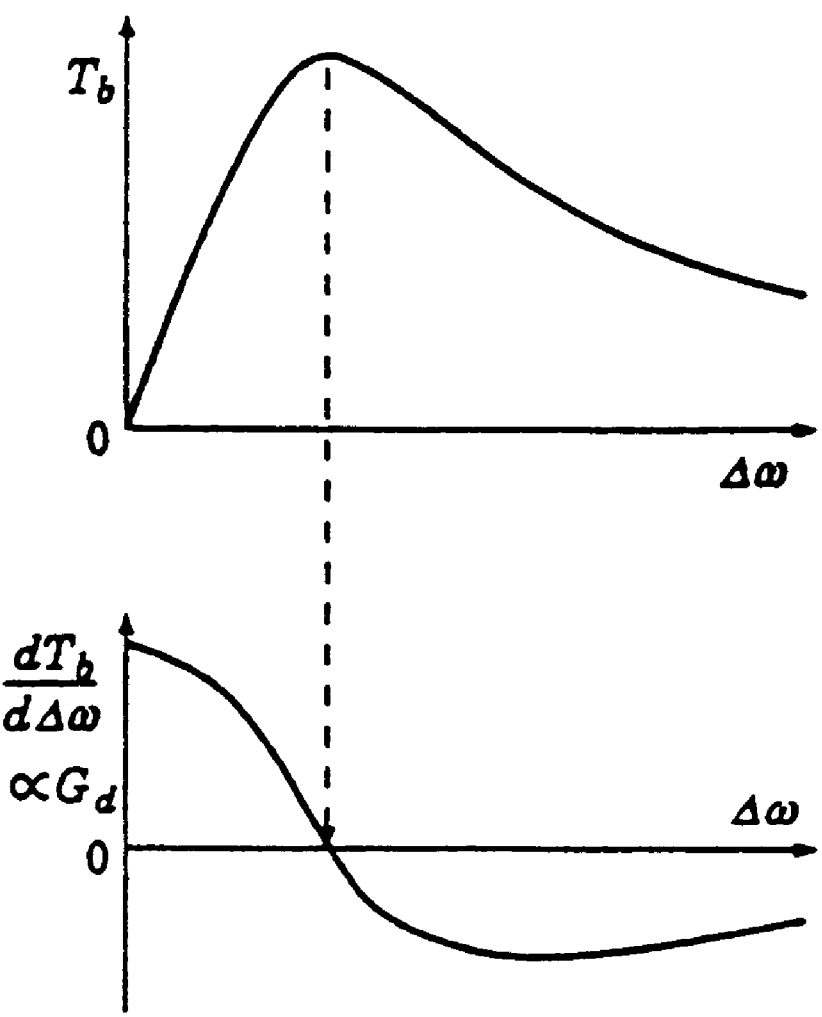
FIG. 31 is a plot showing the relationship between the slip speed $\Delta\omega$, braking torque Tb, and the gradient of the braking torque $T_b$.

As has already been shown by Equation (51), the gradient ($dT_b/d\Delta\omega$) of the braking torque $T_b$ with respect to the slip rate $\Delta\omega$ is proportional to the resonance gain $G_d$ that is the ratio of the micro amplitude $\omega_w$ of the wheel speed to the micro amplitude $P_v$ of the braking pressure. As shown in FIG. 31, assume that the gradient ($dT_b/d\Delta\omega$) becomes zero. In this state, the braking torque $T_b$ becomes maximum, and if an attempt is made to apply additional braking force, the wheels are known to become locked, thereby resulting in abrupt loss of the braking force.

An ABS system in accordance with the fifth embodiment of the present invention performs controlling operation so as to stop the vehicle without tire lock while the braking force in the vicinity of the peak braking force is maintained. From the magnitude of the resonance gain, it is possible to determine whether or not the braking force has approached the vicinity of its peak value.

More specifically, the resonance gain is calculated from the micro amplitude of braking pressure and the micro amplitude of the wheel speed, both of which are obtained by use of the foregoing braking pressure estimation apparatus. If the resonance gain $G_d$ is greater than a certain reference value $G_s$, the braking pressure is not reduced. In contrast, if the resonance gain $G_d$ reduces to a value smaller than the reference value $G_s$, the braking force is deemed to approach its peak value, and hence the braking pressure is reduced. As a result, the braking torque $T_b$ can be maintained at the maximum braking torque corresponding to the peak $\mu$, thereby enabling highly-accurate anti-lock brake controlling operation regardless of the condition of the road surface.

A breaking pressure estimation apparatus in accordance with the fifth embodiment of the present invention estimates the micro amplitude of the braking pressure used for estimation of the resonance gain without use of a pressure sensor, thereby enabling a reduction in the cost of the entire ABS system.

Next, a description will be given of a braking pressure estimation apparatus and an antilock brake controller according to the fifth embodiment of the present invention.

(Example of Configuration of a Braking Pressure Estimation Apparatus)

Figure 32:
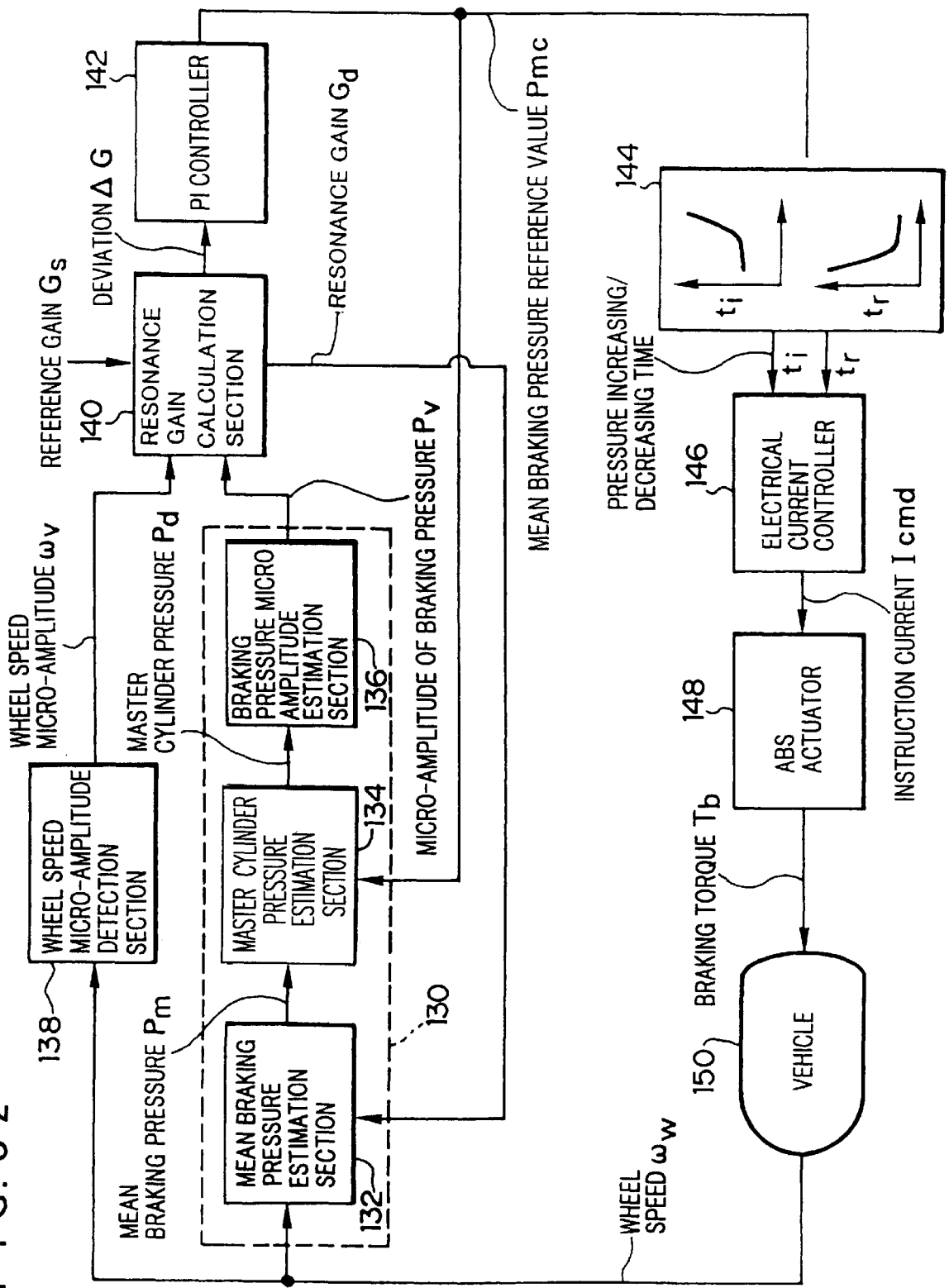
FIG. 32 is a block diagram showing the configuration of an anti-lock brake controller in accordance with the fifth embodiment.

FIG. 32 shows the configuration of an anti-lock brake controller which employs a braking pressure estimation apparatus 130 in accordance with the fifth embodiment.

As shown in FIG. 32, the braking pressure estimation apparatus 130 (designated by a broken line) comprises a mean braking pressure estimation section 132 which receives the wheel speed $\omega_w$ and the resonance gain $G_d$ and estimates the mean braking pressure $P_m$; a master cylinder pressure estimation section 134 which estimates the master cylinder pressure $P_d$ from the mean braking pressure $P_m$ and the mean braking pressure reference value $P_{mc}$; and a braking pressure micro amplitude estimation section 136 for estimating the micro amplitude $P_v$ of the braking pressure from the master cylinder pressure $P_d$.

The wheel speed $\omega_w$ is obtained by processing a signal received from an unillustrated wheel speed sensor mounted on each wheel of a vehicle 150. For example, the detection signal from the wheel speed sensor is converted into a digital signal by an analog-to-digital converter, and the signal can be processed in a computer. Alternatively, a wheel speed can be detected through use of an analog signal processing circuit or digital counter circuit provided outside the sensors.

Figure 33:
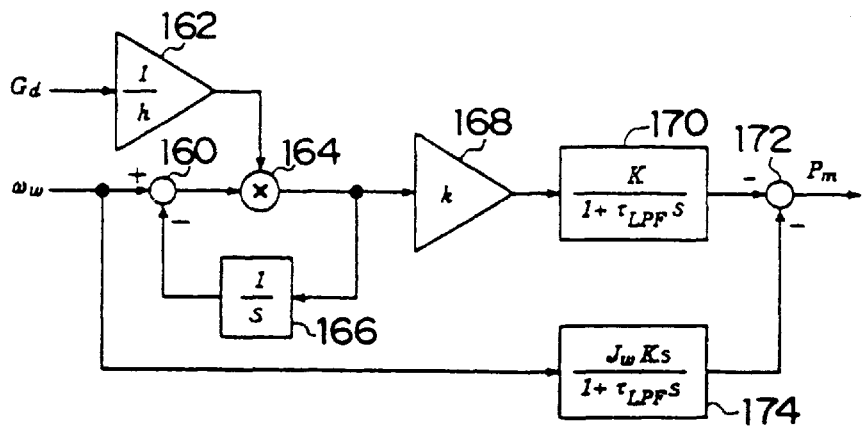
FIG. 33 is a block diagram showing an example of configuration of a mean braking pressure estimation section constituting the braking pressure estimation apparatus in accordance with the fifth embodiment.

A mean braking pressure estimation section 132 can be implemented in the form of a high-order filter which calculates and outputs the mean braking pressure $P_m$ according to Equation (56). Alternatively, the mean braking estimation section can also be implemented by processing a digital signal—which is obtained by conversion of the detection signal from the wheel speed sensor through use of an analog-to-digital converter—within a computer according to Equation (56). FIG. 33 shows an example of configuration of the mean braking pressure estimation section 132.

As shown in FIG. 33, the mean braking pressure estimation section 132 comprises a deviation calculator 160 for calculating a difference (or deviation) between the input wheel speed $\omega_w$ and another input signal; a multiplier 164 connected to an output terminal of the deviation calculator 160; and a k-fold amplifier 168 connected to an output terminal of the multiplier 164. A 1/h-fold amplifier 162 which reduces the input resonance gain Gd by a factor of "h" is connected to an input terminal of the multiplier 164, and another output terminal of the multiplier 164 is connected to another input terminal of the deviation calculator 160 via a Laplace transformer 166.

An output terminal of the amplifier 168 is connected to a subtracter 172 via a filter 170 which calculates (K/1+τLPFs). Another input terminal of the subtracter 172 is connected to a filter 174 which receives the wheel speed $\omega_w$ and calculates and outputs ($J_w$K/1+τLPFs). The subtracter 172 adds together outputs from the filters 172 and 174 after having inverting the signs of the outputs and outputs the result of such addition as the mean braking pressure $P_m$.

Figure 34:
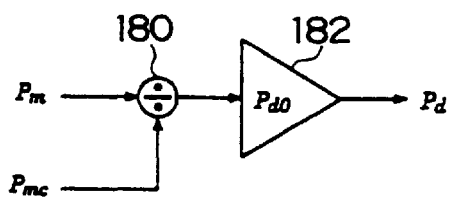
FIG. 34 is a block diagram showing an example of configuration of a master cylinder pressure estimation section constituting the braking pressure estimation apparatus in accordance with the fifth embodiment.

The master cylinder pressure estimation section 134 shown in FIG. 32 can be realized in the form of a circuit which performs multiplication and division represented by Equation (59), and an example of configuration of the master cylinder pressure estimation section 134 is shown in FIG. 34.

As shown in FIG. 34, the master cylinder pressure estimation section 134 comprises a divider 180 for dividing the mean braking pressure $P_m$ calculated by the mean braking pressure estimation section 132 by the input mean braking pressure reference value $P_{mc}$; and an amplifier 182 which is connected to an output terminal of the divider 180, multiplies the result of division by a factor of $P_{d0}$, and outputs the result as the master cylinder pressure $P_d$.

The braking pressure micro amplitude estimation section 136 shown in FIG. 32 can be realized in the form of a circuit which performs arithmetic operations including the calculation of a square root expressed by Equation (60). An example of configuration of the braking pressure micro amplitude estimation section 136 is shown in FIG. 35.

Figure 35:
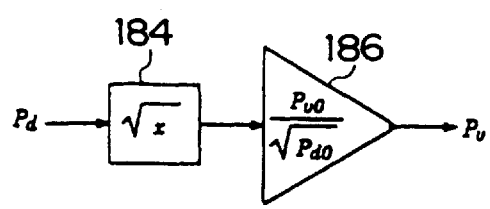
FIG. 35 is a block diagram showing an example of configuration of a braking pressure micro amplitude estimation section constituting the braking pressure estimation apparatus in accordance with the fifth embodiment.

As shown in FIG. 35, the braking pressure micro amplitude estimation section 136 comprises a square root calculation section 184 for calculating the square root of the master cylinder pressure $P_d$ calculated by the master cylinder pressure estimating section 134; and an amplifier 186 which multiplies the square root ($\sqrt{Pd}$) calculated by the square root calculating section 184 by a factor of ($P_{v0}/\sqrt{Pd0}$), and outputs the result as the braking pressure micro amplitude $P_v$. The calculation of a square root by the square root calculating section 184 can be simply effected by execution of numerical processing for the purpose of calculating a square root, or upon reference to a square root table, after having input data into a computer.

(Example of Configuration of the Anti-lock Brake Controller)

The anti-lock brake controller shown in FIG. 32 comprises a wheel speed micro amplitude detection section 138 for detecting the amplitude $\omega_w$ of the micro vibration component from the wheel speed $\omega_w$; a resonance gain calculation section 140 for calculating the resonance gain $G_d$ from the wheel speed micro amplitude $\omega_v$ detected by the wheel speed micro amplitude detection section 138 and the braking pressure micro amplitude $P_v$ calculated by the braking pressure micro amplitude estimation section 136; a PI controller 142 for calculating the mean braking pressure reference value $P_{mc}$ from the thus-calculated resonance gain $G_d$; a table 144 for calculating the pressure increase and decrease time required for the valve from the mean braking pressure reference value $P_{mc}$; an electrical current controller 146 for outputting an instruction current signal $I_{cmd}$ used for controlling the valve according to the pressure increase time $t_i$ and the pressure decrease time $t_r$ obtained from the table 144; and an ABS actuator 148 (see FIGS. 23A and 23B) having a valve whose pressure increase or decrease time periods are controlled through use of the instruction current $I_{cmd}$.

The wheel speed micro amplitude detection section 138 is configured so as to extract the resonance frequency component of the vibration system comprising the vehicle body, the wheel, and the road surface. Because the resonance frequency of the vibration system is about 40 Hz, the wheel speed micro amplitude detection section 138 is preferably set so as to operate at a cycle of 24 ms; i.e., about 41.7 Hz, in consideration of controllability. The resonance frequency component can be obtained by feeding an output from the vibration system to a band-pass filter centered at a frequency of 41.7 Hz, and by subjecting an output from the band-pass filter to full-wave rectification and d.c. smoothing operation. Alternatively, the resonance frequency component can be extracted by sequentially acquiring time-series data whose interval is an integral multiple of the cycle; e.g., 24 ms (or one cycle) or 48 ms (two cycles), and by calculating a correlation with a unit sine wave and a unit cosine wave of 41.7 Hz.

The resonance gain calculation section 140 calculates the resonance gain $G_d$ by dividing the wheel speed micro amplitude $\omega_v$ received from the wheel speed micro amplitude detection section 138 by the braking pressure micro amplitude $P_v$ received from the braking pressure estimation apparatus 130. In the anti-lock brake controller in accordance with the fifth embodiment, the braking pressure must be immediately reduced when the resonance gain $G_d$ decreases to a value smaller than the reference value $G_s$. Therefore, the resonance gain calculation section 140 calculates a deviation $\Delta G$ by dividing the difference ($G_d - G_s$) (or deviation) between the resonance gain $G_d$ and the reference value G, by the resonance gain $G_d$ and outputs the thus-calculated deviation to the PI controller 142. Here, the deviation $\Delta G$ is given by $$\Delta G = \frac{G_d - G_s}{G_d} = 1 - \frac{G_s}{G_d}. \quad (61)$$

Figure 36:
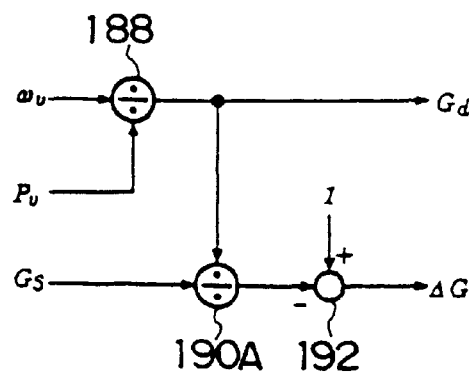
FIG. 36 is a block diagram showing an example of configuration of a resonance gain calculation section constituting the anti-lock brake controller in accordance with the fifth embodiment.

An example of configuration of the resonance gain calculation section 140 that calculates the deviation $\Delta G$ is shown in FIG. 36. As shown in FIG. 36, the resonance gain calculation section 140 comprises a divider 188 for dividing the wheel speed micro amplitude $\omega_v$ by the braking pressure micro amplitude $P_v$; a divider 190A which divides a given reference value Gs by the value ($\omega_v/P_v = G_d$) output from the divider 188; and a deviation calculator 192 which is connected to an output terminal of the divider 190A, subtracts the value ($G_s/G_d$) output from the divider 190A from 1, and outputs the thus-calculated $\Delta G$. The reference value $G_s$ is previously stored in the memory as resonance gain values at which the state of friction between the road surface and the tire approaches the peak braking force (i.e., the maximum coefficient of friction $\mu$: peak $\mu$). The reference value $G_s$ is read out from the memory at the time of the calculation expressed by Equation (61).

When tire slip on the road surface increases suddenly, the resonance gain $G_d$ of the resonance frequency component becomes smaller than the reference gain $G_s$. As a result, the second term $(G_s/G_d)$ in Equation (61) becomes abruptly greater than one, and $\Delta G$ takes on a large negative value. More specifically, as a result of use of the term $(G_s/G_d)$, the sensitivity of $\Delta G$ for detecting the state—in which tire slip increases suddenly—is improved compared with a case where the reciprocal of the second term $(G_d/G_s)$ is used. As a result, the PI controller 42 can be correctly controlled on the basis of $\Delta G$.

The output terminal of the resonance gain calculation section 140 is connected to the mean braking pressure estimation section 132, and the calculated resonance gain $G_d$ is input to the mean braking pressure estimation section 132.

Figure 37:
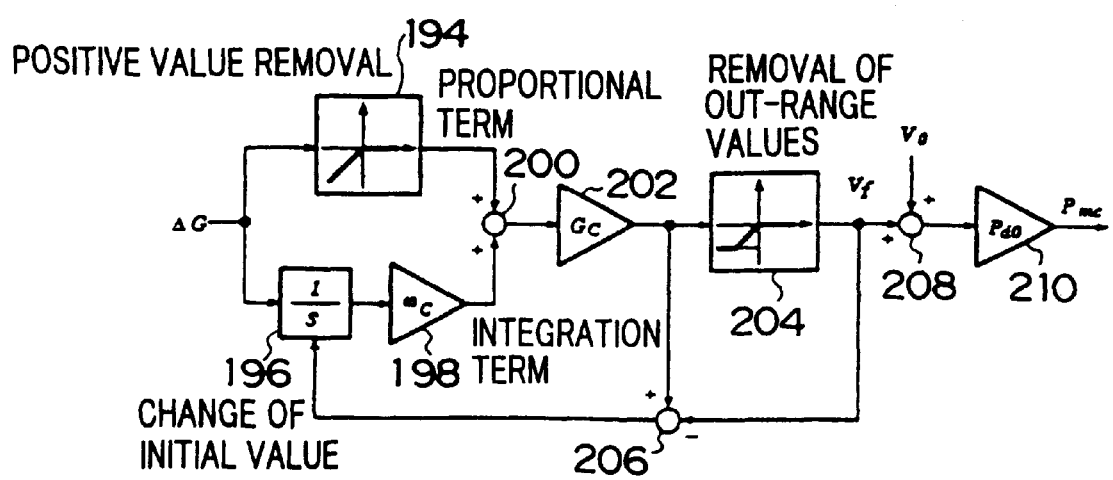
FIG. 37 is a block diagram showing an example of configuration of a PI controller constituting the anti-lock brake controller in accordance with the fifth embodiment.

The PI controller 142 shown in FIG. 32 calculates the mean braking pressure reference value $P_{mc}$ which matches $\Delta G$ calculated by the resonance gain calculation section 140 to zero or substantially to zero. In many cases, the hardware of an actuator of an ABS system disposed in a commercially-available vehicle is configured so as to prevent the braking pressure—which is greater than the braking pressure resulting from the driver's depressing action—from being applied to the wheel. The PI controller 142 must be designed so as to immediately reduce the braking pressure only when the braking pressure resulting from the driver's depressing action is increased and wheel slip approaches or exceeds the peak braking force. FIG. 37 shows an example of the configuration of the PI controller 142.

As shown in FIG. 37, with the exception of sections for the purposes of eliminating positive values or out-range values, the PI controller 142 includes a first calculation section which performs, on the deviation $\Delta G$, arithmetic computation expressed by the following equation $$V_f = G_c(1+\omega_c/s)\Delta G \tag{62}$$

Thus, the PI controller 142 controls a proportional resonance gain $G_c$ and an integrated resonance gain $G c\omega c$.

The section for calculating the proportional item of Equation (62) includes a positive value elimination section 194 which eliminates a positive value from $\Delta G$ and outputs only a negative value. In connection with tire-to-road-surface characteristics, as the slip speed increases, the tire comes into an ungrip state, and the resonance frequency of the vibration system shifts to a higher frequency range. As a result, the resonance gain $G_d$—which is the resonance frequency component of the vibration system comprising the vehicle body, the wheel, and the road surface—reduces. For this reason, the braking pressure is applied to the wheel only when $\Delta G$ is in a negative state in which the actual resonance gain $G_d$ becomes smaller than the reference value $G_s$; i.e., when the tire is in a state immediately before tire lock in which the tire is braked and the peak value $\mu$ is exceeded.

The section for calculating an integral item in Equation (62) comprises a Laplace calculator 196 for calculating 1/s of $\Delta G$ and a $\omega_c$-fold amplifier 198 connected to the output terminal of the Laplace calculator 196. The output terminals of the positive value elimination section 194 and the amplifier 198 are connected to a $G_c$-fold amplifier 202 via an adder 200 which adds the proportional item to the integral item. With the foregoing configuration, the amplifier 202 outputs $V_f$ represented by Equation (62).

As shown in FIGS. 30A and 30B, the pressure increase instruction time $t_i$ and the pressure decrease instruction time $t_r$ are determined with respect to the calculated mean braking pressure. The mean braking pressure reference value $P_{mc}$ used for calculating the actual pressure increase time and the pressure decrease time must be an output within the range from the most decreased pressure of 0.5 MPa to the most increased pressure of 12 MPa when the master cylinder pressure is 15.5 MPa. This range corresponds to the range of about 0.03 to 0.77 times that of the master cylinder pressure.

The state in which the deviation $\Delta G$ is greater than zero, or a positive value, signifies that tire slip does not approach the peak braking force. Accordingly, when $\Delta G$ becomes a positive value, and $V_f$ becomes zero, the mean braking pressure reference value $P_{mc}$ must be output as a value which enables the maximum increased pressure of 12 MPa.

As a result, the mean braking pressure reference value $P_{mc}$ is calculated by the following equation from $V_f$ given by Equation (62).

$$P_{mc} = P_{d0}(V_f + V_0) \tag{63}$$

where $P_{d0} = 15.5$ MPa and $V_0 = 0.77$. Before commencing the calculation expressed by Equation (63), the range of $V_f$ must be set to $-0.74$ to 0 in order to prevent the mean braking pressure reference value $P_{mc}$ from decreasing to a pressure smaller than a pressure of $0.03 \times P_{d0}$ in the maximum pressure reduced state.

In the PI controller 142 for providing the above-described restriction, the section for performing the calculation expressed by Equation (63) comprises an out-range value elimination section 204 for eliminating a value outside the range of $V_f$ output from the amplifier 202; an adder 208 which adds $V_f$ output from the out-range value elimination section 204 to $V_0$ received from another input terminal; and an amplifier 210 for multiplying $(V_f + V_0)$ output from the adder 208 by a factor of $P_{d0}$.

When $V_f$ is outside the range of $-0.74$ to 0, the out-range value elimination section 204 outputs a value within the range (i.e., a value corresponding to the limit of the range). In contrast, when $V_f$ is within the range, the out-range value elimination section 204 outputs the value as it is. Even if the out-range value elimination section 204 eliminates a value outside the range of $V_f$ actually output from a controller, the deviation $\Delta G$ always occur unless control is accomplished. As a result, a risk arises of the deviation $\Delta G$ being an input of integral component and increasing an integral output, thereby resulting in divergence of the integral output. Eventually, a large difference arises between the value—which has been obtained by the above-mentioned process in the out-range value elimination section—and the sum of the actually-output proportional item and the actually-output integral item, thereby resulting in a delay in the output of the overall PI controller.

To prevent such a problem, a deviation calculator 206 is provided for subtracting an output from the out-range value elimination section 204 from an input to the same, and the output terminal of the deviation calculator 206 is connected to the Laplace calculator 196. Thus, stable control can be accomplished by feeding back to the Laplace calculator 196 the output from the deviation calculator 206; i.e., the value eliminated by the out-range value elimination section 204, as an initial value of the integral item.

The output terminal of the PI controller 142 is connected to the master cylinder pressure estimation section 134, and the calculated mean braking pressure reference value $P_{mc}$ is output to the master cylinder pressure estimation section 134.

A table 144 shown in FIG. 32 shows the functional relationship between the mean braking pressure and the pressure increase time shown in FIG. 30A and the functional relationship between the mean braking pressure and the pressure decrease time shown in FIG. 30B. Upon reference to the table 144, there can be obtained the pressure increase time $t_i$ and the pressure decrease time $t_r$, both of which correspond to the mean braking pressure reference value $P_{mc}$ calculated by the PI controller 142.

The current controller 146 controls the pressure increasing and decreasing time periods of the valve of the ABS actuator 148 such that they match the pressure increase and decrease time $t_i$ and $t_r$ corresponding to the calculated mean braking pressure reference value $P_{mc}$.

Figure 38:
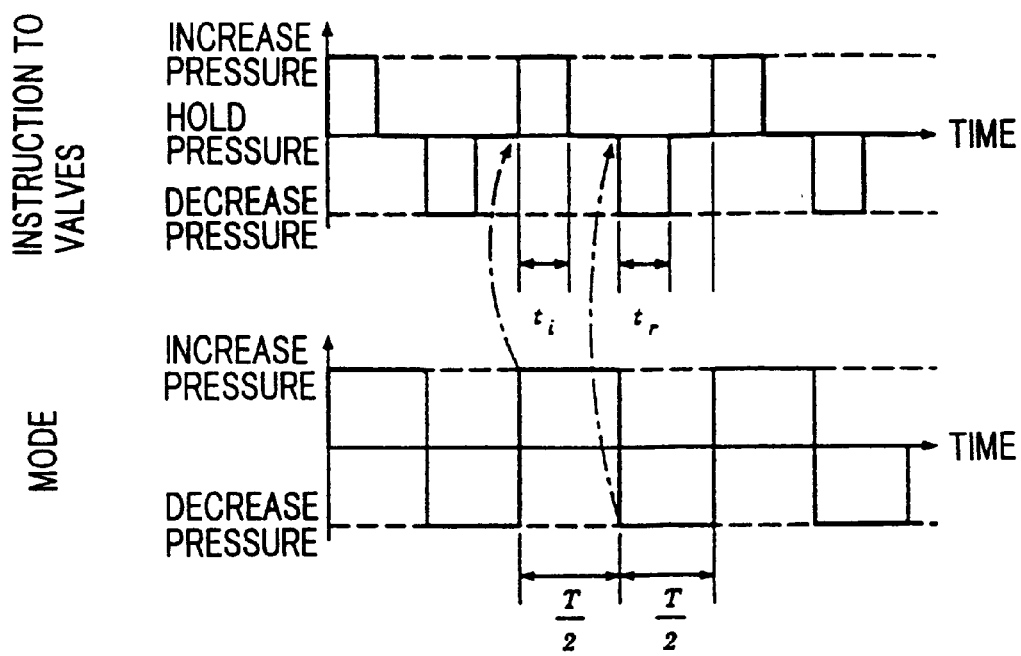
FIG. 38 is a block diagram showing a signal for instructing the actuation of the valve of the ABS actuator constituting the anti-lock brake controller in accordance with the fifth embodiment.

More specifically, the current controller 146 switches the mode of the valve between the pressure increase mode and the pressure decrease mode at a cycle which is half (T/2) the cycle T (e.g., 24 ms) of micro vibration. Pressure increase and decrease instruction signals are output to the valve from the moment the mode is switched solely for the period of the pressure increase time $t_i$ or the pressure decrease time $t_r$. During the remaining period of T/2, the current controller 146 outputs a pressure hold instruction signal to the valve. By means of these actuation instruction signals, micro vibration of the braking pressure and control of the mean braking pressure can be readily effected. FIG. 38 shows the outline of the operation instruction signals output to the valve of the ABS actuator 148 in the foregoing control example (i.e., an example of operation of the braking pressure controller).

The pressure increase and decrease time periods may be clocked through used of counter timers which are reset when the mode is switched. Alternatively, the resonance gain of the integrator which is reset upon changeover of the mode may be caused to change in inverse proportion to the pressure increase and decrease time $t_i$ and $t_r$, and the period of time until the output of the integrator reaches a predetermined threshold value may be used to determine the pressure increase and decrease time periods. Thus, instructions to be output to the valve are generated, and a control current corresponding to each state is supplied to the ABS actuator 148.

The operation of the ABS system in accordance with the present invention will now be described.

In the braking pressure estimation apparatus in the ABS system shown in FIG. 32, the mean braking pressure estimation section 132 calculates the mean braking pressure $P_m$ from the wheel speed $\omega_w$ and the resonance gain $G_d$ through use of Equation (56). The master cylinder pressure estimation section 134 calculates the master cylinder pressure $P_d$ from the thus-calculated mean braking pressure $P_m$ and the mean braking pressure reference value $P_{mc}$ through use of Equation (59). Alternatively, the master cylinder pressure estimation section 134 may be configured so as to calculate the pressure increase time $t_i$ and the pressure decrease time $t_r$, both of which correspond to the mean braking pressure calculated by the PI controller 142; to obtain the mean braking pressure $P_{m0}$ corresponding to the given master cylinder pressure $P_{d0}$ from the two-dimensional table defining the correspondence between the pressure increase and decrease time and the mean braking pressure; and to calculate the master cylinder pressure $P_d$ through use of Equation (57).

The braking pressure micro amplitude estimation section 136 calculates the braking pressure micro amplitude $P_v$ from the calculated master cylinder pressure $P_d$ in accordance with Equation (60). The braking pressure micro amplitude estimation section 136 may have a structure to obtain pressure increase and decrease time periods $t_i$ and $t_r$ corresponding to the means braking pressure calculated by the PI controller 142; to obtain a braking pressure micro amplitude $P_{v0}$ corresponding to the predetermined master cylinder pressure $P_{do}$ from two-dimensional tables showing the correspondence between the pressure increase and decrease time periods and the braking pressure micro amplitude; and to calculate the braking pressure micro amplitude $P_v$ in accordance with Equation (58).

In the ABS system, the wheel speed micro amplitude detection section 138 detects the amplitude of the resonance frequency component of the wheel speed $\omega_w$ detected by an unillustrated wheel speed sensor. Next, the resonance gain calculation section 140 calculates the resonance gain $G_d$ from the braking pressure micro amplitude $P_v$ and the amplitude of the resonance frequency component of the wheel speed $\omega_w$. The thus-calculated resonance gain $G_d$ is transferred to the mean braking pressure estimation section 132, and the deviation $\Delta G$ is calculated from the resonance gain $G_d$ and the reference gain $G_s$ through use of Equation (61).

The PI controller 142 calculates the mean braking pressure reference value $P_{mc}$ such that the deviation $\Delta G$ calculated by the resonance gain calculation section 140 becomes zero or substantially zero. The thus-calculated mean braking pressure reference value $P_{mc}$ is transferred to the master cylinder pressure estimation section 134, and the mean braking pressure reference value $P_{mc}$ is converted to the pressure increase and decrease time periods for the valve upon reference to the table 144. Subsequently, the current controller 146 converts the pressure increase and decrease time periods corresponding to the mean braking pressure reference value $P_{mc}$ into the actuation instruction signal such as that shown in FIG. 38. The thus-converted actuation instruction signals are transmitted to the ABS actuator 148. The valve in the ABS actuator 148 operates to increase or decrease the braking pressure according to the actuation instruction signal shown in FIG. 38, whereby the braking pressure corresponding to the mean braking pressure reference value $P_{mc}$ is applied to the wheel cylinder.

If an attempt is made to apply to the wheel the braking pressure exceeding the maximum braking pressure (i.e., the braking pressure obtained when the gradient of the braking torque shown in FIG. 31 is zero), the resonance frequency of the vibration system shifts toward a higher frequency range. Through the aforementioned control operation, the resonance gain $G_d$ produced when the tire grips the road surface decreases, so that the deviation $\Delta G$ in Equation (61) becomes negative. As a result, the braking force is immediately reduced, thereby preventing tire lock. Further, the braking force is controlled so as to make the deviation $\Delta G$ zero, the vehicle is braked while the braking force is maintained at its peak value shown in FIG. 31, resulting in a reduction in a braking distance and in braking time.

As mentioned above, the ABS system in accordance with the fifth embodiment controls the braking force on the basis of the resonance characteristics of the vibration system comprising the vehicle body, the wheel, and the road surface. Compared with the conventional ABS system which reduces the braking force when detecting wheel lock, the ABS system according to the present invention ensures smoother and more continual variations in the braking force. In addition, since the braking force is controlled on the basis of the resonance characteristics, stable control of the braking force becomes feasible regardless of variations in the road surface and can be implemented through use of single control logic.

As shown in FIG. 38, the mode is switched at a given cycle between the pressure increase mode and the pressure decrease mode, and the braking pressure is controlled by adjusting the duration of the pressure increase time and of the pressure decrease time in each mode, thereby enabling continual braking pressure control. The frequency at which the mode is switched (i.e., the frequency of micro vibration) is comparatively high, or 40 Hz. Further, the amplitude of vibration is micro so as to be able to detect the resonance characteristics, and hence variations in the braking pressure can be suppressed to such an extent as not to provide the driver with unpleasant feeling, thereby preventing kickback. Still further, great variations are not imparted to vehicle behavior, which in turn improves ABS control. The mean braking pressure can be continually controlled through use of two valves employed in the conventional ABS system; i.e., a pressure increase valve and a pressure decrease valve, thereby not requiring a change in hardware.

The anti-lock brake controller using the braking pressure estimation apparatus in accordance with the fifth embodiment is applied to an actual vehicle. In reference to FIGS. 39A to 39D, an explanation will be given of the result of operation of the anti-lock brake controller produced when it is actuated under specific conditions.

FIGS. 39A to 39D show the result of operation of the anti-lock brake controller and variations in physical quantities associated with the operation in a test in which the vehicle equipped with the anti-lock brake controller is stopped within a period of about three seconds by application of braking force to the vehicle which is in an ordinary traveling condition. The vehicle undergoes a shift from a state in which the tire grips the road surface to a state in which the coefficient of friction of the tire gradually approaches the peak value $\mu$, as well as to a state in which the coefficient of friction of the tire exceeds the peak value $\mu$, so that the tire is in a state immediately before tire lock.

Figure 39A:
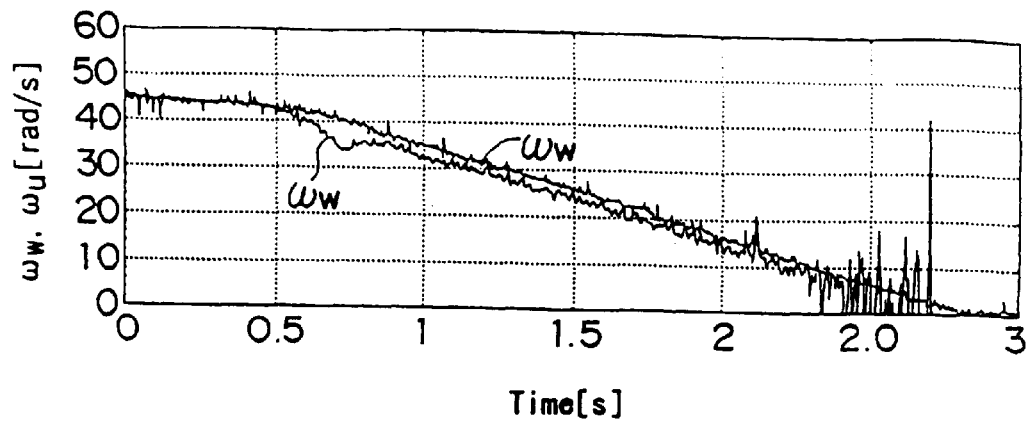
FIG. 39A is a graph for explaining the result of operation of the anti-lock brake controller in accordance with the fifth embodiment, showing variations in wheel speed $\omega_w$ and vehicle speed $\omega_u$ with time.

FIG. 39A shows variations in the wheel speed $\omega_w$ and the vehicle body speed $\omega_u$ with time resulting from the foregoing shift in the vehicle state. As can be seen from the drawing, the wheel speed $\omega_w$ greatly changes after lapse of about 2.3 seconds since the braking action is commenced (set to 0 second), and the vehicle is shifted to a state immediately before wheel lock.

Figure 39B:
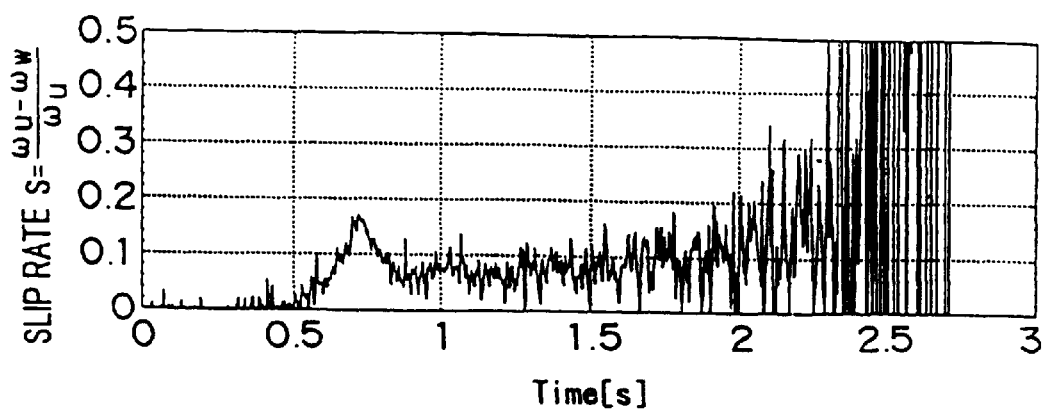
FIG. 39B is a graph for explaining the result of operation of the anti-lock brake controller in accordance with the fifth embodiment, showing variations in a slip rate S with time.

FIG. 39B shows variations in the slip rate S with time. The slip rate S is expressed by $$S = \frac{\omega_u - \omega_w}{\omega_u}.$$

As is clear from FIG. 39B, the slip rate S starts to increase after lapse of about two seconds, and the coefficient of friction gradually approaches to the peak value $\mu$. After lapse of 2.3 seconds, the slip rate extremely oscillates and exceeds the peak value $\mu$.

Figure 39C:
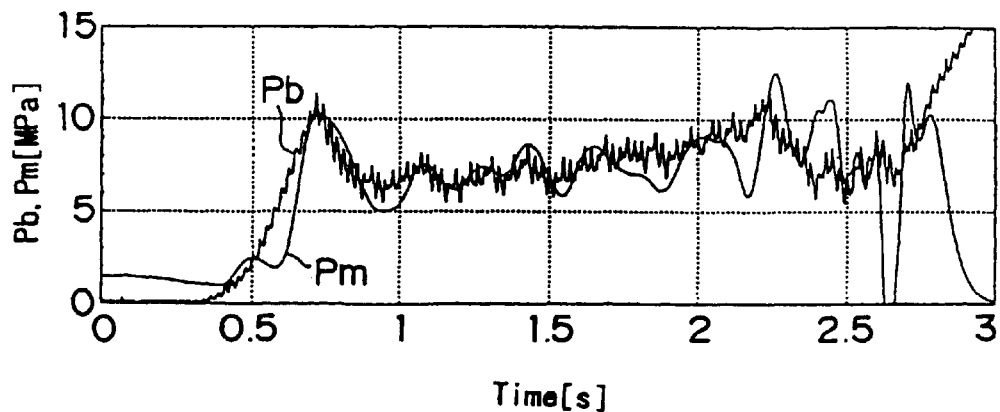
FIG. 39C is a graph for explaining the result of operation of the anti-lock brake controller in accordance with the fifth embodiment, showing variations in actual wheel cylinder pressure $P_b$ and in estimated mean braking pressure $P_m$ with time.

FIG. 39C shows variations with time in the wheel cylinder pressure $P_b$ measured by the pressure sensor as well as in the mean braking pressure $P_m$ estimated by the braking pressure estimation apparatus in accordance with the fifth embodiment (i.e., the mean braking pressure estimation section 132 shown in FIG. 32). As is evident from FIG. 39C, the estimated mean braking pressure $P_m$ substantially matches the actual wheel cylinder pressure $P_b$. Particularly, a high degree of match is obtained in the area of the maximum variation between the pressure $P_m$ and the pressure $P_b$, thereby verifying the degree of accuracy of braking pressure estimation according to the present invention.

Figure 39D:
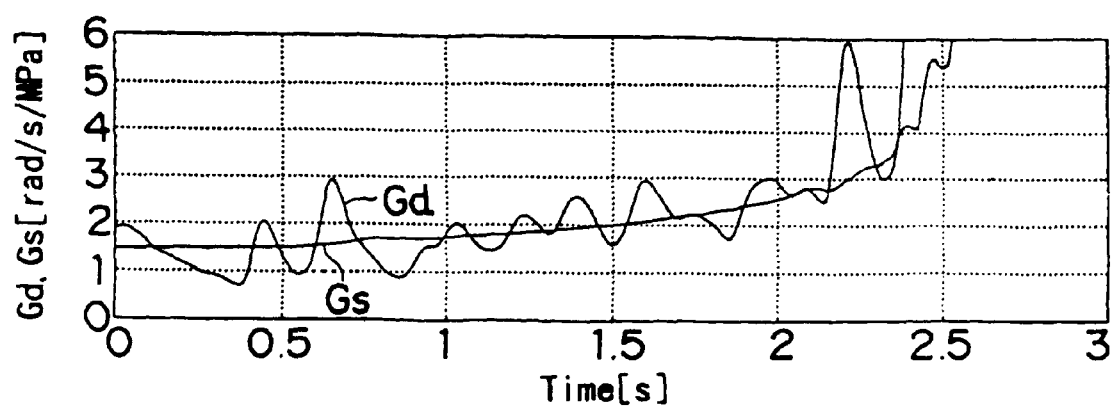
FIG. 39D is a graph for explaining the result of operation of the anti-lock brake controller in accordance with the fifth embodiment, showing variations in a resonance gain $G_d$ and a reference gain $G_s$ with time.

FIG. 39D shows variations with time in the reference gain $G_s$ and the resonance gain $G_d$ calculated by the resonance gain calculation section 140 in accordance with the fifth embodiment. As is obvious from the drawing, the resonance gain $G_d$ increases in comparison with the reference gain $G_s$ in the region where the tire is in a state immediately before tire lock, enabling highly-sensitive detection of the state of the tire immediately before tire lock.

FIG. 39D shows variations in $G_d$ and $G_s$ with time. The vehicle speed has a tendency to decrease with elapse of time, and the resonance gain $G_d$ has a tendency to increase with a reduction in the vehicle speed. For these reasons, the reference gain $G_s$ is set so as to increase with lapse of time. As a result, the ratio of the resonance gain $G_d$ to the reference gain $G_s$ is appropriately set.

In the aforementioned fifth embodiment, the resonance gain is calculated. However, the present invention is not limited to this. Instead of the resonance gain, the gradient of braking force with respect to the slip speed, the gradient of braking torque with respect to the slip speed, the gradient of friction coefficient between the road surface and the wheel with respect to the slip speed (the road surface gradient $\mu$) may be calculated and processed in the same way. In order to calculate the road surface gradient $\mu$, the above-described resonance gain is multiplied by a predetermined conversion factor. In order to calculate the gradient of braking force with respect to the slip speed, the gradient of braking torque with respect to the slip speed is calculated and is then multiplied by a predetermined conversion factor (the inverse number of radial of a wheel). A method of calculating the braking torque with respect to the slip speed will be explained hereinafter.

The motion of each wheel and the vehicle body is expressed by the following equations of motion (64) and (65):

$$J\omega_i = R_c F_i'(V/R_c - \omega_i) - T_{bi} \qquad (64)$$

$$Mv = -\sum_{j=1}^{4} F_j'(V/R_c - \omega_j) \qquad (65)$$

where $F_i'$ represents a braking force developed in the i-th wheel, "$T_{bi}$" the braking torque applied to the i-th wheel in response to a stepping-on force, "M" the mass of the vehicle, "Rc" the effective radius of the wheel, "J" the inertia of the wheel, and "v" the vehicle speed. In the above Equation, reference symbol denotes differential with respect to time. In Eqs. (64) and (65), $F_i'$ is indicated as a function of the slip speed ($v/R_c - \omega_i$). The vehicle speed is equivalently represented as an angular velocity $\omega_v$ (Equation (66)), and the friction torque $R_c F_i'$ is expressed as the linear function of the slip speed (gradient $k_i$, and intercept $T_i$ on the y-axis) (Equation (68)).

$$V = R_c \omega_v \qquad (66)$$

$$R_c F_i'(\omega_v - \omega_i) = k_i \times (\omega_v - \omega_i) + T_i \qquad (67)$$

Further, when Eqs. (66) and (67) are substituted into Eqs. (64) and (65) and the wheel speed $\omega_i$ and the vehicle speed $\omega_v$ are represented as time-series data $\omega_i[k]$ and $\omega_v[k]$ which are wheel speed $\omega_i$ and the vehicle speed $\omega_v$ sampled at sampling intervals $\tau$ (where "k" is a sampling point in time; k=1, 2, . . . which are separated from each other by the sampling interval $\tau$), whereby the following Equations (68) and (69) are obtained.

$$J\omega_i[k] - \frac{\omega_i[k-1]}{\tau} = k_i(\omega_v[k-1] - \omega_i[k-1]) + T_i - T_{bi} \quad (68)$$

$$R_c^2 M \omega_v[k] - \frac{\omega_v[k-1]}{\tau} = \quad (69)$$
$$-\sum_{j=1}^{4} k_j \cdot \omega_v[k-1] + \sum_{j=1}^{4} (k_j \omega_j[k-1]) - \sum_{j=1}^{4} T_j$$

Eqs. (68) and (69) are combined together so as to eliminate the equivalent angular velocity $\omega_v$ of the vehicle, yielding $$w_i[k] - \left(2 - \frac{\tau}{J}k_i - \frac{\tau}{R_c^2 M}\sum_{j=1}^{4} k_j\right)\omega_i[k-1] + \quad (70)$$
$$\left(1 - \frac{\tau}{R_c^2 M}\sum_{j=1}^{4} k_j\right)\left(1 - \frac{\tau}{J}k_i\right)\omega_i[k-2] -$$
$$k_i \frac{\tau^2}{J R_c^2 M} \sum_{j=1}^{4} (k_j \omega_j[k-2]) =$$
$$-k_i \frac{\tau^2}{J R_c^2 M} \sum_{j=1}^{4} T_j + \frac{\tau^2}{J R_c^2 M} \sum_{j=1}^{4} k_j(T_i - T_{bi}).$$

If the maximum friction torque of $R_c Mg/4$ ("g" represents a gravitational acceleration) occurs on condition that the slip speed is 3 rad/s, we have $$\max(k_i) = \frac{RcMg/4}{3}. \quad (71)$$

When we consider a specific example in which $\tau=0.01$ (sec.), $R_c=0.3$ (m), and M=1000 (kg), we have max $(k_i)$=245. Accordingly, $$\max\left(\frac{\tau}{R_c^2 M}\sum_{j=1}^{4} k_j\right) \approx 0.054 \ll 1 \quad (72)$$

Equation (70) can be approximated as follows:

$$k_i \frac{\tau}{J}\{\omega_i[k-1] - \omega_i[k-2]\} + f_i = -\omega_i[k] + 2\omega_i[k-1] - \omega_i[k-2] \quad (73)$$

where $$f_i = k_i \frac{\tau^2}{J R_c^2 M}\sum_{j=1}^{4} T_j - \frac{\tau^2}{J R_c^2 M}\sum_{j=1}^{4} k_j(T_i - T_{bi}) \quad (74)$$

As a result, Equation (74) can be described in a linear form with regard to unknown coefficients $k_i$ and $f_i$. The friction torque gradient $k_i$ with respect to the slip speed can be estimated by application of the on-line parameter identification method to Equation (74).

More specifically, the time-series data concerning the friction torque gradient can be estimated from the time-series data $\omega_i[k]$ of detected wheel speed through repetition of steps 1 and 2 to be given hereinbelow.

Step 1

$$\phi_i[k]^T \cdot \theta_i = y_i[k] \quad (75)$$

$$\phi_i[k] = \begin{bmatrix} \tau\{\omega_i[k-1] - \omega_i[k-2]\}/J \\ 1 \end{bmatrix} \quad (76)$$

$$\theta_i = \begin{bmatrix} k_i \\ f_i \end{bmatrix} \quad (77)$$

$$y_i[k] = -\omega_i[k] + 2\omega_i[k-1] - \omega_i[k-2] \quad (78)$$

The first element of the matrix $\phi_i[k]$ of Equation (76) denotes a physical quantity concerning a variation in the wheel speed during one sampling period, and Equation (78) shows a physical quantity concerning the per-sampling-period change in the degree of the per-sampling-period variation in the wheel speed.

Step 2

$$\hat{\theta}_i[k] = \hat{\theta}_i[k-1] + L_i[k](y_i[k] - \phi_i[k]^T \cdot \hat{\theta}_i[k-1]) \quad (79)$$

$$L_i[k] = \frac{P_i[k-1]\phi_i[k]}{\lambda + \phi_i[k]^T P_i[k-1]\phi_i[k]} \quad (80)$$

$$P_i[k] = \frac{1}{\lambda}\left[P_i[k-1] - \frac{P_i[k-1]\phi_i[k]\phi_i[k]^T P_i[k-1]}{\lambda + \phi_i[k]^T P_i[k-1]\phi_i[k]}\right] \quad (81)$$

$\hat{\theta}_i$ is calculated by the above recurrence formula, and the first element of the matrix of $\hat{\theta}_i$ is extracted as the estimated friction torque gradient. In Equation (80), $\lambda$ denotes a forgetting factor (e.g., $\lambda=0.98$) showing the is eliminated, and "$T$" denotes the transposition of the matrix.

The left-side side of Equation (79) shows a physical quantity which represents the time history of the physical quantity related to the variation in the wheel speed and the time history of the physical quantity related to the change with regard to the variation in the wheel speed.

What is claimed is:

1. A braking pressure estimation device, comprising:
   a first input means for receiving a wheel speed input;
   a second input means for receiving a resonance gain which is a ratio of a micro amplitude of the wheel speed at a resonance frequency with respect to a micro amplitude of a braking pressure at the time of vibration of the braking pressure at the resonance frequency of a resonance system including a vehicle body, a wheel, and a road surface;
   a third input means for receiving a pressure increase/decrease time required to achieve a mean braking pressure with respect to a given master cylinder pressure or a physical quantity associated with the pressure increase/decrease time;
   braking pressure estimating means for estimating the mean braking pressure from the input wheel speed and a resonance gain on the basis of a model in which the gradient of braking torque with respect to a slip speed is proportional to the resonance gain;
   master cylinder pressure estimating means for estimating a master cylinder pressure on the basis of the mean braking pressure estimated by said braking pressure estimating means and the pressure increase/decrease time required to achieve the mean braking pressure or the physical quantity associated with the pressure increase/decrease time; and micro amplitude estimating means for estimating the micro amplitude of the braking pressure on the basis of the master cylinder pressure estimated by said master pressure estimating means and of the pressure increase/decrease time required to achieve the mean braking pressure or the physical quantity associated with the pressure increase/decrease time.

2. The braking pressure estimation device according to claim 1, wherein the resonance frequency is about 40 Hz.

3. An anti-lock brake controller comprising:

wheel speed detection means for detecting a wheel speed;

resonance gain calculation means for calculating a resonance gain which is the ratio of the micro amplitude of the wheel speed at a resonance frequency with respect to the micro amplitude of a braking pressure at the time of vibration of the braking pressure at the resonance frequency of a resonance system including a vehicle body, a wheel, and a road surface;

braking pressure estimating means for estimating a mean braking pressure from the wheel speed detected by said wheel speed detection means and the resonance gain calculated by said resonance gain calculation means on the basis of a model in which the gradient of braking torque with respect to a slip speed is proportional to the resonance gain;

master cylinder pressure estimating means for estimating master cylinder pressure on the basis of the mean braking pressure estimated by said braking pressure estimating means and a pressure increase/decrease time required to achieve the mean braking pressure or a physical quantity associated with the pressure increase/decrease time;

micro amplitude estimating means for estimating the micro amplitude of the braking pressure on the basis of the master cylinder pressure estimated by said master pressure estimating means and the pressure increase/decrease time required to achieve the mean braking pressure or the physical quantity associated with the pressure increase/decrease time and for outputting the estimated micro amplitude of the braking pressure to said resonance gain calculation means;

control means for controlling the pressure increase/decrease time required to achieve the mean braking pressure in such a way that the resonance gain calculated by said resonance gain calculation means matches or substantially matches a reference gain; and reference means for outputting to the master cylinder pressure estimating means the pressure increase/decrease time which is required to achieve the mean braking pressure and is controlled by said control means or the physical quantity associated with the pressure increase/decrease time.

4. The anti-lock brake controller according to claim 3, wherein the resonance frequency is about 40 Hz.

5. A braking pressure controller comprising:

a control valve equipped with a pressure increase valve for increasing the braking pressure exerted on a wheel cylinder and a pressure decrease valve for decreasing the braking pressure; and control means for controlling said control valve in such a way as to alternately switch, at a given cycle, between a first state, including a pressure increasing state in which the braking pressure is increased by said pressure increase valve and a pressure holding state in which the braking pressure is held, and a second state, including a pressure decreasing state in which the braking pressure is decreased by said pressure decrease valve and the pressure holding state and for controlling the periods for the pressure increasing state and pressure decreasing state of said control valve in such a way as to hold a mean braking pressure.

6. The braking pressure controller according to claim 5, wherein the pressure holding state is such that the braking pressure is maintained at a predetermined level.

7. A braking pressure estimation device, comprising:

a first input means for receiving a wheel speed;

a second input means for receiving a physical quantity which indicates the slipping ability of a wheel; and braking pressure estimating means for estimating a mean braking pressure from the wheel speed and the physical quantity, wherein the mean braking pressure is calculated using a formula:

$$Pm = -(K/(1+\tau LPFs))(ks/(1+(h/(G_d s)))+J_w s)(\omega_w,$$

where Pm is the mean braking pressure, K is a spring constant, $\tau LPF$ is a time constant of a low pass filter, $J_w$ is an inertia of a wheel, $\omega_w$ is a wheel speed, s is an operator for Laplace transformation, $G_d$ is a resonance gain, and h is a proportional coefficient.

* * * * *